United States Patent
Ozawa et al.

(10) Patent No.: US 11,170,244 B2
(45) Date of Patent: Nov. 9, 2021

(54) DEVICE AND METHOD FOR ANALYZING STATE OF MANUAL WORK BY WORKER, AND WORK ANALYSIS PROGRAM

(71) Applicant: DENSO WAVE INCORPORATED, Aichi-pref. (JP)

(72) Inventors: Ryo Ozawa, Chita-gun (JP); Tsu Ryo, Chita-gun (JP); Kenichi Yoshida, Chita-gun (JP); Yousuke Yamaguchi, Chita-gun (JP); Takuya Sakai, Chita-gun (JP); Motoaki Watabe, Chita-gun (JP); Yoshiki Morimoto, Chita-gun (JP); Takuya Yoda, Chita-gun (JP)

(73) Assignee: DENSO WAVE INCORPORATED, Aichi-pref. (JP)

(*) Notice: Subject to any disclaimer, the term of this patent is extended or adjusted under 35 U.S.C. 154(b) by 0 days.

(21) Appl. No.: 16/791,143

(22) Filed: Feb. 14, 2020

(65) Prior Publication Data

US 2020/0265256 A1   Aug. 20, 2020

(30) Foreign Application Priority Data

Feb. 14, 2019  (JP) .............................. JP2019-024072
Feb. 28, 2019  (JP) .............................. JP2019-035209

(Continued)

(51) Int. Cl.
*G06K 9/20* (2006.01)
*G06K 9/00* (2006.01)

(52) U.S. Cl.
CPC ........ *G06K 9/2081* (2013.01); *G06K 9/00711* (2013.01)

(58) Field of Classification Search
CPC .............. G06K 9/2081; G06K 9/00711; G06T 2207/30241; G06T 2207/30196; G06T 7/20

(Continued)

(56) References Cited

U.S. PATENT DOCUMENTS

| 4,413,277 A * | 11/1983 | Murray ............ G06Q 10/06398 348/86 |
| 2006/0104479 A1* | 5/2006 | Bonch-Osmolovskiy .................. G06K 9/00355 382/103 |

(Continued)

FOREIGN PATENT DOCUMENTS

| AT | 513 130 A4 | 2/2014 |
| EP | 2 052 807 A1 | 4/2009 |

(Continued)

OTHER PUBLICATIONS

F. Nater, H. Grabner and L. Van Gool, "Unsupervised workflow discovery in industrial environments," 2011 IEEE International Conference on Computer Vision Workshops (ICCV Workshops), Barcelona, 2011, pp. 1912-1919, doi: 10.1109/ICCVW.2011.6130482. (Year: 2011).*

(Continued)

*Primary Examiner* — Marnie A Matt
(74) *Attorney, Agent, or Firm* — Oliff PLC

(57) ABSTRACT

A device for analyzing a worker's work state, the analysis involving generation of determination data for determining whether worker's manual work is performed in a predetermined work order. This device includes imaging and setting (Continued)

units. The imaging unit images, a work video, a worker's manual working state in which the worker repeatedly performs predetermined work. This predetermined work is performed by repeating a plurality of fundamental work operations by hand. Based on a predetermined motion which is previously set for each of the fundamental work operations, the setting unit sets delimitation information to delimit the work video every fundamental work operation at a timing when the predetermined motion is detected. In the device, a generation unit generates determination data which includes both the imaged work video and the set delimitation information. Based on the determination data, the worker's manual work can be analyzed in various ways.

8 Claims, 70 Drawing Sheets

(30) Foreign Application Priority Data

| Mar. 11, 2019 | (JP) | JP2019-043619 |
| Mar. 29, 2019 | (JP) | JP2019-065318 |
| Aug. 9, 2019 | (JP) | JP2019-147092 |

(58) Field of Classification Search
USPC .......................................................... 348/86
See application file for complete search history.

(56) References Cited

U.S. PATENT DOCUMENTS

| 2006/0249649 | A1* | 11/2006 | Volk | A47B 21/00 |
| | | | | 700/213 |
| 2009/0273668 | A1* | 11/2009 | Mirtich | G03B 7/087 |
| | | | | 348/86 |
| 2013/0070056 | A1* | 3/2013 | Tripathi | G06Q 10/06 |
| | | | | 348/46 |
| 2014/0083058 | A1* | 3/2014 | Issing | G09B 7/02 |
| | | | | 53/473 |
| 2019/0035087 | A1 | 1/2019 | Arao et al. | |
| 2019/0156496 | A1* | 5/2019 | Leduc | G06K 9/3241 |

FOREIGN PATENT DOCUMENTS

| JP | 2007-243846 A | 9/2007 |
| JP | 2008-108008 A | 5/2008 |
| JP | 2010-203820 A | 9/2010 |
| JP | 2010-211623 A | 9/2010 |
| JP | 2018-156279 A | 10/2018 |

OTHER PUBLICATIONS

J. W. Park and D. Y. Kim, "Standard Time Estimation of Manual Tasks via Similarity Measure of Unequal Scale Time Series," in IEEE Transactions on Human-Machine Systems, vol. 48, No. 3, pp. 241-251, Jun. 2018, doi: 10.1109/THMS.2017.2759809. (Year: 2018).*

* cited by examiner

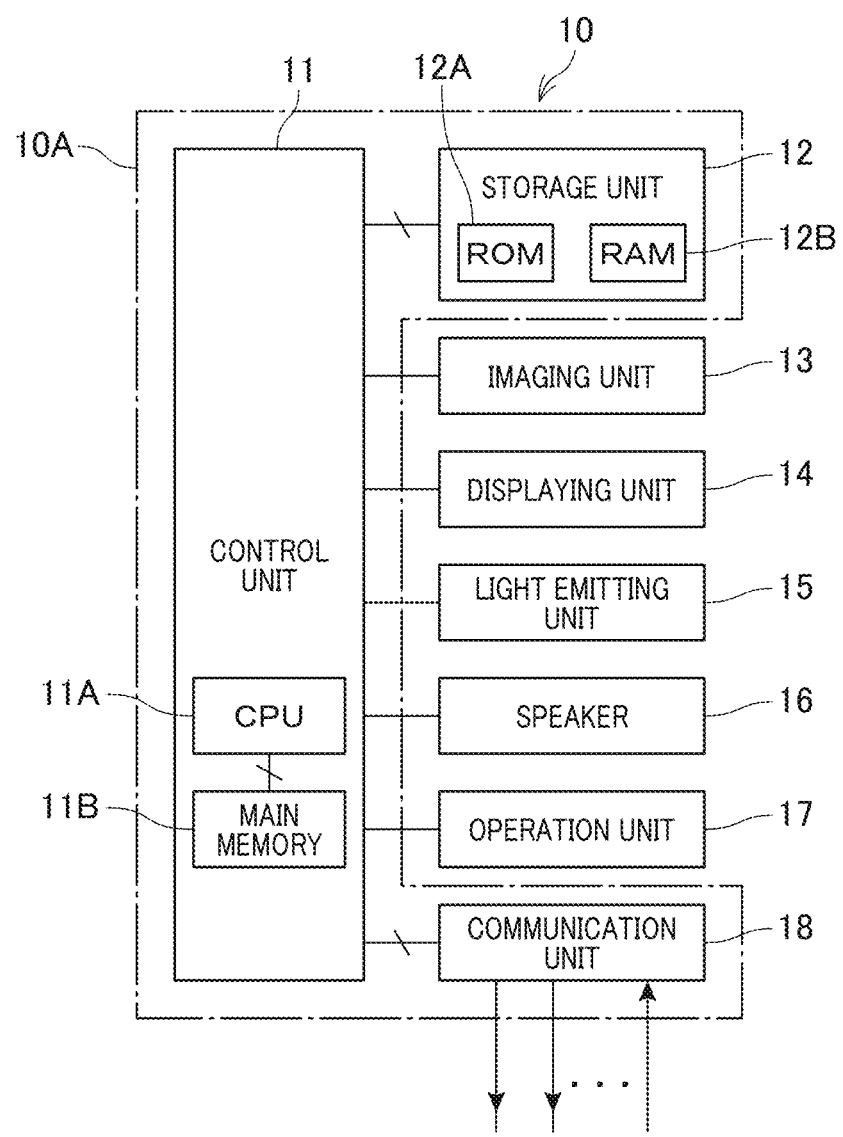

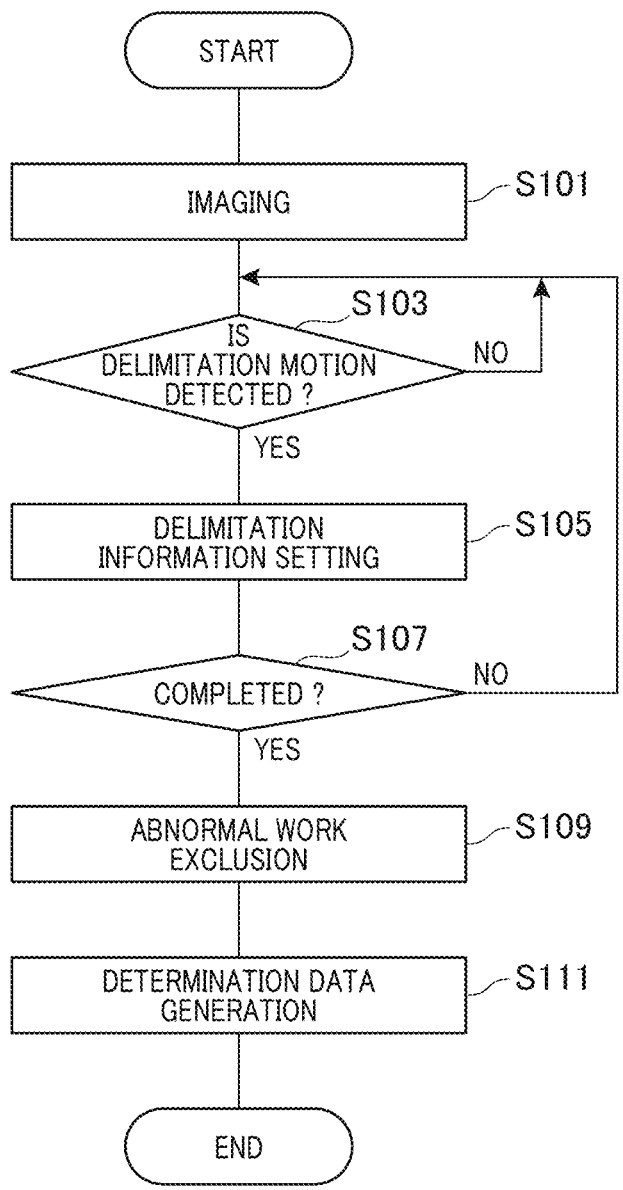

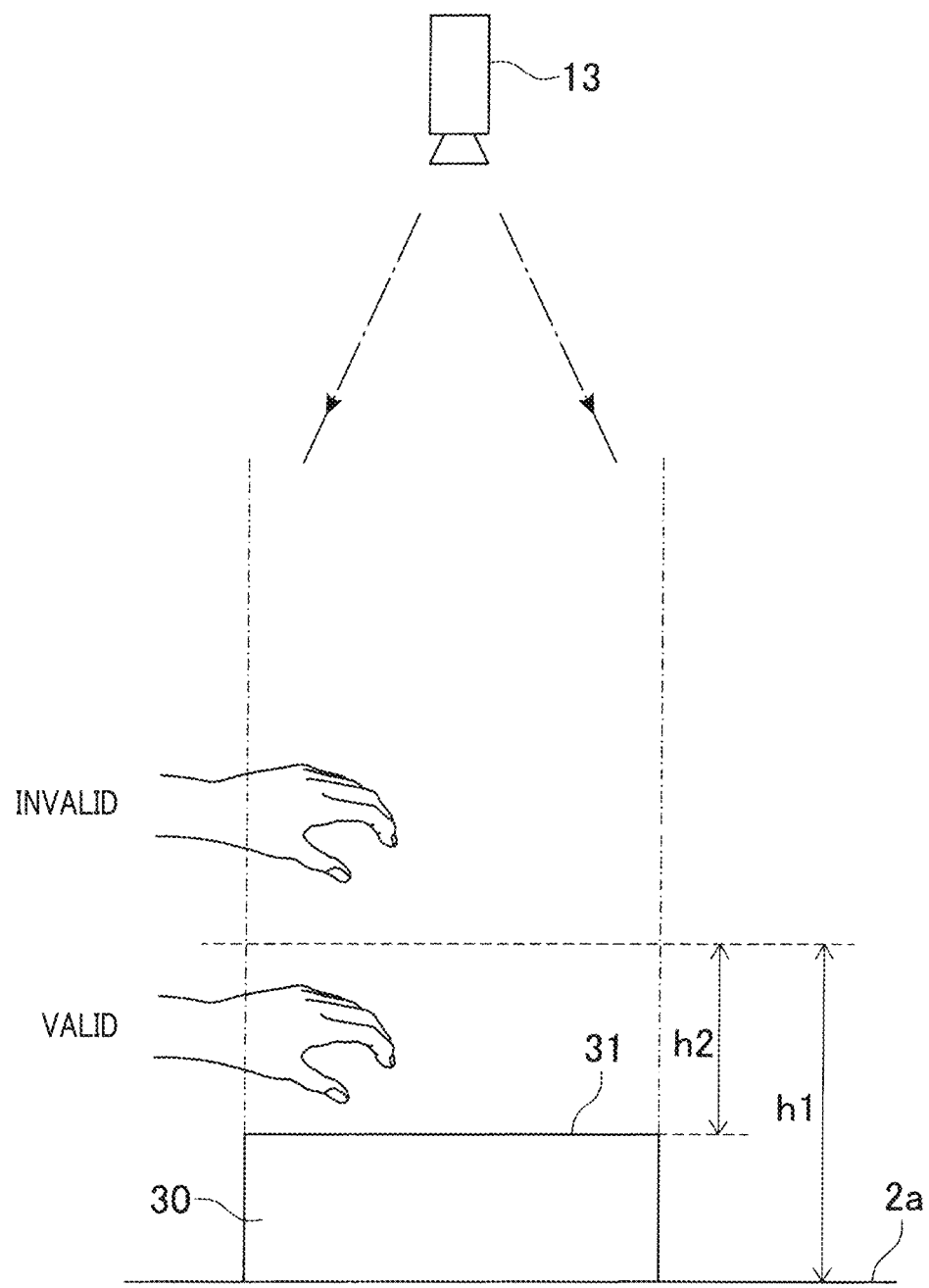

FIG.53

| TOTAL RELIABILITY | | SECOND RELIABILITY | | |
|---|---|---|---|---|
| | | High(3) | Mid(2) | Lo(0) |
| FIRST RELIABILITY | High(2) | 5 | 4 | 2 |
| | Mid(1) | 4 | 3 | 1 |
| | Lo(0) | 3 | 2 | 0 |

FIG.65
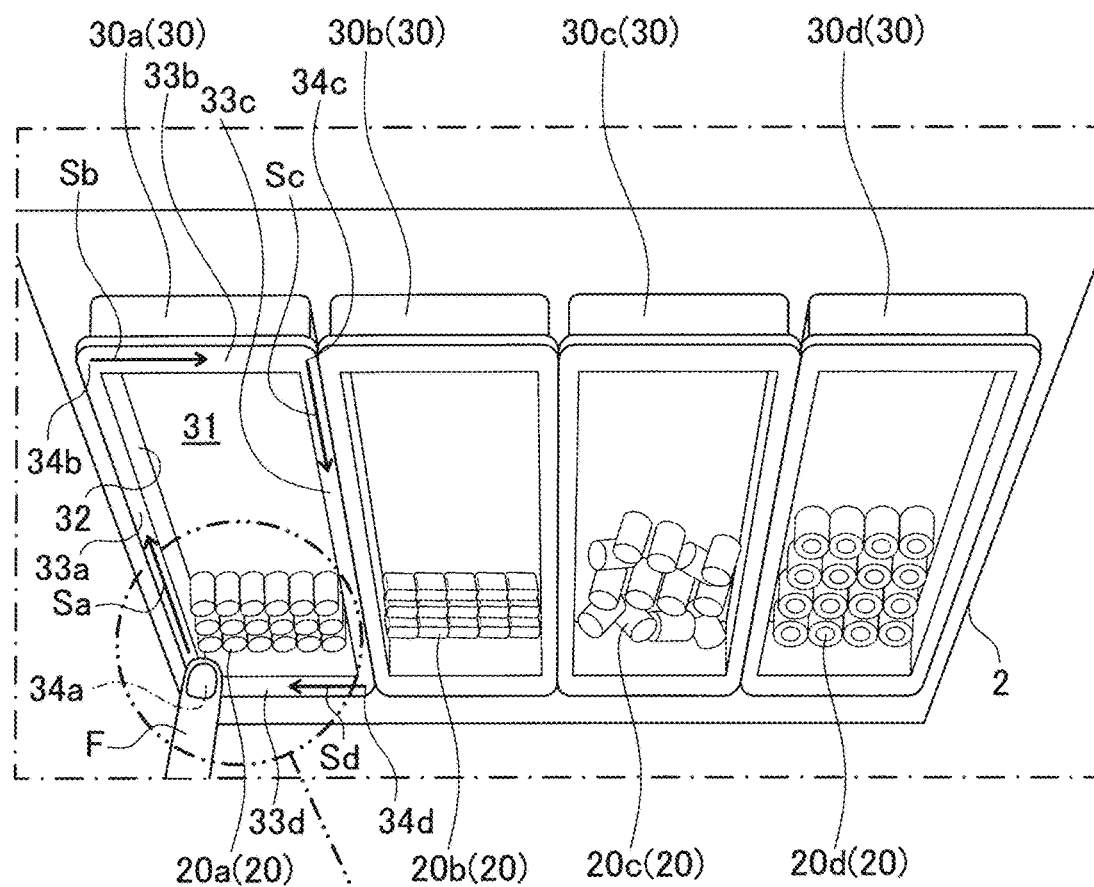
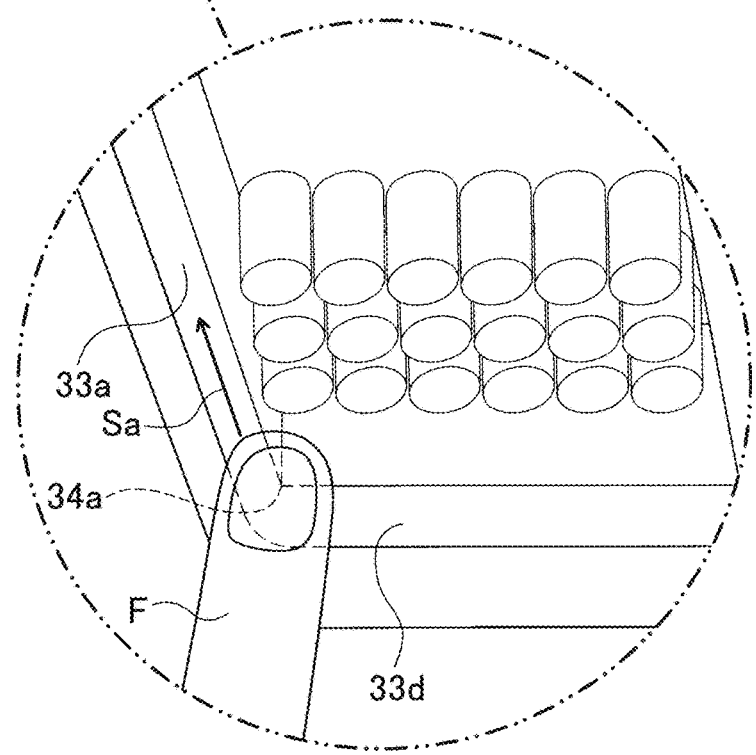

DEVICE AND METHOD FOR ANALYZING STATE OF MANUAL WORK BY WORKER, AND WORK ANALYSIS PROGRAM

CROSS-REFERENCE TO RELATED APPLICATION

This application is based on and claims the benefit of priority from earlier Japanese Patent Applications No. 2019-024072 filed on Feb. 14, 2019; No. 2019-035209 filed on Feb. 28, 2019; No. 2019-043619 filed on Mar. 11, 2019; No. 2019-065318 filed on Mar. 29, 2019; and No. 2019-147092 filed on Aug. 9, 2019 the descriptions of which are incorporated herein by reference.

BACKGROUND

Technical Field

The present disclosure relates to devices and methods for analyzing the state of manual work by a worker, for example, by generating determination data for determining whether or not the manual work is performed by a worker according to a predetermined procedure, and further relates to work analysis programs.

Related Art

There have been systems for supporting work by using determination data (annotation data) for determining whether or not correct work is performed. The determination data are obtained by acquiring a large number of video images of the worker performing the predetermined work such as assembling a plurality of parts to an assembly target such as a substrate, and analyzing the video images thus acquired.

For example, a work analysis device disclosed in JP 2017-134666 A is known as a technique related to generation of such annotation data. In the work analysis processing performed by the work analysis device, the work video image that is read is played back and displayed for analysis on the work analysis screen together with the measurement state display areas and the like. When the worker performs the delimitation operation by clicking a portion of the playback screen with a mouse during playback of the video image, a selection screen is displayed on the portion of the playback screen. In this display state, when the worker performs a selection operation by clicking any of the attribute information displayed on the selection screen with a mouse, the analysis data including the attribute information selected by the selection operation is associated with the video image range delimited by the delimitation operation, and recorded.

Further, at the manufacturing site, there may be a case where manual assembly work is performed on, for example, printed circuit boards or devices in the course of manufacturing. In order to improve work efficiency of such work, a method is known for performing work analysis by imaging predetermined repetitive work to generate a work video image for work analysis, and analyzing the generated work video image. For example, a moving pattern specifying device disclosed in JP 2008-108008 A is known as a technique related to such work analysis.

In the moving pattern specifying device, the moving trajectory of the markers respectively provided on the right hand and the left hand of the worker are obtained from the video image data as standard time series data. Among these standard time series data, points that can be regarded as candidates for delimiter of work are extracted as delimiter candidate points. When the delimiter position information indicating a delimiter position and the delimiter content information corresponding to the delimiter position are specified in response to an input instruction inputted from a user who has watched the video image data near the delimiter candidate point, the type of work and the start time and end time of the work can be specified on the basis of the information thus specified.

Moreover, in an image extraction analysis device disclosed in JP 2007-243846 A, images including specified image patterns are extracted from the video image obtained by imaging the work site, and the time intervals at which the images repeatedly appear are calculated. Then, the time intervals are grouped on the basis of the time intervals with substantially the same appearance frequency, and are displayed on the screen as a histogram. As the image and the time interval of the group specified by the user are displayed on the screen in accordance with the above display, the delimiter of the step is displayed together with the video image and time interval. Accordingly, without sequentially watching the video images obtained by imaging the work site, it is possible to easily grasp which work takes time in each step.

As described above, at the manufacturing site, there may be a case where manual assembly work is performed on, for example, printed circuit boards or devices in the course of manufacturing. Although such work is performed according to a predetermined work procedure, some parts may be missed to be assembled or wrong parts may be assembled since such work usually involves a plurality of steps, and, in the case of assembly work, a plurality of types of parts are assembled in general. Therefore, it has been proposed, for example in JP 2010-211623 A, to provide a detection unit such as a weight sensor on the parts box in order to determine whether or not a part taken out of the parts box is suitable for the work procedure.

In this case, when the work is performed on different products, the types and amount of parts to be assembled are also different. As a consequence, there are problems that providing the above detection unit on the parts box increases the facility cost in proportion to the amount of parts, and that a great deal of labor is required for installation of the detection unit and association with the work procedure. In order solve the problems, for example, a work support device disclosed in JP 2018-156279 A is known. In this work support device, a monitoring area, which is a range for monitoring the work, is set in the imaging range of the imaging unit by input operation according to the work procedure. Then, a portion corresponding to the monitoring area of the acquired image is compared with a portion corresponding to the monitoring area in another image that is acquired before the above image to perform dynamic detection for the monitoring area. On the basis of the result of dynamic detection, it is determined whether or not the work procedure has been followed, and the determination result is notified to the worker.

In the work analysis device disclosed in JP 2017-134666 A, after a video image of the repetitive predetermined work, in which a plurality of fundamental work operations (in this publication, simply referred to as "operations") are repeatedly performed in a predetermined order, is acquired, an operation such as clicking a portion of the playback screen is required for the worker or the like watching the playback of the video image. JP 2017-134666 A describes that the "work" is a set of "a plurality of operations" which are performed as worker's manual operations under a previously planned schedule or a specified object.

For this reason, the worker or the like cannot delimit the video image range for each fundamental work operation unless without watching the whole video image, which is burdensome for the worker. In particular, when there are an increased number of types of fundamental work operations and an increased number of repetition of the predetermined work, the above problem becomes more apparent. Further, since it is necessary to perform an operation in parallel with watching the playback of the video image after the video image of the repetition of the predetermined work is obtained, there is a first problem that annotation data cannot be generated in parallel with acquiring the video image of the predetermined work.

In addition, for example, when the work to be analyzed is to assemble the parts accommodated in the parts box to an assembly target, the work video image can be delimited for each fundamental work operation by determining when a part is taken out of the parts box. However, for example, if the parts to be taken out from the parts box are small, the determination whether the part has been taken out of the parts box or not becomes ambiguous, leading to a reduced accuracy in delimitation of the work video image.

Furthermore, according to the work support device disclosed in JP 2018-156279 A, in setting of the monitoring areas corresponding to the respective parts boxes, the worker is required to perform the work of drawing a frame surrounding the parts box in the image by using a wireless mouse while checking the position of the parts box in the image acquired by the imaging unit. This is because the monitoring areas cannot be set in advance since the types and amount of the parts boxes as well as the positions of the parts boxes may vary depending on the manufacturing lot. As a consequence, since the worker must operate a wireless mouse in parallel with watching the screen for each manufacturing lot, there is a second problem that an initial setting work for setting the monitoring areas is time-consuming, and a wrong monitoring area may be set due to an operation error of the worker or the like.

SUMMARY

The present disclosure is basically directed to analyze the state of work manually performed by the worker, for example, part assembly work (manual work), in more efficient and more accurate manner. Particularly, in addition to the above basic object, a first object of the present disclosure is to generate determination data (work video image) for determining whether or not the work (manual work) manually performed by the worker follows a predetermined procedure.

Further, in addition to the above basic object, a second object of the present disclosure is to set a monitoring area easily and correctly without imposing a work burden on the worker.

In order to achieve the first object, an exemplary embodiment of the first mode relates to a work analysis device which generates determination data for determining whether or not a worker's manual work is now repeatedly performed according to a predetermined work procedure, the work analysis device comprising:

an imaging unit imaging, as a work video, a state where a plurality of fundamental work operations are performed repeatedly and manually in a predetermined order by the worker;

a setting unit setting delimitation information for delimiting the work video at detection timings at each of which a predetermined motion is detected, based on the predetermined motion which is previously set for each of the fundamental work operations; and a generation unit generating the determination data which includes both the work video and the delimitation information.

In the present disclosure, when it is assumed that target work (or task) is performed under a predetermined plan, the target work is segmentalized into a plurality of elemental work operations, which can be called fundamental work operations. When assuming a simple target work (task) that parts are assembled to a printed circuit board, collecting parts from a parts box, arranging the collected parts at an assembly position on the board, or others correspond to fundamental work operations. For this reason, the "fundamental work operation" can be defined according to conditions or attributions of different work Hence, in the foregoing basic configuration, worker's predetermined motions for the fundamental work operations are optically imaged. Only this imaging makes it possible to automatically delimit the work video every fundamental work operation. Hence, determination data which are for determining whether or not the "correct" work (or operation) according to the previously set work order can be generated in real time based on the work video. For this reason, the state of various types of manual work, such as assembly of parts to an assembly target by hand, can be analyzed more efficiently and accurately.

Besides the foregoing work analysis device, there is also provided a method of analyzing the work involving a plurality of fundamental work operations which are performed manually by the worker. The method includes steps functionally equivalent to the components of the work analysis devices.

In order to achieve the first object, an exemplary embodiment of the second mode relates to a work analysis device which generates a work video for a work analysis by repeatedly imaging a predetermined work in which a plurality of fundamental work operations are repeatedly performed with worker's manual work in a predetermined order, the device comprising:

an imaging unit imaging the predetermined work repeatedly performed by the worker;

a monitoring area setting unit setting a plurality of monitoring areas including a first monitoring area for detecting a first operation among the fundamental work operations and a second operation among the fundamental work operations, for each of the fundamental work operations in an imaging range of the imaging unit;

a reliability setting unit setting, for each of the monitoring areas, reliability such that the reliability increases with an increase in a possibility that a motion related to the fundamental work operations is performed in the monitoring area, based on a comparison made between a portion corresponding to the monitoring area in an image captured by the imaging unit and a portion corresponding to the monitoring area in a further image captured by the imaging unit, the further image being captured prior to the image;

a determination unit determining whether or not a mutually corresponding fundamental work operation among the fundamental work operations is performed, based on the reliabilities which are set to the first and second monitoring areas; and a delimitation information setting unit setting delimitation information which enables a work video imaged by the imaging unit to be delimited every fundamental work operation determined to be perfumed by the determination unit, based on at least one of a timing at which the image for setting the reliability is set for the first monitoring area and a timing at which the image for setting the reliability is set for the second monitoring area.

According to this configuration, for each of the first and second monitoring areas, reliability is set based on a comparison made between a portion corresponding to the monitoring area in an image captured by the imaging unit and a portion corresponding to the monitoring area in a further image captured by the imaging unit, the further image being captured prior to the image. Hence, the accuracy of determining the fundamental work operations can be raised, thereby realizing delimitation of the work video in a higher accuracy. This will lead to a more efficient and accurate analysis of the manual work.

In order to achieve the second object, an exemplary embodiment of the third mode relates to a work support device which supports work performed in a predetermined work procedure, the work involving taking out parts accommodated in a plurality of parts boxes, the device comprising:
  an imaging unit;
  a monitoring area setting unit setting monitoring areas respectively to the parts boxes within an imaging range of the imaging unit;
  a detection section detecting a worker's taking action of the parts from each of the parts boxes, based on a comparison made between a portion corresponding to the monitoring area in a designated image captured by the imaging unit and a portion corresponding to the monitoring area in a further image captured by the imaging unit, the further image being captured prior to the designated image;
  a determination unit determining whether or not the work according to the predetermined work procedure is performed, based on a detection result provided by the detection section; and
  a notification unit notifying the worker of a determined result provided by the determination unit,
  wherein the monitoring area setting unit is configured to set, based on an image captured by the imaging unit, the monitoring areas every one of the parts boxes, the monitoring areas corresponding to the parts boxes which are moved in a predetermined movement state, when the parts boxes are individually moved in the predetermined movement state.

In this configuration, the worker moves the parts boxes in a predetermined movement state before the work for example, and the monitoring area for each parts box can be set easily. There is no need to operate the mouse on a display like a conventional manner, thus lighting worker's work burden. Hence, the monitoring areas can be set more easily and accurately, thus improving a work analysis in terms of efficiency and accuracy.

In order to achieve the second object, an exemplary embodiment of the fourth mode relates to a work support device which supports work performed in a predetermined work procedure, the work involving taking out parts accommodated in a plurality of parts boxes, the device comprising:
  an imaging unit;
  a monitoring area setting unit setting monitoring areas respectively to the parts boxes within an imaging range of the imaging unit;
  a detection section detecting a worker's taking action of the parts from each of the parts boxes, based on a comparison made between a portion corresponding to the monitoring area in a designated image captured by the imaging unit and a portion corresponding to the monitoring area in a further image captured by the imaging unit, the further image being captured prior to the designated image;
  a determination unit determining whether or not the work according to the predetermined work procedure is performed, based on a detection result provided by the detection section; and
  a notification unit notifying the worker of a determined result provided by the determination unit, wherein
  each of the parts boxes has a peripheral wall having an upper end face, the upper end face being formed into a polygonal ring shape with a plurality of corners, and
  the monitoring area setting unit is configured to i) detect a boundary in an image captured by the imaging unit, the boundary starting from a stat point designed by a worker's finger touched to one of the corners, extending along line segments of the polygonal ring shape with a turn at each of a plurality of intersections configured by two of the corners, and return to the start point, and ii) set a polygonal ring shaped area surrounded by the boundary as the monitoring area for each of the parts boxes.

Hence, before the manual work, the worker can touch his or her finger to one corner on the upper end face of the peripheral wall of each parts box under imaging of the imaging unit. This simple action enables setting of the monitoring area for each parts box. Accordingly, similarly to the foregoing advantages, there is no need to operate the mouse on a display like a conventional manner, thus lighting worker's work burden. Hence, the monitoring areas can be set more easily and accurately, thus improving a work analysis in terms of efficiency and accuracy.

BRIEF DESCRIPTION OF THE DRAWINGS

In the accompanying drawings:

FIG. 3 is a block diagram illustrating an electric configuration of a work analysis device.

FIG. 6 is a flowchart illustrating the order of execution in work analysis processing performed by a control unit.

FIG. 16 is a view illustrating a height state in which detection of a delimitation motion is valid and a height state in which detection of a delimitation motion is invalid in the fifth embodiment.

FIG. 17A is a view illustrating a state in which a part 20a is taken out of a part box 30a.

FIG. 53 is a diagram illustrating a total reliability set on the basis of the first reliability and the second reliability.

FIG. 65 is a view illustrating that a search target is switched with a corner where a finger in a stationary state touches being taken as a start point.

DETAILED DESCRIPTION OF THE PREFERRED EMBODIMENTS

With reference to the accompanying drawings, various embodiments will now be described.

First Embodiment

The following description will be given of devices and methods (work analysis devices and work analysis methods) for analyzing information on whether or not the manual work by the worker is performed according to a predetermined procedure, that is, whether or not the manual work is "correctly" performed, as well as obtaining information indicative of the state of the manual work. The description will be further given of various modes of work analysis programs for computers for implementing these devices and methods.

In the embodiments described herein, configurations and operations of the work analysis device will be described, and, in connection with this description, work analysis methods and work analysis programs will also be described. With reference to the drawings, a first embodiment in which a work analysis device is implemented will now be described.

Figure 1:
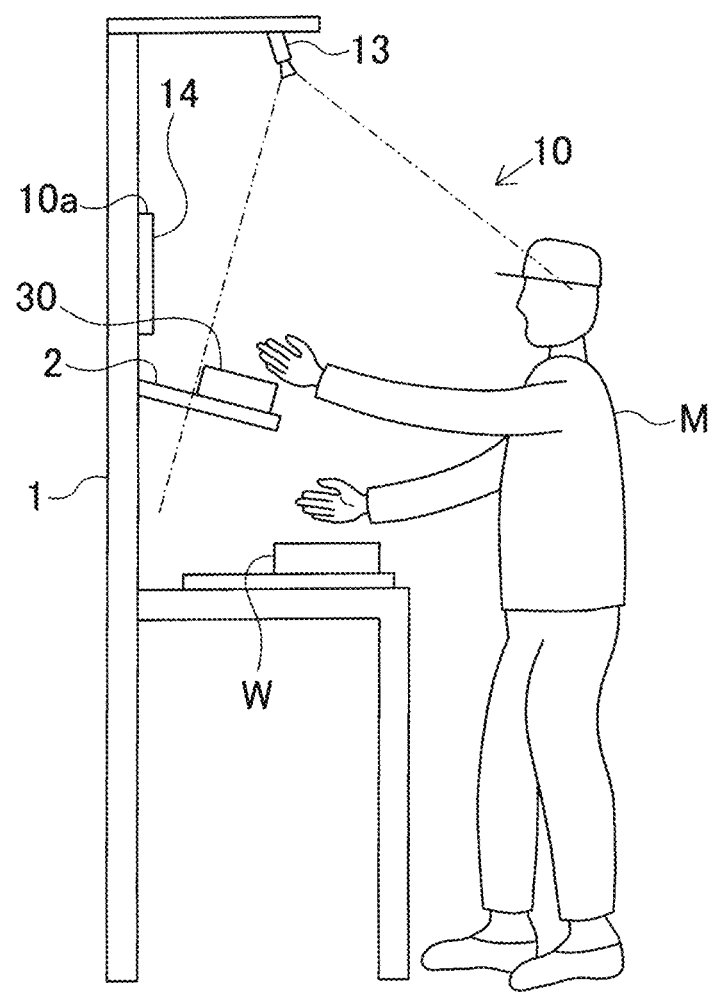
FIG. 1 is a view illustrating a schematic configuration of a work analysis device according to a first embodiment.

As shown in FIG. 1, a work analysis device 10 according to the present embodiment is provided on a work table 1 or the like. The work analysis device 10 is configured to acquire a work video image of predetermined manual work, in which a plurality of fundamental work operations are performed in a predetermined order, repeatedly performed by a worker M, and generate determination data (annotation data) for determining whether or not the manual work is performed according to the predetermined order (i.e., correct procedure) for each fundamental work operation on the basis of the work video image. That is, the determination data is generated by setting delimitation information for delimiting the work video image for each fundamental work operation, in which the predetermined manual work is repeated. Thus, a plurality of video image ranges in which respective fundamental work operations are imaged can be extracted from a determination data.

On the work table 1, manual assembly work is performed by the worker. An assembly target (hereinafter, also simply referred to as a workpiece W) such as a printed circuit board is transported and placed on the work table 1. The work table 1 has a shelf 2 on which a plurality of parts box 30 are horizontally arranged side by side as viewed from the worker M.

Figure 2:
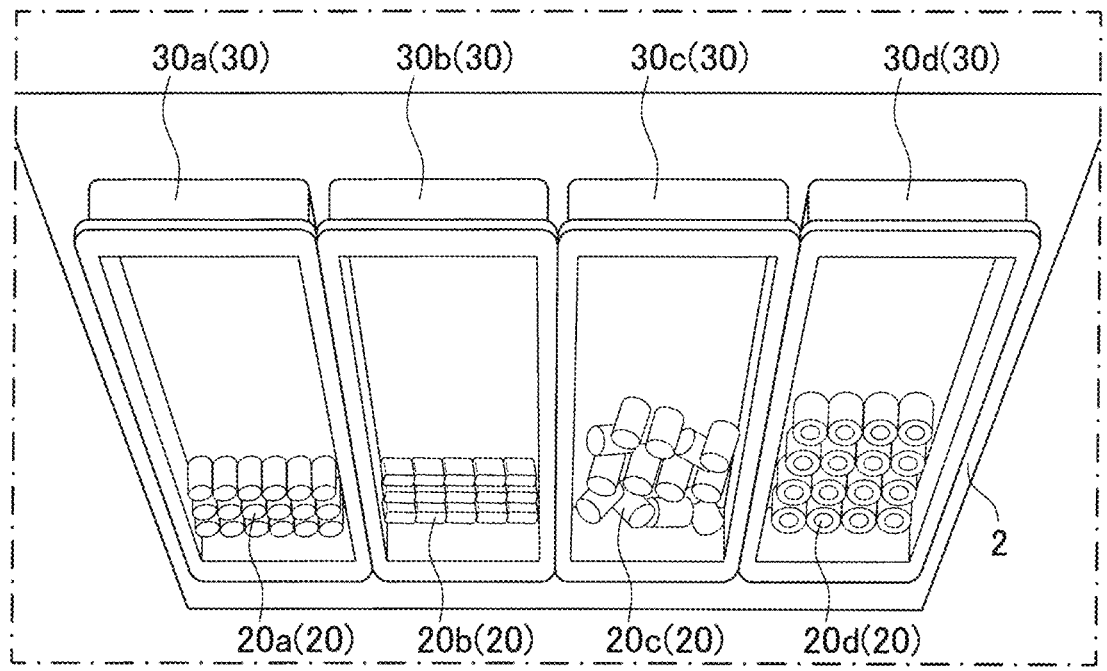
FIG. 2 is a view illustrating an imaging state in which respective parts boxes are imaged.

The respective parts box 30 contain different types of parts 20 to be assembled to the workpiece W. As shown in FIG. 2, in the present embodiment, four parts boxes 30a to 30d are arranged side by side on the shelf 2 such that the parts box 30a contains parts 20a, the parts box 30b contains parts 20b, the parts box 30c contains parts 20c, and the parts box 30d contains parts 20d. FIG. 2 is an enlarged view of a portion near the parts boxes 30a to 30d in an image captured by an imaging unit 13, which will be described later. It should be noted that the term "parts box" is merely an example name, and a variety of names may be used in different factories. In this example, various names such as parts case, parts container, parts basket, and parts bag are collectively referred to as a parts box.

As shown in FIGS. 1 and 3, the work analysis device 10 includes a control unit 11, a storage unit 12, an imaging unit 13, a displaying unit 14, a light emitting unit 15, a speaker 16, an operation unit 17, a communication unit 18, and the like. Among these, the control unit 11, the storage unit 12, and the communication unit 18 constitute a processor 10A.

The control unit 11 is mainly composed of a computer having a CPU (central processing unit) 11A, which is mainly responsible for arithmetic operations, and a main memory 11B as a work area, and performs overall control of the work analysis device 10 and various calculations as well as work analysis processing as described later. The storage unit 12 includes known storage media such as an HDD (not shown) and a non-volatile memory, as necessary, in addition to a ROM (read only memory (e.g., EEPROM)) 12A and a RAM (random access memory) 12B. Further, application programs (hereinafter, also referred to as work analysis programs), a predetermined database, and the like for performing work analysis processing are pre-stored and available for the control unit 11 (that is, CPU 11A).

In the present embodiment, the ROM 12A functions as a non-transitory computer-readable recording medium, and stores procedures for the above application programs and other control and processing programs as source codes. The non-transitory computer-readable recording medium may also be a RAM of a type in which stored information is not lost.

The program is read out by the CPU 11A into a preset work area 11B for execution. The RAM 12B is configured to temporarily store the data which are being processed by the CPU 11A. Further, the main memory 11B is composed of a RAM.

It should be noted that the configuration of the processor 10A is merely an example, and any configuration may also be used as long as it can execute programs for required work analysis, control, and processing. For example, a configuration which includes a plurality of CPUs for performing distributed control or establishing a redundant system may also be used. The CPU 11A is an element that is mainly responsible for performing arithmetic calculations in the computer system, and may also have a different name as long as it has a similar function (for example, an arithmetic unit).

The imaging unit 13 is configured as a camera having a light receiving sensor (for example, C-MOS area sensor or CCD area sensor). In the present embodiment, the imaging unit 13 is separately provided from a device main body 10a which includes the control unit 11 (CPU 11A), the displaying unit 14, and the like, and is disposed in an upper part of the work table 1 so as to acquire a video image of the respective states of the parts boxes 30a to 30d and the workpiece W in addition to the work state by the worker M. In the present embodiment, the imaging unit 13 is configured to acquire a video image (sequence of still images), for example, at 30 frame per second, and store the acquired video image in the storage unit 12 so as to be analyzed by the control unit 11.

The displaying unit 14 is a liquid crystal display, for example, and is controlled by the control unit 11 (CPU 11A) to display an image acquired by the imaging unit 13, predetermined information, and the like. The device main body 10a is mounted on a rear plate or the like of the work table 1 so that the worker M can see the display screen of the displaying unit 14.

The light emitting unit 15 includes an LED, for example, and is controlled by the control unit 11 (CPU 11A) and to control the color of emitted light and lighting and flashing states. The light emitting unit 15 is disposed at a position that can be seen by the worker M. The speaker 16 is formed of a known speaker or the like, and is controlled by the control unit 11 to emit a predetermined sound and various notification sounds such as an alarm sound.

The operation unit 17 is configured to output an operation signal corresponding to a manual input operation from an operator to the control unit 11. Upon receiving the operation signal, the control unit 11 (CPU 11A) performs processing corresponding to the inputted operation. The communication unit 18 is configured as a communication interface that performs data communication with an external device such as a higher level device, and configured to cooperate with the control unit 11 to perform communication.

The following description will be given of the work analysis processing performed on the basis of the work analysis program, which is performed by the control unit 11 (CPU 11A), when the worker M performs predetermined manual work by which parts contained in a plurality of parts boxes are individually assembled to the workpiece W according to a work procedure of a predetermined manual work.

In the present embodiment, the predetermined manual work (hereinafter, also simply referred to as a "work (target work or target task)") to be analyzed is the work including a fundamental work operation A of assembling the part 20a in the parts box 30a to the workpiece W, a fundamental work operation B of assembling the part 20b in the parts box 30b to the workpiece W, a fundamental work operation C of assembling the part 20c in the parts box 30c to the workpiece W, and a fundamental work operation D of assembling the part 20d in the parts box 30d to the workpiece W in this order.

Figure 4A:
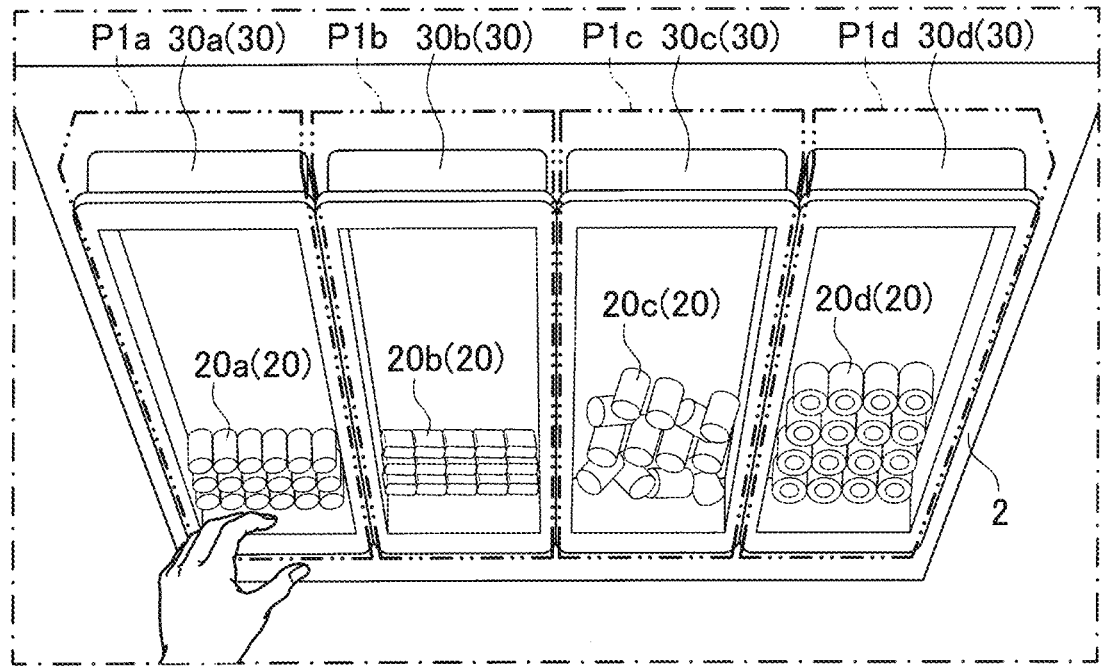
FIG. 4A is a view illustrating a delimitation motion of a fundamental work operation A in the first embodiment.
Figure 4B:
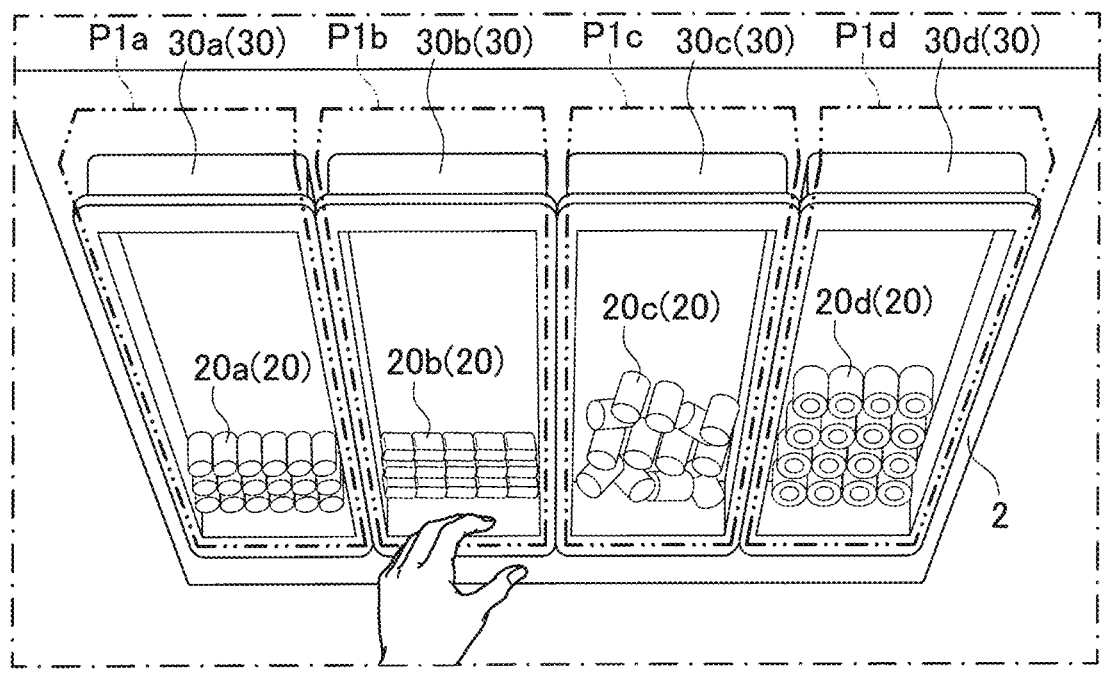
FIG. 4B is a view illustrating a delimitation motion of a fundamental work operation B in the first embodiment.
Figure 5A:
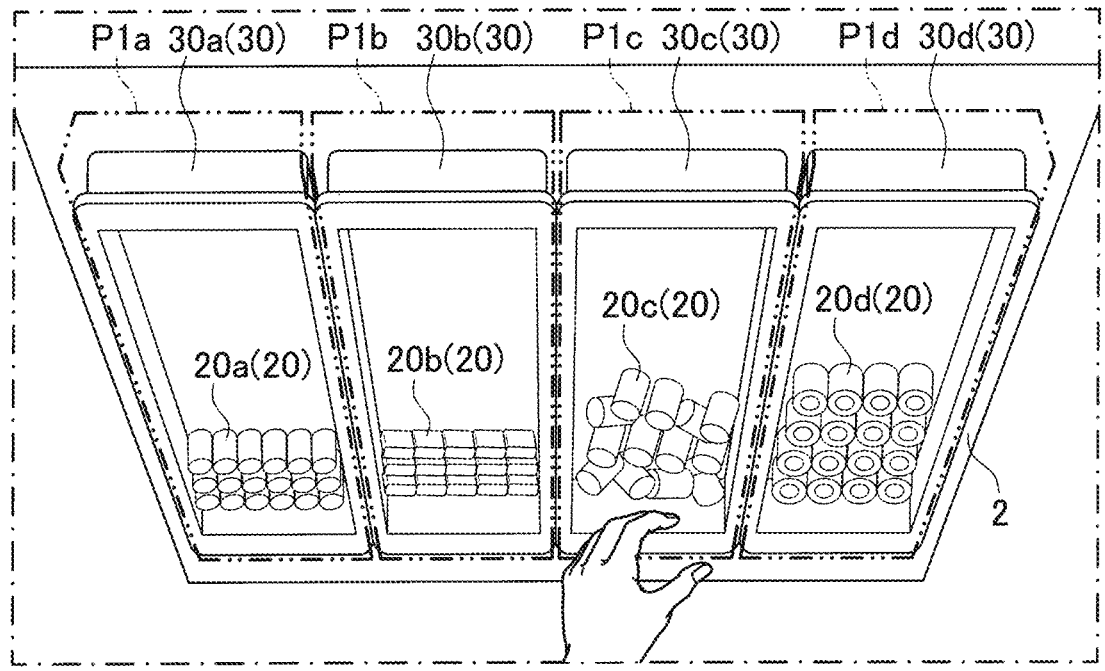
FIG. 5A is a view illustrating a delimitation motion of a fundamental work operation C in the first embodiment.
Figure 5B:
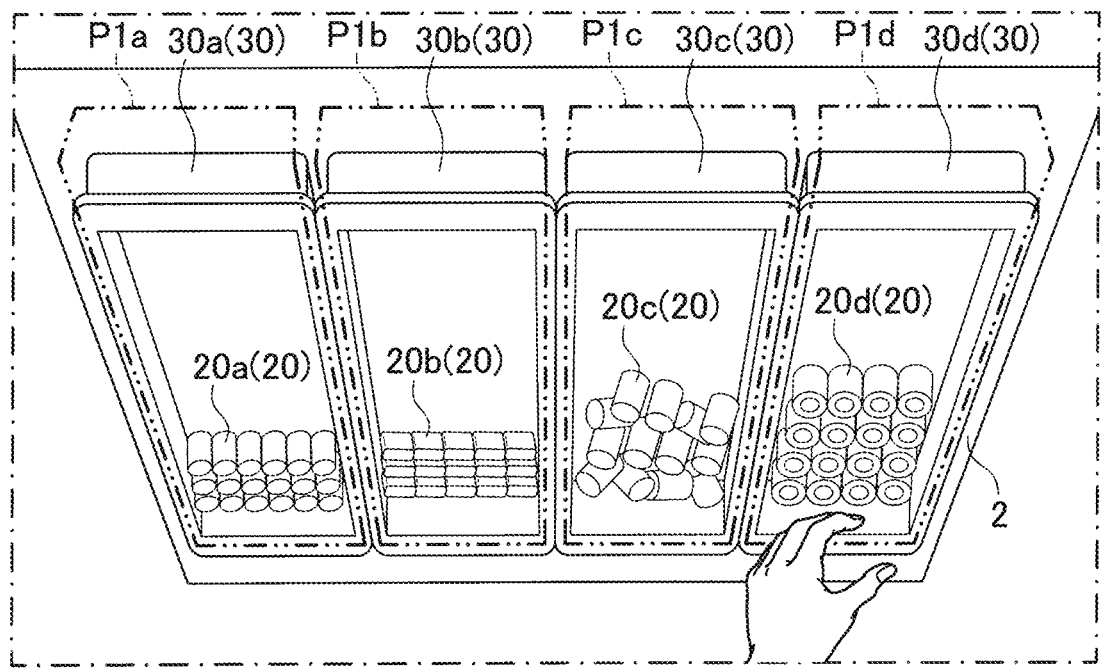
FIG. 5B is a view illustrating a delimitation motion of a fundamental work operation D in the first embodiment.

In the work analysis processing, on the basis of a predetermined motion (hereinafter, also referred to as a delimitation motion) which is preset for each fundamental work operation, determination data is generated to set delimitation information for delimiting the work video image acquired by the imaging unit 13 by each fundamental work operation at a timing when the delimitation motion is detected. In the present embodiment, a range corresponding to the parts box 30a in the imaging range by the imaging unit 13 is preset as a monitoring area P1a. As shown in FIG. 4A, a motion that the hand of the worker M enters the monitoring area P1a is set as the delimitation motion for the fundamental work operation A. Similarly, ranges corresponding to the parts boxes 30b to 30d in the imaging range by the imaging unit 13 are preset as monitoring areas P1b to P1d, respectively. As shown in FIG. 4B, a motion that the hand of the worker M enters the monitoring area P1b is set as the delimitation motion for the fundamental work operation B. As shown in FIG. 5A, a motion that the hand of the worker M enters the monitoring area P1c is set as the delimitation motion for the fundamental work operation C. As shown in FIG. 5B, a motion that the hand of the worker M enters the monitoring area P1d is set as the delimitation motion for the fundamental work operation D. FIGS. 4 and 5 illustrate enlarged views of the respective ranges corresponding to the parts boxes 30a to 30d in the imaging range by the imaging unit 13.

As can be understood, in the present embodiment, the fundamental work operation (or unit work operation) shows each of the elemental woke operations required to perform a target work (task). In the present embodiment, worker's actions for the work, which can be delimited by events at each of which a worker's hand enters the monitoring area set for each of the parts boxes, is called the fundamental work operation.

The monitoring areas P1a to P1d can be set as standard ranges, for example, by placing the parts boxes 30a to 30d in position, or may be set on the basis of the image difference generated by continuously capturing the parts boxes 30a to 30d while they are individually swinging.

Hereinafter, referring to a flowchart of FIG. 6, the work analysis processing performed by the control unit 11 (CPU 11A) will be described in detail.

The control unit 11 (CPU 11A) starts the work analysis processing when a predetermined start operation is performed to the operation unit 17. In the imaging at step S101 shown in FIG. 6, a work video image of the worker M is acquired by the imaging unit 13. When any of the above delimitation motions is detected while the work video image is being acquired, it is determined as "Yes" in the determination process at step S103. Then, in the delimitation information setting at step S105, the delimitation information for delimiting the work video image at the above detection timing is set. The delimitation information can include a fundamental work operation name specified by the delimitation motion, information on the detection time, and the like. When a predetermined completion operation is not performed (No at S107), the steps from step S103 onward are repeated. Further, the control unit 11 that performs the above delimitation information setting can correspond to an example of a "setting unit."

By repeating the steps from step S103 onward, the delimitation information is set for each fundamental work operation. Thus, the detection results of work delimitation shown in FIG. 7 can be obtained. For example, in the kth cycle shown in FIG. 7, when a motion by which the hand of the worker M enters the monitoring area P1a is detected at a time t1, the time t1 is set as a start timing of the fundamental work operation A. Then, when a motion by which the hand of the worker M enters the monitoring area P1b is detected at a time t2, the time t2 is set as a start timing of the fundamental work operation B and also as an end timing of the fundamental work operation A. Similarly, when a motion by which the hand of the worker M enters the monitoring area P1c is detected at a time t3, the time t3 is set as a start timing of the fundamental work operation C and also as an end timing of the fundamental work operation B. Further, when a motion by which the hand of the worker M enters the monitoring area Ptd is detected at a time t4, the time t4 is set as a start timing of the fundamental work operation D and also as an end timing of the fundamental work operation C. Further, when a motion by which the hand of the worker M enters the monitoring area P1a is detected at a time t5, the time t5 is set as a start timing of the fundamental work operation A in the (k+1)th cycle and also as an end timing of the fundamental work operation D in the kth cycle.

When a necessary work video image in which the delimitation information is set is obtained and thus a completion operation is performed (Yes at step S107 shown in FIG. 6), an abnormal work exclusion is performed at step S109. In the step S109, on the basis of the delimitation information set as described above, a fundamental work operation presumed to be abnormal is excluded from the determination data.

Specifically, at step S109, a normal range of work time, which is regarded as normal work, is calculated on the basis of the average work time calculated from the delimitation information which is set for each fundamental work operation to automatically exclude the fundamental work operation whose work time is not within the normal range of work time. In the example shown in FIG. 7, since the work time of the fundamental work operation B in the n1 cycle is out of the normal range of work time, the fundamental work operation B in the n1 cycle is excluded from the determination data. Specifically, when the width between tnbs, which represents the work time of the fundamental work operation B, is larger than th, which represents a normal range of work time, the fundamental work operation B is excluded from the determination data.

Figure 7:
FIG. 7 is a view illustrating work delimitation detection results in which delimitation information is set for each fundamental work operation.

For example, on the basis of the set delimitation information, a fundamental work operation immediately before the fundamental work operation that has been performed in an order different from a predetermined order is automatically excluded. In the present embodiment, a predetermined order refers to, for example, that the fundamental work operations are performed in the order of the fundamental work operation A, the fundamental work operation B, the fundamental work operation C, and the fundamental work operation D. In the example of FIG. 7, the fundamental work operation C in the n2 cycle is performed following the fundamental work operation A, which is different from the predetermined order. In this case, the fundamental work operation A in the n2 cycle immediately before the fundamental work operation C in the n2 cycle is excluded from the determination data. Since the delimitation motion of the fundamental work operation B actually performed following the fundamental work operation A cannot be detected for some reason, the work video image of the fundamental work operation B may be included in the work video image delimited as the fundamental work operation A. Accordingly, the fundamental work operation A immediately before the fundamental work operation C performed in an order different from the predetermined is excluded from the determination data.

When the fundamental work operation presumed to be abnormal is excluded as described above, the determination data generation is performed at step S111 of FIG. 6 to generate the determination data (annotation data) including the delimitation information corresponding to the video image of the remaining fundamental work operation, which is regarded as normal work and has not been excluded. The determination data thus generated is stored in the storage unit 12, and transmitted to a higher level device or the like via the communication unit 18 as necessary. In addition, the data related to the fundamental work operation presumed to be abnormal may also be separately stored as abnormal data in the storage unit 12 as the data to be used for learning an abnormal behavior or the like. Further, the control unit 11 that performs the abnormal work exclusion and the determination data generation can correspond to an example of a "generation unit."

As described above, in the work analysis device 10 according to the present embodiment, on the basis of a delimitation motion (predetermined motion) which is preset for each fundamental work operation, delimitation information is generated to delimitate the work video acquired by the imaging unit 13 for each fundamental work operation at a timing when the delimitation motion is detected, and determination data is generated to include the work video image acquired by the imaging unit 13 and the set delimitation information.

Accordingly, the work video image can be automatically delimited for each fundamental work operation by simply acquiring the delimitation motion that is performed for each fundamental work operation by the worker M. Accordingly, the determination data for determining whether or not the correct work is performed can be generated in real time on the basis of the work video image obtained by imaging the predetermined work repeatedly performed.

In particular, in the present embodiment, a fundamental work operation is assembling a part 20, which has been taken out of the parts box 30 associated with the fundamental work operation, to the workpiece (assembly target) W, and the delimitation motion described above is a motion of taking out the part 20 from the parts box 30. Since the work video image can be delimited at the detection timing of the motion that is essential for the fundamental work operation, there is no need of forcing a motion irrelevant to the intended fundamental work operation. Accordingly, in generation of the determination data, a work burden on the worker M can be reduced.

Further, in the abnormal work exclusion and the determination data generation described above, a normal range of work time, which is regarded as normal work, is calculated for each fundamental work operation on the basis of the set delimitation information, and the fundamental work operation whose work time is within the normal range of work time is generated as the determination data. Accordingly, the video image of the fundamental work operation that is regarded as normal work in view of the work time can be automatically taken as determination data, which contributes to improvement in reliability of determination data. On the other hand, in the abnormal work exclusion and the determination data generation described above, the determination data is generated to exclude the fundamental work operation whose work time is out of the normal range of work time. Accordingly, the video image of the fundamental work operation that is not regarded as normal work can be automatically excluded from determination data, which contributes to improvement in reliability of determination data.

Therefore, the state of work manually performed by the worker, for example, part assembly work (manual work), can be analyzed in more efficient and more accurate manner.

Furthermore, in the abnormal work exclusion and the determination data generation described above, the determination data is generated to exclude a fundamental work operation immediately before the fundamental work operation that has been performed in an order different from a predetermined order on the basis of the set delimitation information. Since the video image of the fundamental work operation that is not regarded as normal work is thus automatically excluded from determination data, the reliability of determination data can be improved.

Second Embodiment

With reference to the drawings, a work analysis device and a work analysis program according to a second embodiment will now be described.

The second embodiment mainly differs from the aforementioned first embodiment in that the delimitation motion is a motion of transferring a part to the assembly position in the assembly target. The components which are substantially the same as those of the first embodiment are denoted by the same reference signs, and the description thereof will be omitted.

In the present embodiment, the predetermined work to be analyzed is, as with the first embodiment described above, the work including a fundamental work operation A of assembling the part 20a in the parts box 30a to the workpiece W, a fundamental work operation B of assembling the part 20b in the parts box 30b to the workpiece W, a fundamental work operation C of assembling the part 20c in the parts box 30c to the workpiece W, and a fundamental work operation D of assembling the part 20d in the parts box 30d to the workpiece W in this order.

Figure 8:
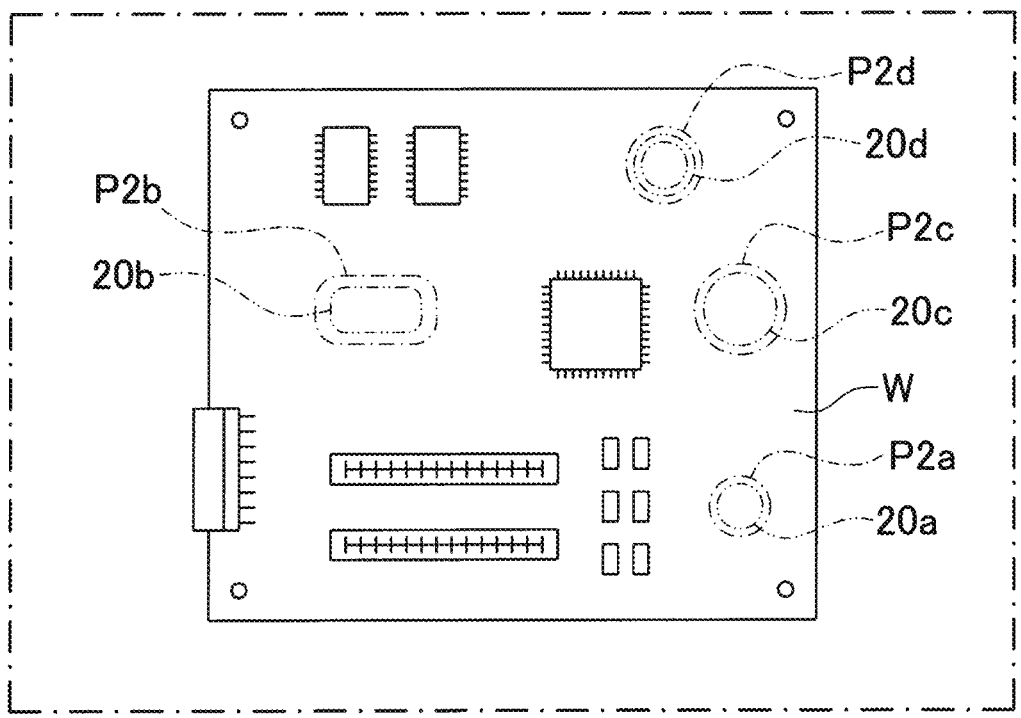
FIG. 8 is a view illustrating a monitoring area in which a delimitation motion is detected according to a second embodiment.

Unlike the above first embodiment, in the imaging range by the imaging unit 13 as shown in FIG. 8, a range corresponding to an assembly position where the part 20a is assembled to the workpiece W is set as a monitoring area P2a. A range corresponding to an assembly position where the part 20b is assembled to the workpiece W is set as a monitoring area P2b. A range corresponding to an assembly position where the part 20c is assembled to the workpiece W is set as a monitoring area P2c. A range corresponding to an assembly position where the part 20d is assembled to the workpiece W is set as a monitoring area P2d.

Figure 9A:
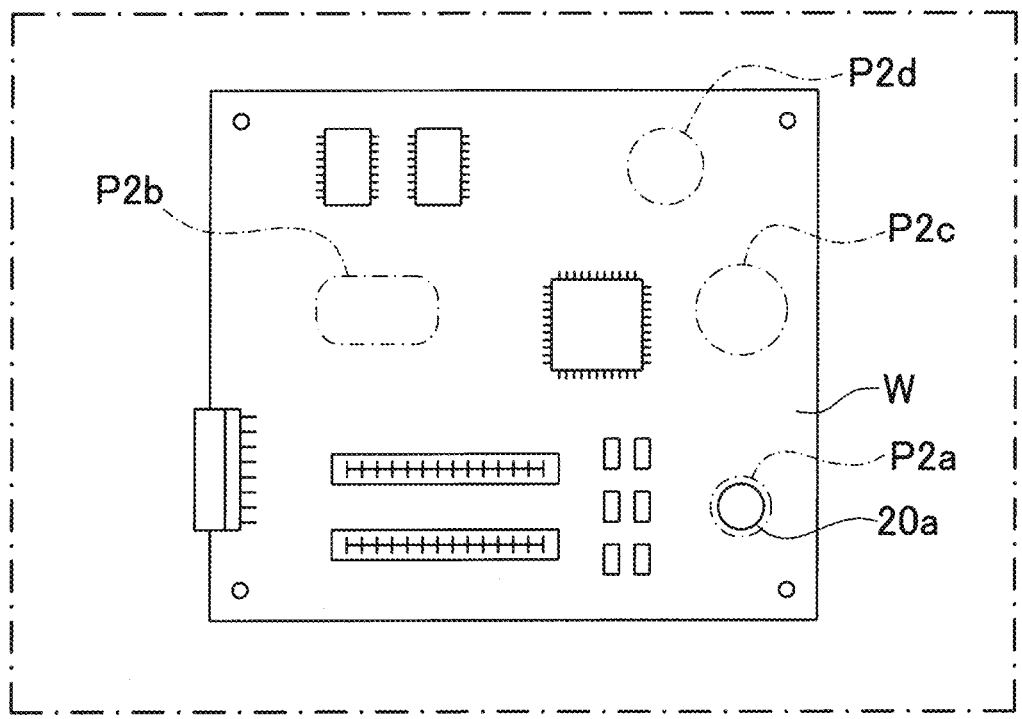
FIG. 9A is a view illustrating a delimitation motion of a fundamental work operation A in the second embodiment.
Figure 9B:
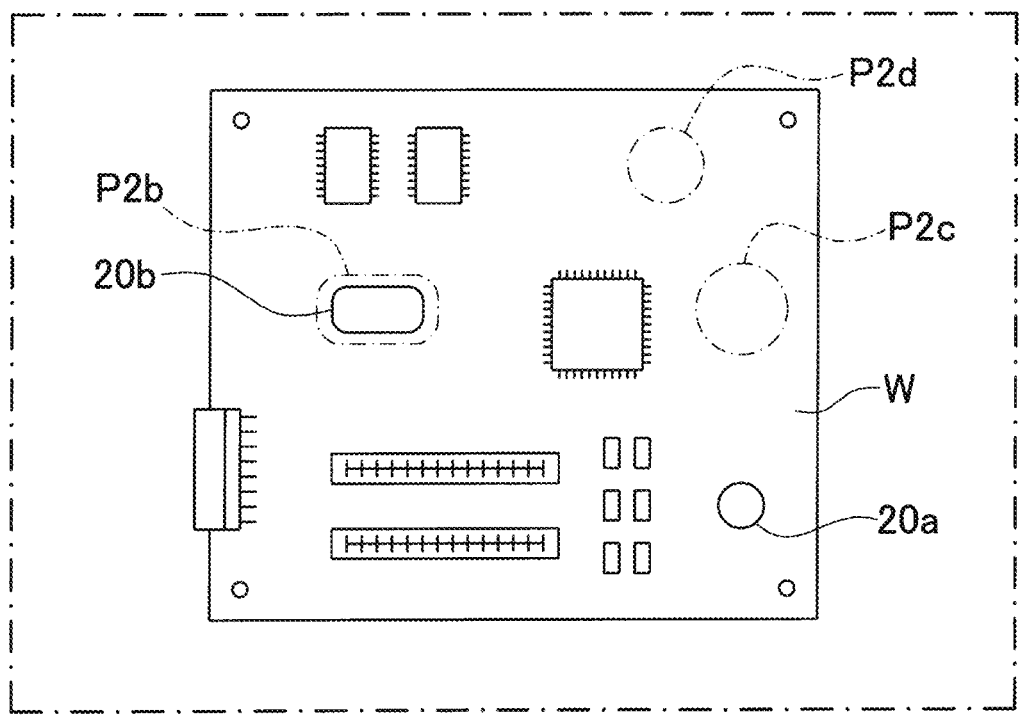
FIG. 9B is a view illustrating a delimitation motion of a fundamental work operation B in the second embodiment.
Figure 10A:
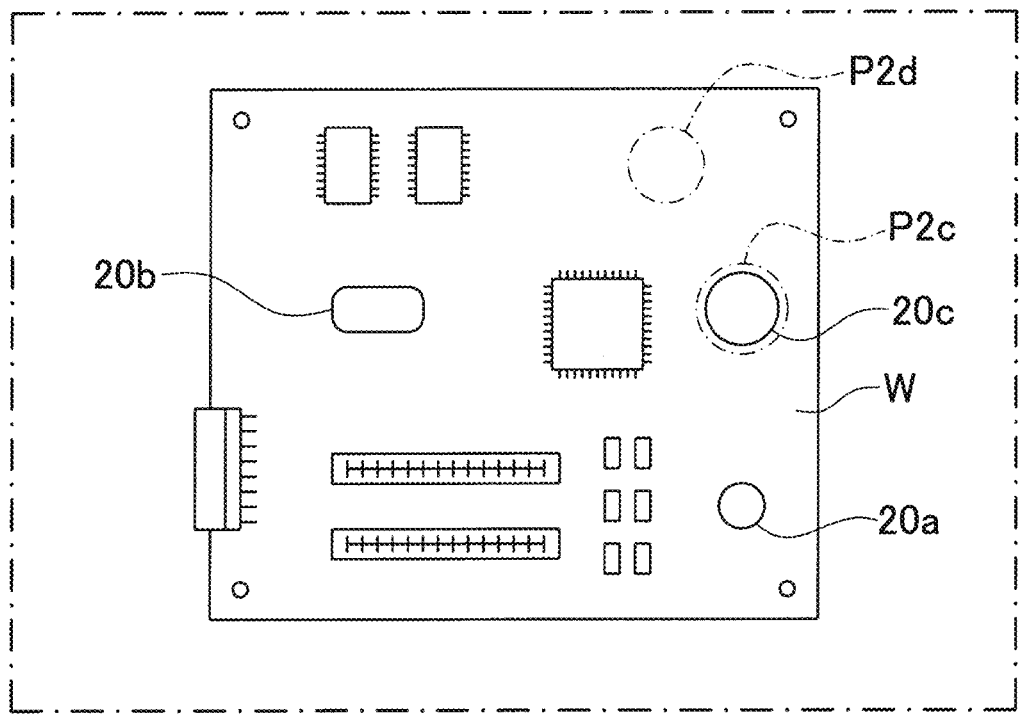
FIG. 10A is a view illustrating a delimitation motion of a fundamental work operation C in the second embodiment.
Figure 10B:
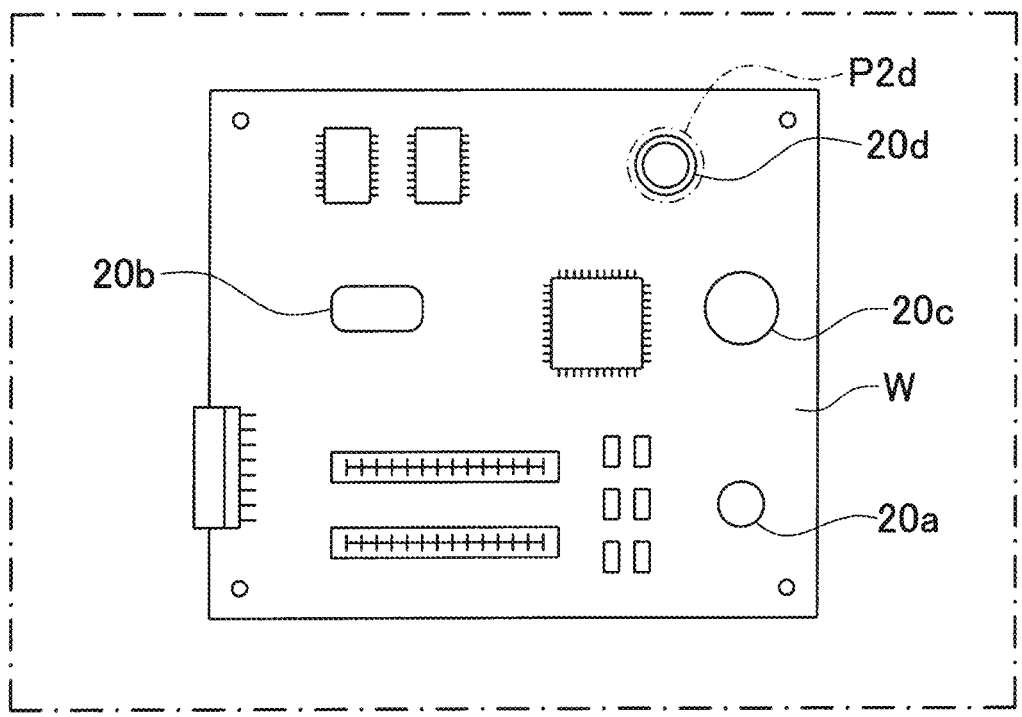
FIG. 10B is a view illustrating a delimitation motion of a fundamental work operation D in the second embodiment.

As shown in FIG. 9A, a motion that the part 20a has been transferred to the monitoring area P2a is set as the delimitation motion for the fundamental work operation A. As shown in FIG. 9B, a motion that the part 20b has been transferred to the monitoring area P2b is set as the delimitation motion for the fundamental work operation B. As shown in FIG. 10A, a motion that the part 20c has been transferred to the monitoring area P2c is set as the delimitation motion for the fundamental work operation C. As shown in FIG. 10B, a motion that the part 20d has been transferred to the monitoring area P2d is set as the delimitation motion for the fundamental work operation D. FIGS. 8 to 10 illustrate enlarged views of the respective ranges corresponding to the work W in the imaging range by the imaging unit 13. In FIGS. 9 and 10, illustration of the hand of the worker M holding the part 20 is omitted for convenience.

Similar to the first embodiment, as shown in FIG. 6, the work analysis processing is performed by the control unit 11 in the present embodiment. When any of the above delimitation motions is detected (Yes at S103) while the work video image is being acquired, the delimitation information for delimiting the work video image at the detection timing is set (S105). The steps from step S103 onward are repeated until a completion operation is performed. When a completion operation is performed (Yes at S107) during this repetition, the determination data is generated to exclude the fundamental work operation presumed to be abnormal (S109, S111).

As described above, in the work analysis device 10 according to the present embodiment, a fundamental work operation is assembling a part 20, which is associated with the fundamental work operation, to the workpiece (assembly target) W, and the delimitation motion (predetermined motion) is a motion of transferring the part 20 to an assembly position in the workpiece W. Since the work video image can be delimited at the detection timing of the motion that is essential for the fundamental work operation, there is no need of forcing a motion irrelevant to the intended fundamental work operation. Accordingly, in generation of the determination data, a work burden on the worker M can be reduced.

Third Embodiment

With reference to the drawings, a work analysis device and a work analysis program according to a third embodiment will now be described.

The third embodiment mainly differs from the first embodiment in the process for detecting the delimitation motion. The components which are substantially the same as those of the first embodiment are denoted by the same reference signs, and the description thereof will be omitted.

Figure 11:
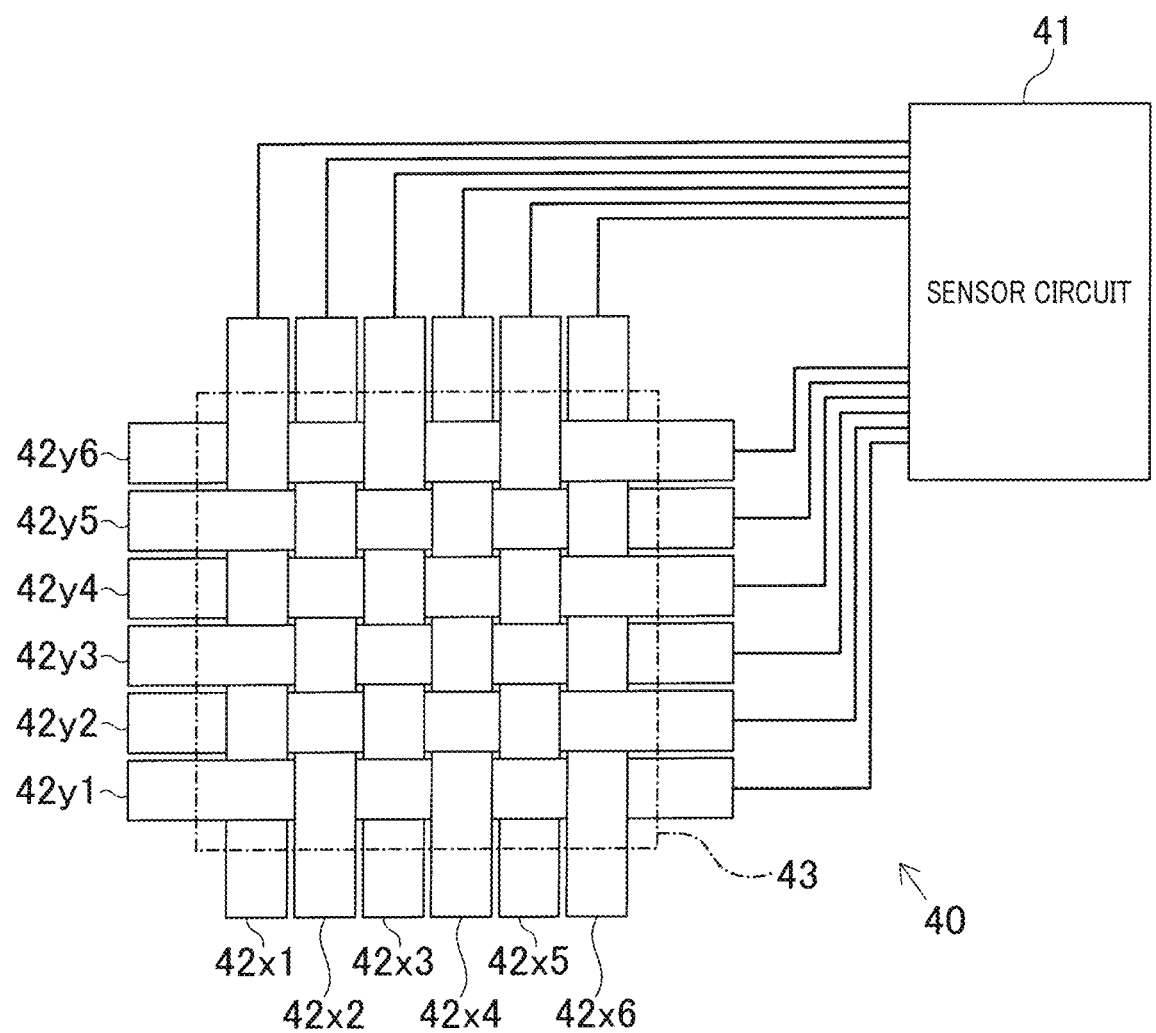
FIG. 11 is a view illustrating a monitoring device of a work analysis device according to a third embodiment.

As shown in FIG. 11, the work analysis device 10 according to the present embodiment includes a monitoring device 40 that detects a motion of taking out the part 20 from the parts box 30 as the delimitation motion. The monitoring device 40 is a device for detecting the delimitation motion by monitoring a change in capacitance. The monitoring device 40 includes a sensor circuit 41, six strip-shaped conductors $42x1$ to $42x6$, six strip-shaped conductors $42y1$ to $42y6$, and a work table 43. Further, in FIG. 11 and FIG. 12 described later, the work table 43 is indicated by the dotted and dashed line for convenience.

The sensor circuit 41 is a circuit that detects a change in capacitance (unit: F) of the respective conductors $42x1$ to $42x6$ and the respective conductors $42y1$ to $42y6$, and is controlled by the control unit 11 to output the monitor results to the control unit 11.

As shown in FIG. 11, the respective conductors $42x1$ to $42x6$ and the respective conductors $42y1$ to $42y6$ are arranged in a matrix pattern. For example, when the hand approaches an area where the conductors $42x3$ and the conductor $42y3$ overlap each other, the capacitance of the conductor $42x3$ and the conductor $42y3$ changes, and the change in capacitance is detected by the sensor circuit 41. That is, the conductors $42x1$ to $42x6$ and the conductors $42y1$ to $42y6$ form 36 areas where the change in capacitance can be detected (hereinafter, also referred to as work areas). The work area where the hand approaches can be detected by monitoring the change in capacitance in the respective work areas arranged in a matrix. Each conductor is subjected to insulation treatment or the like so that another conductor overlapped therewith has a small change in capacitance.

In the present embodiment, the parts boxes 30 are positioned on the work table 43, which is disposed to cover the respective work areas, so that the sensor circuit 41 can detect a motion of taking out the part 20 from the parts box 30 (delimitation motion) and the position of the parts box 30 on the basis of the work area where a change in capacitance larger than a predetermined threshold is detected. That is, the delimitation motion and the like can be detected by simply performing a normal work operation without requiring a special motion. Further, the number of parts boxes 30 used for the work can also be detected on the basis of the order of the work areas in which the capacitance changes.

Figure 12:
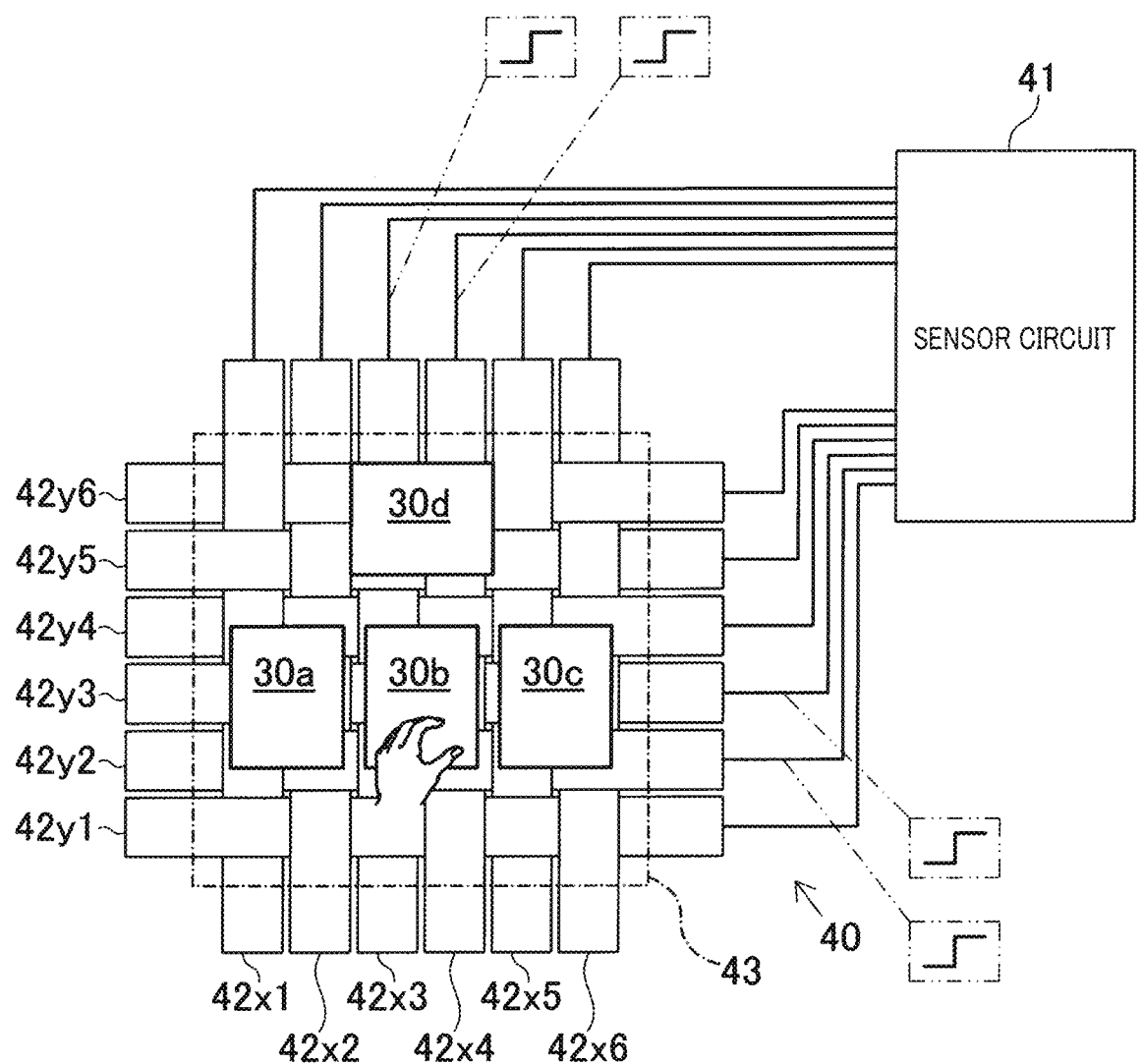
FIG. 12 is a view illustrating that a delimitation motion is detected in the third embodiment.

In particular, each work area can be associated with the type of the parts box 30 positioned thereon to specify the part taken out as well as to detect the delimitation motion. For example, as shown in FIG. 12, when the parts boxes $30a$ to $30d$ are positioned on the work table 43 and associated as above, the sensor circuit 41 can detect when the conductors $42x3$, $42x4$, $42y2$, and $42y3$ have a change in capacitance larger than the other conductors, and thus detect that the part $20b$ is taken out of the parts box $30b$ as well as detect the delimitation motion.

As described above, according to the present embodiment, a characteristic configuration for monitoring the change in capacitance in the respective conductors $42x1$ to $42x6$ and the respective conductors $42y1$ to $42y6$ enables detection of the delimitation motion and the type of the part 20 taken out, and the like. This characteristic configuration can also be applied to other embodiments and the like. The above work areas are not limited to the conductors $42x1$ to $42x6$ and the conductors $42y1$ to $42y6$, and other members capable of monitoring a change in capacitance can also constitute the work areas. For example, a configuration may be adopted in which one conductor capable of monitoring a change in capacitance is disposed in each work area. Further, the number of work areas is not limited to 36 (6×6), and may vary depending on the arrangement of the parts boxes 30. The configuration for detecting the delimitation motion and the like by monitoring a change in capacitance in the conductor is applied to detection of the delimitation motion of taking out the part 20 from the parts box 30 as described above, but not limited thereto. For example, the configuration may also be applied to detection of the delimitation motion of transferring the part 20 to the assembly position in the assembly target.

Fourth Embodiment

With reference to the drawings, a work analysis device and a work analysis program according to a fourth embodiment will now be described.

The fourth embodiment mainly differs from the first embodiment in the process for setting the monitoring area. The components which are substantially the same as those of the first embodiment are denoted by the same reference signs, and the description thereof will be omitted.

Figure 13A:
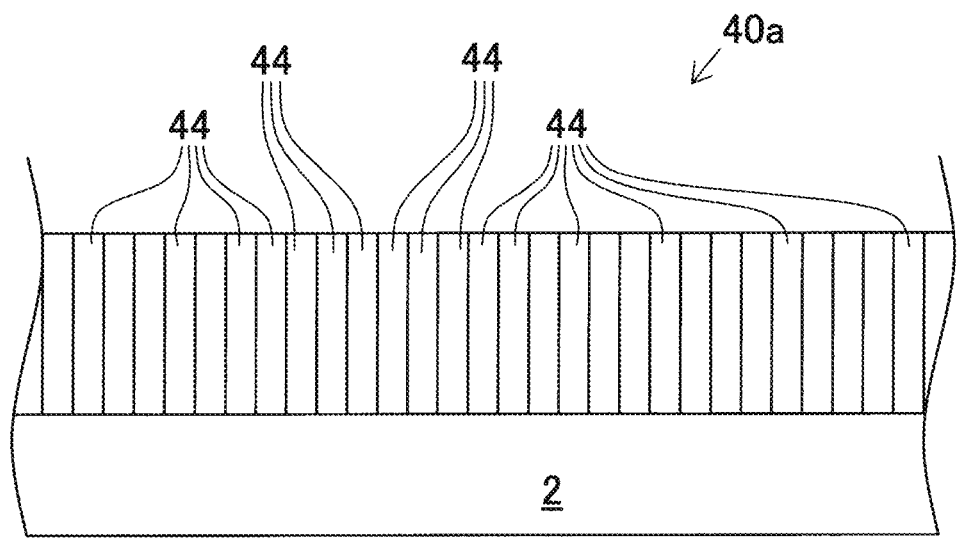
FIG. 13A is a view illustrating a monitoring device of a work analysis device according to a fourth embodiment.

As shown in FIG. 13A, the work analysis device 10 according to the present embodiment includes a monitoring device $40a$ that detects the monitoring area described above, that is, a position where the parts box 30 is located. The monitoring device $40a$ includes a plurality of piezoelectric switches 44 arranged in a line at equal intervals without substantially no gap on the surface of the shelf 2 on which the parts box 30 is to be positioned. The piezoelectric switches 44 are configured to output a signal corresponding to the pressure applied to the control unit 11. The control unit 11 can detect which piezoelectric switch 44 is in a pressed state.

Figure 13B:
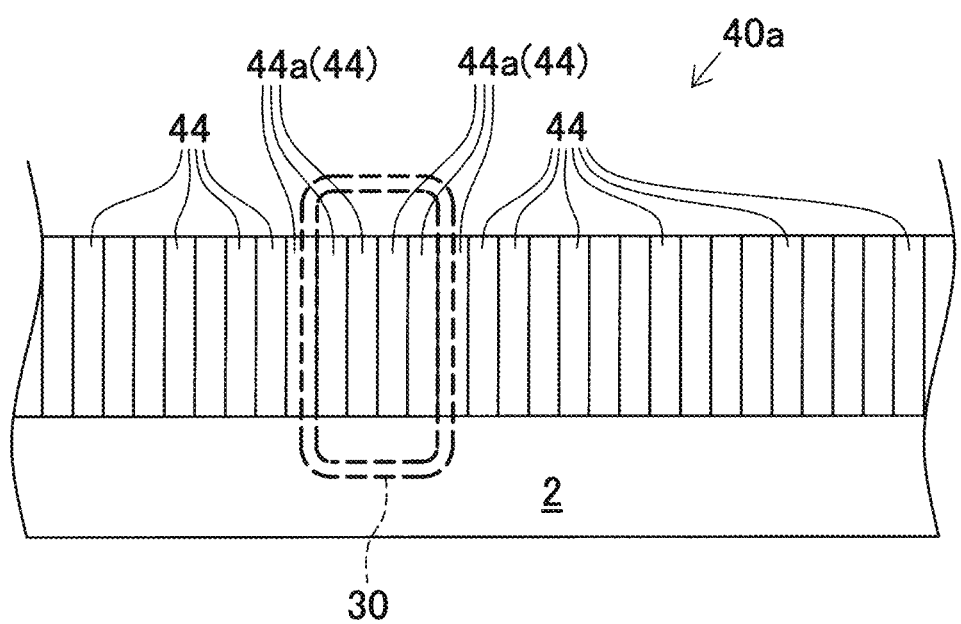
FIG. 13B is a view illustrating that a parts box is positioned in an observation area of FIG. 13A.

Specifically, as shown in FIG. 13B, when the parts box 30 is positioned on a part of an observation area, which is composed of the surfaces of the respective piezoelectric switches 44 to be pressed, a signal is outputted only from the piezoelectric switch 44 on which the parts box 30 is positioned (see reference numeral $44a$ in FIG. 13B). Accordingly, a position on which the parts box 30 is positioned (monitoring area) in the observation area can be detected by monitoring the pressed state of the respective piezoelectric switches 44 by the control unit 11. In FIG. 13B, the parts box 30 is indicated by the dotted line for convenience.

Instead of the piezoelectric switch 44, a physical switch such as a contact switch that can detect when a part of the parts box contacts the detection surface may also be used to detect a position on which the parts box is positioned (monitoring area) in the observation area.

Figure 14A:
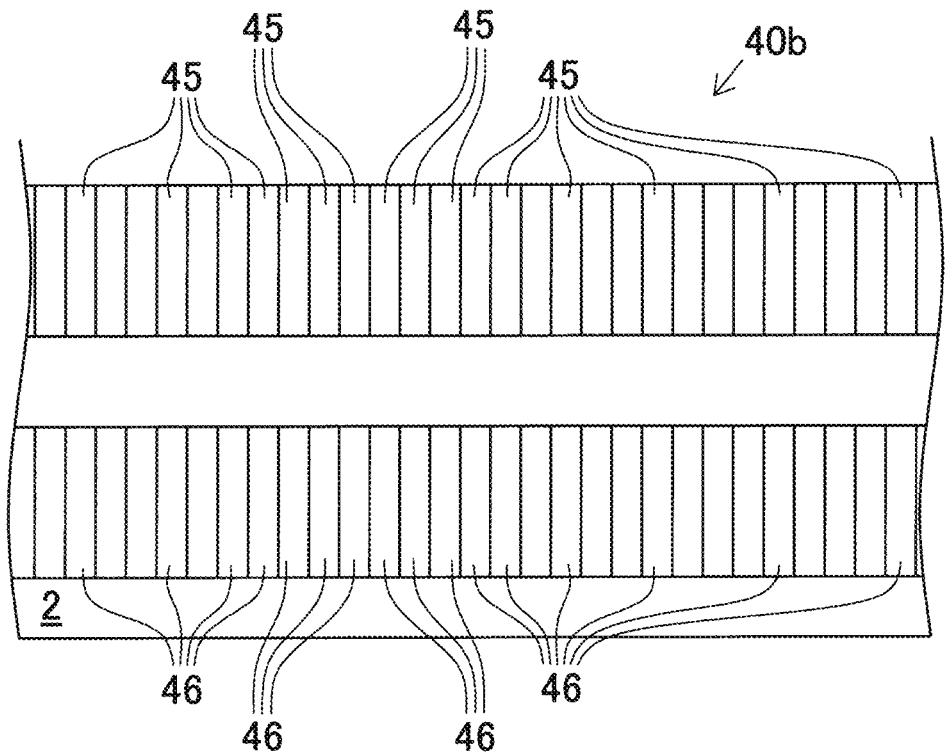
FIG. 14A is a view illustrating a monitoring device of a work analysis device according to a modified example of the fourth embodiment.
Figure 14B:
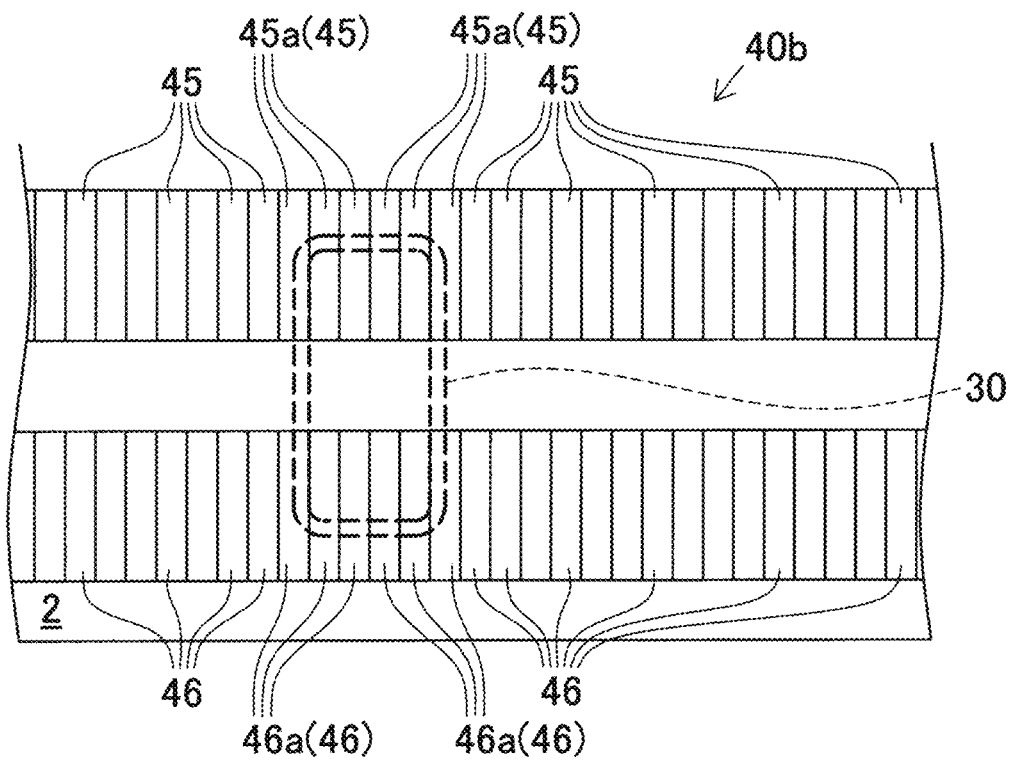
FIG. 14B is a view illustrating that a parts box is positioned in an observation area of FIG. 14A.

In the environment that the frequency of usage is high rather than non-usage environment, a modified example of the present embodiment, as shown in FIG. 14A, may also be adopted in which a monitoring device $40b$ is used instead of the monitoring device $40a$. In the environment in which the monitoring device $40b$ according to the modified example is used, at least the back surface of the parts box 30 has conductivity. The monitoring device $40b$ is configured to detect a change in conductive state in the observation area to thereby detect a position where the parts box 30 is located (monitoring area). The monitoring device $40b$ includes a plurality of first conductors 45 and second conductors 46, which are of the same number and arranged parallel to each other, on the surface on which the parts box 30 is to be positioned. As shown in FIG. 14B, the monitoring device $40b$ can detect the first conductor 45 and the second conductor 46 in an electrically conductive state to thereby detect the range occupied by the conductors 45 and 46 thus detected (see reference numerals $45a$ and $46a$ in FIG. 14B) as a position where the parts box 30 is located. In FIG. 14B, the parts box 30 is indicated by the dotted line for convenience.

In particular, the resistance of the conductor provided on the rear surface of the parts box 30 may be different for each parts box 30 so that the resistance detected via the first conductor 45 and the second conductor 46 can be used to determine the type of the parts box 30 positioned thereon.

The characteristic configuration of the present embodiment for detecting each monitoring area by using the piezoelectric switch 44 or the like and the characteristic configurations of the modified examples of the present embodiment for detecting each monitoring area by using the first conductor 45 and the second conductor 46 or the like can also be applied to other embodiments.

Fifth Embodiment

With reference to the drawings, a work analysis device and a work analysis program according to a fifth embodiment will now be described.

The fifth embodiment mainly differs from the first embodiment in the process for setting the monitoring area and the process for detecting the delimitation motion with the height of the hand taken into consideration. The components which are substantially the same as those of the first embodiment are denoted by the same reference signs, and the description thereof will be omitted.

Figure 15:
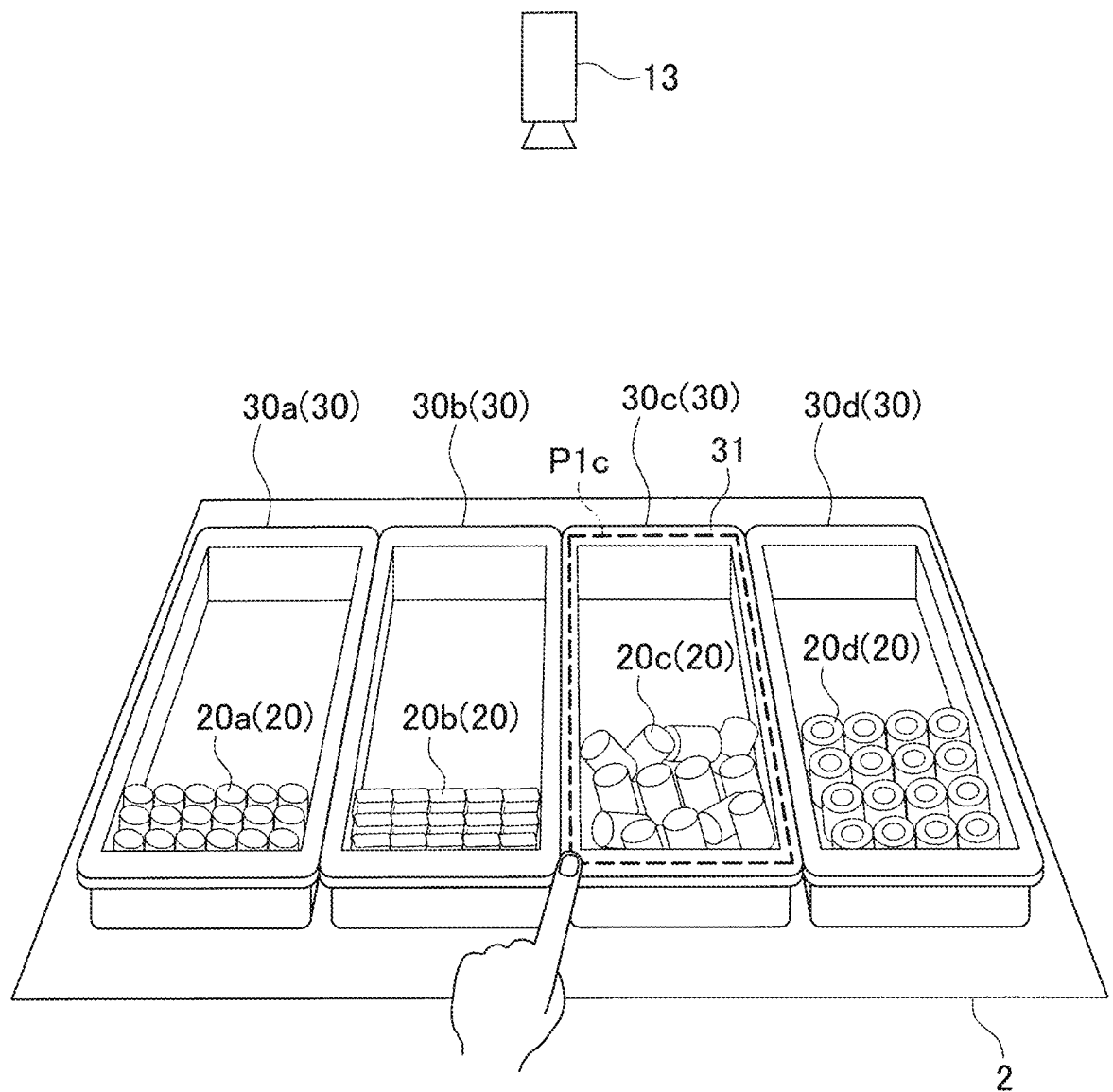
FIG. 15 is a view illustrating that a monitoring area is set in a fifth embodiment.

In the present embodiment, prior to the work analysis processing, monitoring area setting is performed by the control unit 11 to set each monitoring area. In the monitoring area setting, a monitoring area corresponding to a parts box can be set by imaging the trajectory of the finger tracing an upper end face 31 of the peripheral wall of the parts box 30 by using the imaging unit 13. For example, as illustrated in FIG. 15, the monitoring area Plc corresponding to the parts box 30c can be set by imaging the trajectory of the finger tracing the upper end face 31 of the peripheral wall of the parts box 30c by using the imaging unit 13.

In the work analysis processing, the delimitation motion that the hand of the worker M enters the monitoring area is detected taking the height of the hand of the worker M into consideration. For example, when the hand, intending to pick up a part contained in the parts box 30b, passes over the parts box 30a, which is adjacent to the parts box 30b, it may be erroneously recognized that the hand enters the monitoring area corresponding to the parts box 30a, which causes erroneous detection of the delimitation motion.

For this reason, in the present embodiment, a ToF (Time-of-Flight) camera that can measure a distance to an object to be imaged is used as the imaging unit 13. As shown in FIG. 16, the height of the hand entering the monitoring area from a placement surface 2a is measured on the basis of the placement surface 2a of the shelf 2 on which the parts boxes 30 are placed. When the height of the hand entering the monitoring area from the placement surface 2a is larger than a predetermined threshold h1, the detection is invalid and the motion is not determined as the delimitation motion. On the other hand, when the height of the hand entering the monitoring area from the placement surface 2a is not larger than the predetermined threshold h1, the detection is valid and the motion is determined as the delimitation motion. Further, another ToF camera may be provided separately from the imaging unit 13 to measure the height of the hand entering the monitoring area from the placement surface 2a by using this camera.

Accordingly, for example, even if the hand intending to pick up a part contained in the parts box 30b enters the monitoring area corresponding to the parts box 30a, the detection is valid when the height of the hand from the placement surface 2a is larger than the predetermined threshold h1. Thus, erroneous detection of the delimitation motion can be prevented.

Further, the detection can be determined to be invalid on the basis of not only the height of the hand from the placement surface 2a, but also the height of the hand from the upper end face 31 of the parts box 30 (see a threshold h2 in FIG. 16). The characteristic configuration of the present embodiment for determining whether the detection is invalid or not on the basis of the setting of the monitoring area by using the trajectory of the finger tracing as described above or the height of the hand can also be applied to other embodiments and the like.

Sixth Embodiment

With reference to the drawings, a work analysis device and a work analysis program according to a sixth embodiment will now be described.

The sixth embodiment mainly differs from the first embodiment in that the delimitation motion is detected by using a change in weight. The components which are substantially the same as those of the first embodiment are denoted by the same reference signs, and the description thereof will be omitted.

Figure 17A:
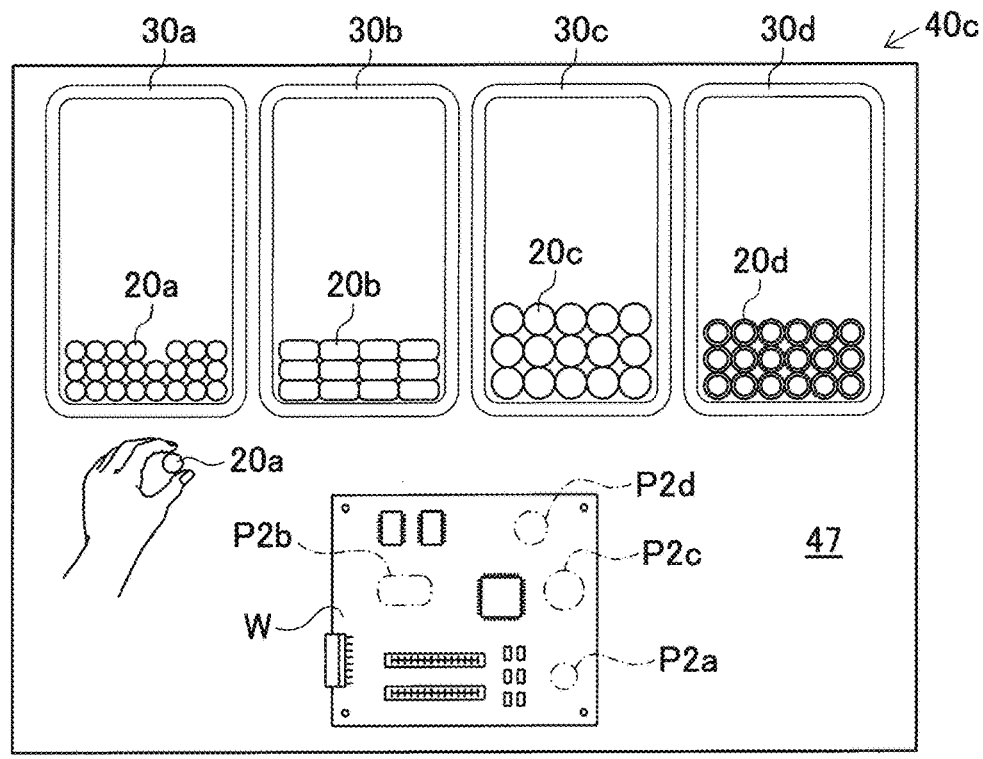
Figure 17B:
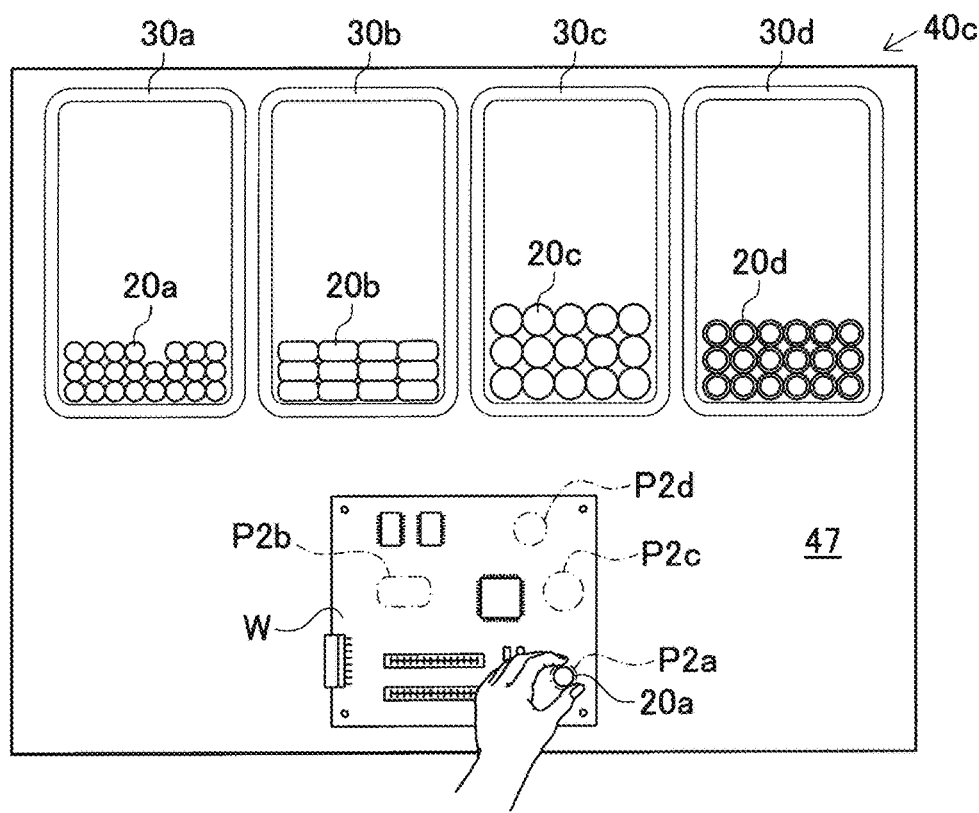
FIG. 17B is a view illustrating a state in which a part 20a is assembled to a workpiece W.

As shown in FIGS. 17A and 17B, the work analysis device 10 according to the present embodiment includes a monitoring device 40c that detects a motion of taking out the part 20 from the parts box 30 and a motion of assembling the part 20 to the assembly target as the delimitation motion. The monitoring device 40c is a device that detects the delimitation motion by monitoring a change in weight of each parts box 30 and the assembly target, and includes a weight sensor 47 that can measure the weight of each parts box 30 and the assembly target. The weight sensor 47 has a weighing surface formed as a flat surface so that the parts boxes 30 and the assembly target can be placed thereon at the same time, and is assembled to the shelf 2.

Referring to the drawings, the work analysis processing performed in the present embodiment will now be described. As shown in FIGS. 17A and 17B, in the work described below in detail, four parts boxes 30a to 30d and the workpiece W to which the parts 20a to 20d are assembled are placed on the weighing surface of the weight sensor 47. In the present embodiment, the predetermined work to be analyzed is the work including a fundamental work operation A of assembling the part 20a in the parts box 30a to the workpiece W, a fundamental work operation B of assembling the part 20b in the parts box 30b to the workpiece W, a fundamental work operation C of assembling the part 20c in the parts box 30c to the workpiece W, and a fundamental work operation D of assembling the part 20d in the parts box 30d to the workpiece W in this order.

Figure 18:
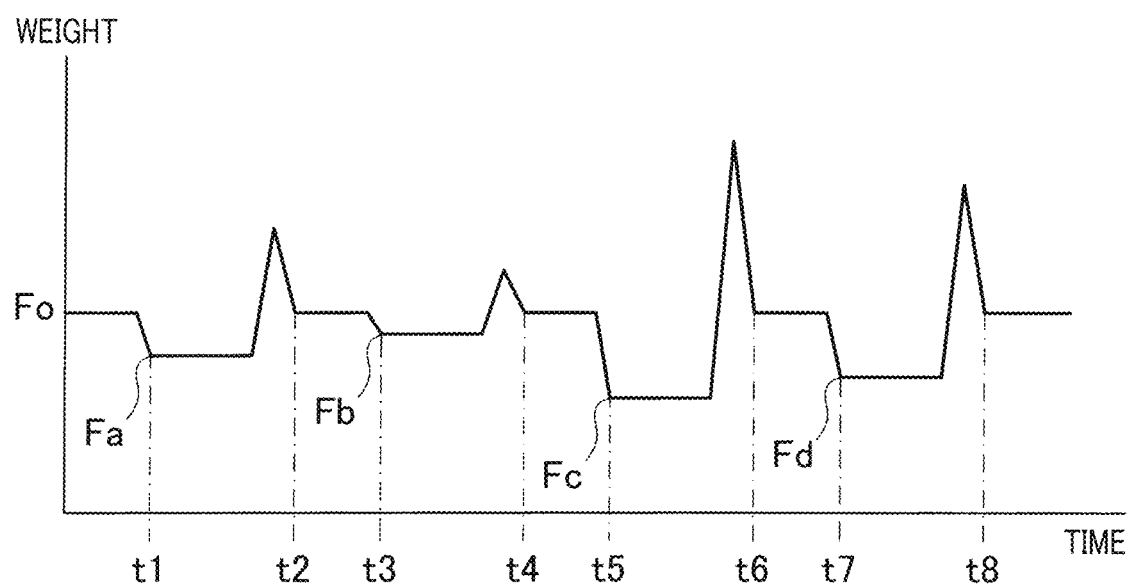
FIG. 18 is a graph showing a change in weight monitored by a monitoring device that monitors the states of FIGS. 17A and 17B.

At the start of assembly work immediately after the workpiece W on which the parts 20a to 20d are not assembled is placed on the weighing surface, a measured value F measured by the weight sensor 47 is Fo. As shown in FIG. 17A, when the part 20a is taken out of the parts box 30a for starting the fundamental work operation A, a value measured by the weight sensor 47 decreases from Fo to Fa. The measured value Fa is a value obtained by subtracting the weight of the part 20a from the measured value Fo. Accordingly, when the value measured by the weight sensor 47 decreases from Fo to Fa (see time t1 in FIG. 18), the delimitation motion of taking out the part 20a from the parts box 30a can be detected. Subsequently, as shown in FIG. 17B, as the part 20a is assembled to the workpiece W, the value measured by the weight sensor 47 increases from Fa to Fo.

Accordingly, when the value measured by the weight sensor 47 returns (increases) from Fa to Fo (see time t2 in FIG. 18), the delimitation motion of assembling the part 20*a* to the workpiece W can be detected. Subsequently, when the value measured by the weight sensor 47 decreases from Fo to Fb (a value obtained by subtracting the weight of the part 20*b* from the measured value Fo) (see time t3 in FIG. 18), the delimitation motion of taking out the part 20*b* from the parts box 30*b* can be detected. Further, when the value measured by the weight sensor 47 returns from Fb to Fo (see time t4 in FIG. 18), the delimitation motion of assembling the part 20*b* to the workpiece W can be detected. Subsequently, when the value measured by the weight sensor 47 decreases from Fo to Fc (a value obtained by subtracting the weight of the part 20*c* from the measured value Fo) (see time t5 in FIG. 18), the delimitation motion of taking out the part 20*c* from the parts box 30*c* can be detected. Further, when the value measured by the weight sensor 47 returns from Fc to Fo (see time t6 in FIG. 18), the delimitation motion of assembling the part 20*c* to the workpiece W can be detected.

Subsequently, when the value measured by the weight sensor 47 decreases from Fo to Fd (a value obtained by subtracting the weight of the part 20*d* from the measured value Fo) (see time t7 in FIG. 18), the delimitation motion of taking out the part 20*d* from the parts box 30*d* can be detected. Further, when the value measured by the weight sensor 47 returns from Fd to Fo (see time t8 in FIG. 18), the delimitation motion of assembling the part 20*d* to the workpiece W can be detected.

Thus, in the present embodiment, the delimitation motion can be correctly detected by using a change in weight measured by the weight sensor 47. Accordingly, for example, even if an unintended part is erroneously picked up from a different parts box, a large change in weight as in the time of assembly can be prevented from being detected when the part is returned to the original parts box. Thus, erroneous detection of the delimitation motion due to an error in picking up of the part can be reduced. Further, since a change in weight due to falling of a part is different from a change in weight during assembly, it is possible to reliably distinguish completion of assembly from mere falling of a part on the basis of the change in weight detected even if a part falls onto the assembly target during assembly.

The weight sensor 47 may be a non-contact capacitance sensor, a capacitance weight sensor, a thin film pressure sensor, or the like. Further, the monitoring device 40*c* is not limited to use a single weight sensor 47 to measure the weight of the parts boxes 30 and the assembly target, may also use two or more weight sensors to measure the weight of the parts boxes 30 and the assembly target. The characteristic configuration of the present embodiment for detecting the delimitation motion by using a change in weight measured by the weight sensor can also be applied to other embodiments and the like.

Seventh Embodiment

With reference to the drawings, a work analysis device and a work analysis program according to a seventh embodiment will now be described.

The seventh embodiment differs from the first embodiment in the process for setting the monitoring area. The components which are substantially the same as those of the first embodiment are denoted by the same reference signs, and the description thereof will be omitted.

In the work analysis device 10 according to the present embodiment, the trajectory of the hand of the worker M when taking out the part 20 from the parts box 30 and the trajectory of the hand of the worker M when assembling the part 20 to the assembly target are monitored to set the monitoring area on the basis of the monitoring result.

Specifically, the hand of the worker M is recognized from the video image acquired by the imaging unit 13, and the moving direction and the moving distance of the hand imaged are detected at a predetermined time interval (for example, frame interval). When the state in which the moving distance is equal to or less than a predetermined value continues at least for a predetermined period, it is determined as the state in which the hand is retained (hereinafter, also referred to as a retained state), and a temporary monitoring area is set on the basis of the hand imaged at the time of the retained state. This is because a motion of the hand taking out the part 20 from the parts box 30 and a motion of the hand assembling the part 20 to the assembly target are likely to be in the retained state.

Figure 19:
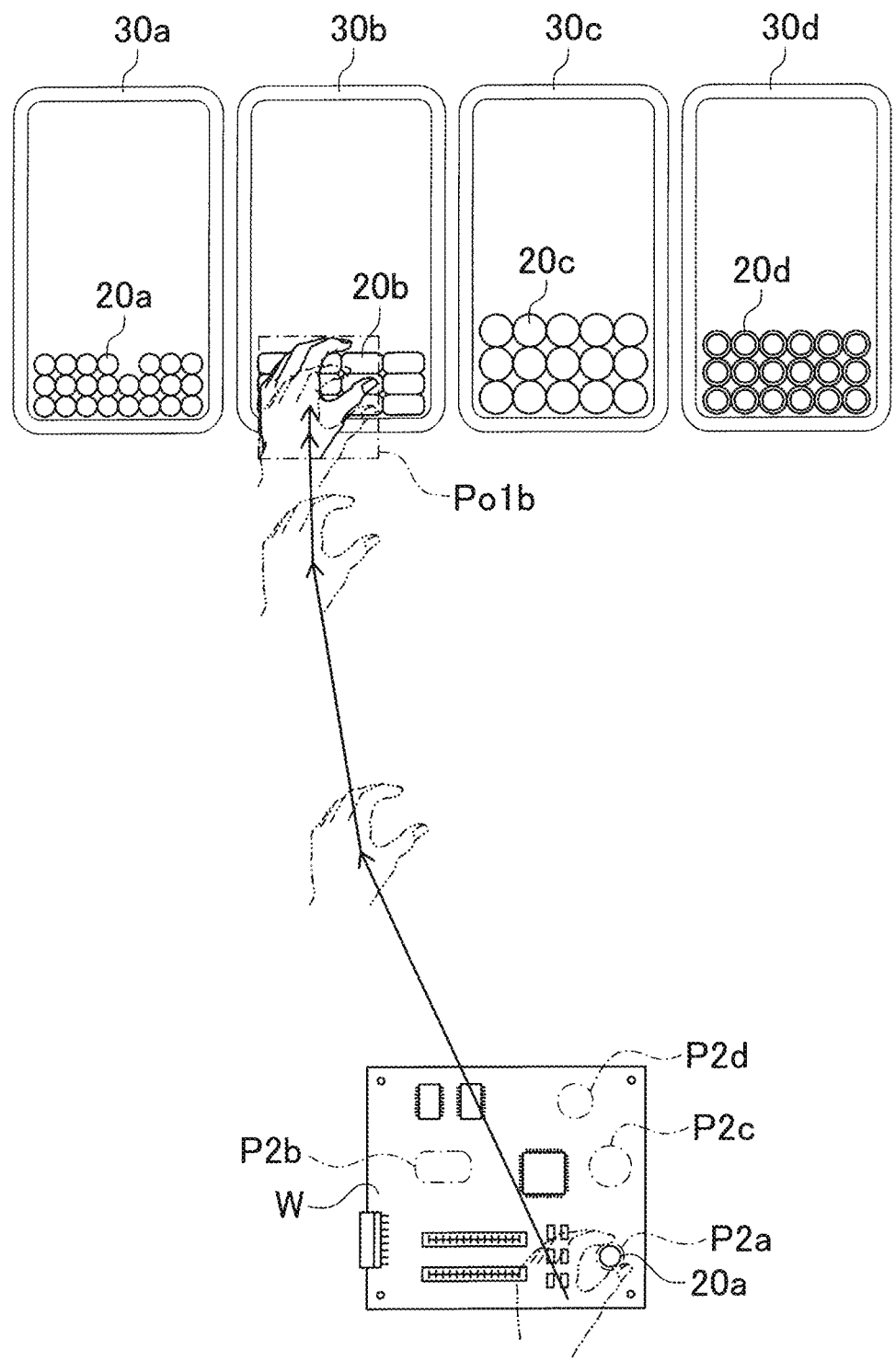
FIG. 19 is a view illustrating setting of a temporary monitoring area in a parts box in a seventh embodiment.
Figure 20:
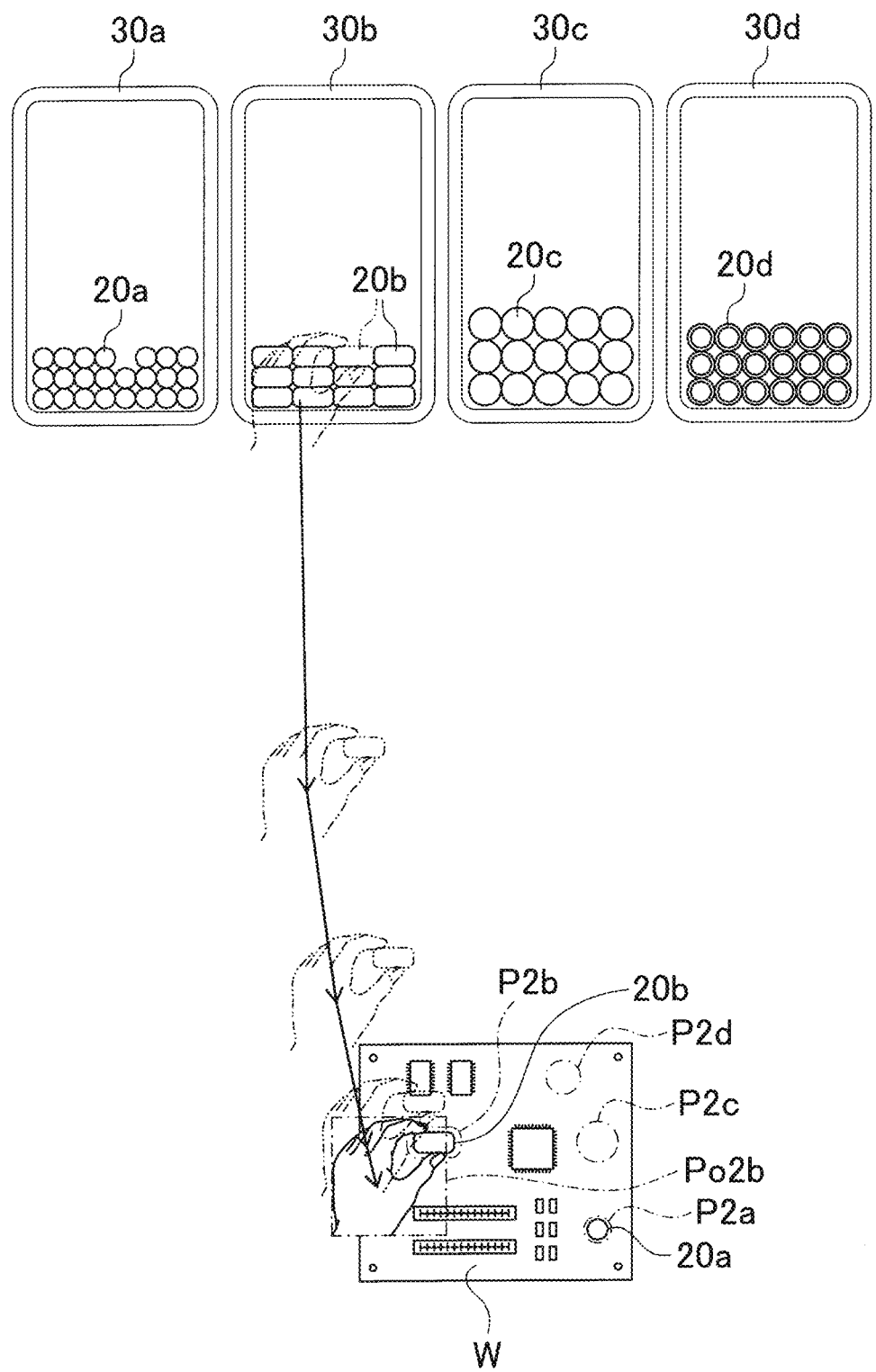
FIG. 20 is a view illustrating setting of a temporary monitoring area on a workpiece in the seventh embodiment.

For example, as shown in FIG. 19, when the hand, having assembled the part 20*a* to the workpiece W, moves toward the parts box 30*b* to pick up the part 20*b* therefrom, the hand is in the retained state when it is taking out the part 20*b* from the parts box 30*b*. Accordingly, a temporary monitoring area (see reference numeral Po1*b* in FIG. 19) for the parts box 30*b* is set on the basis of the hand in the retained state. Subsequently, as shown in FIG. 20, when the hand, having taken out the part 20*b*, moves toward the assembly position in the workpiece W, the hand is in the retained state when assembling the part 20*b* to the assembly position in the workpiece W. Accordingly, a temporary monitoring area (see reference numeral Po2*b* in FIG. 20) for the assembly position of the part 20*b* is set on the basis of the hand in the retained state.

In the present embodiment, the temporary monitoring area is set as a rectangular area containing the imaging range of the hand in the retained state as the temporary monitoring area Po1*b* in FIG. 19 and the temporary monitoring area Po2*b* in FIG. 20. However, this is merely an example, and, for example, the temporary monitoring area may also be set as a circle area or an oval area circumscribed about the imaging range of the hand in the retained state or a circle area or an oval area inscribed in the imaging range of the hand in the retained state.

By repeating each fundamental work operation, the temporary monitoring area for each parts box 30 and the temporary monitoring area for each assembly position are sequentially stored in the storage unit 12. After that, in order to improve estimation accuracy for the monitoring area and optimize the monitoring area, an overlapping area for each temporary monitoring area is obtained and weighted so that the monitoring area is set according to the weighting.

Figure 21A:
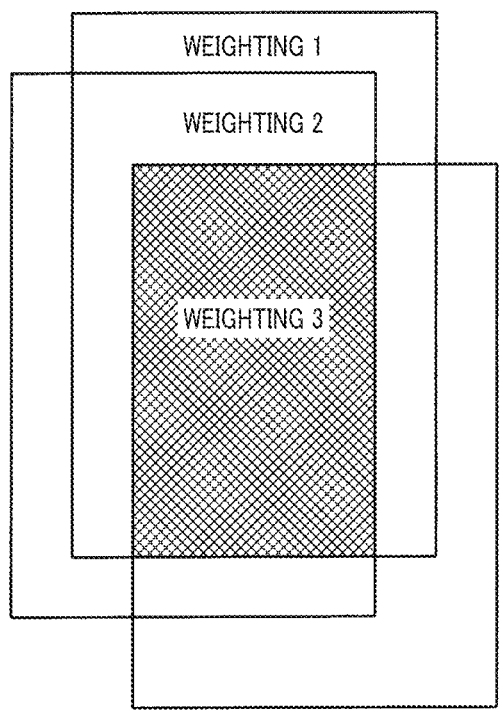
FIG. 21A is a view illustrating a monitoring area set by a temporary monitoring area weighted with "3."
Figure 21B:
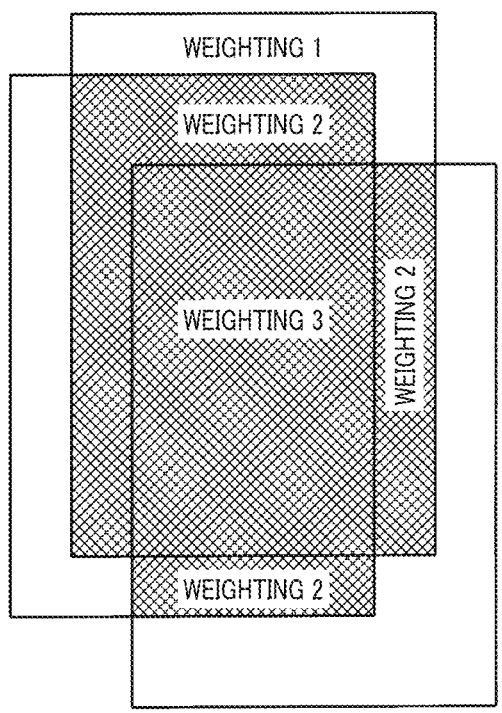
FIG. 21B is a view illustrating a monitoring area set by a temporary monitoring area weighted with "2" or more.

For example, when a temporary monitoring area is set 100 times for one monitoring area, an area overlapping 50 times or more is set to "3," an area overlapping 20 times or more is set to "2," and an area overlapping 10 times or more is set to "1." When the monitoring area is set to include all the temporary monitoring areas weighted with "3," the monitoring area (see the hatched area) can be set as shown in FIG. 21A. Further, when the monitoring area is set to include all the temporary monitoring areas weighted with "2" or more, the monitoring area (see the hatched area) can be set as shown in FIG. 21B.

The temporary monitoring area may also be set for one monitoring area as a predetermined shape such as a rectangle whose center is a middle position between the center position of the hand in the previous retained state and the center position of the hand in the current retained state. The characteristic configuration of the present embodiment for setting one monitoring area by using a plurality of temporary monitoring area as described above can also be applied to other embodiments and the like.

Eighth Embodiment

With reference to the drawings, a work analysis device and a work analysis program according to an eighth embodiment will now be described.

The eighth embodiment differs from the first embodiment in that the process of setting a monitoring area corresponding to each parts box is performed by using information code provided on each parts box. The components which are substantially the same as those of the first embodiment are denoted by the same reference signs, and the description thereof will be omitted.

Figure 22:
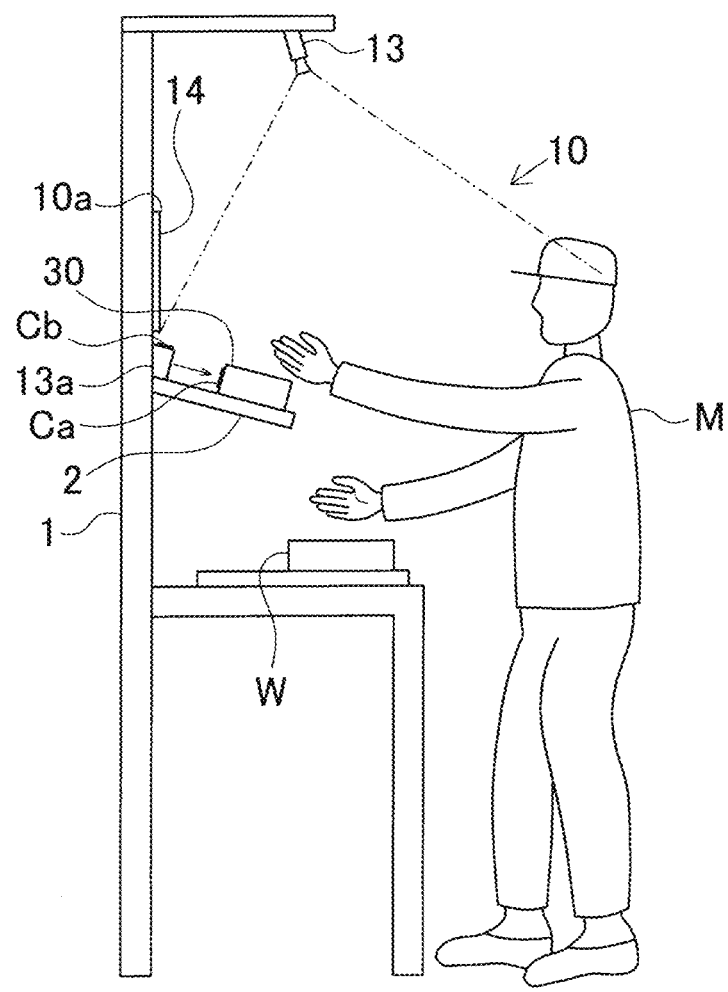
FIG. 22 is a view illustrating a schematic configuration of a work analysis device according to an eighth embodiment.

In the present embodiment, as shown in FIG. 22, an information code for positional detection (hereinafter, also referred to as a parts box code Ca) is provided on each parts box 30. The work analysis device 10 includes a second imaging unit 13a that images the parts box code Ca. The second imaging unit 13a functions as a camera for setting a monitoring area, has the same function as the imaging unit 13, and is configured to store the captured image in the storage unit 12 so as to be analyzed by the control unit 11. The second imaging unit 13a is provided at a position within the imaging range of the imaging unit 13 and the front face of the second imaging unit 13a as viewed from the worker M is configured to image the parts box code Ca on each parts box 30 disposed on the shelf 2. An information code for calculating a relative positional relationship between the second imaging unit 13a and the imaging unit 13 (hereinafter, also referred to as a camera code Cb) is provided on an outer surface (top) of the second imaging unit 13a, which is oriented to the imaging unit 13. In the present embodiment, the parts box code Ca and the camera code Cb are implemented as a QR code (registered trademark). However, this is merely an example, and, for example, a one-dimensional code such as a bar code and other types of second code may also be used.

In the present embodiment, prior to the work analysis processing, monitoring area setting is performed by the control unit 11 to set each monitoring area. In the monitoring area setting, the relative coordinates of the parts box 30 relative to the second imaging unit 13a is calculated from an image of the parts box code Ca captured by the second imaging unit 13a. As the relative coordinates of the second imaging unit 13a relative to the imaging unit 13 is calculated from an image of the camera code Cb captured by the imaging unit 13, the relative coordinates of the parts box 30 relative to the imaging unit 13 is estimated, and the monitoring area for each parts box 30 is set on the basis of the estimation result.

Accordingly, the parts box code Ca includes information on the part 20 contained in the parts box 30 to which the parts box code Ca is attached as well as information on the size of the parts box 30 such as height, width, and depth (hereinafter, also referred to as a box size), the size indicating the dimensions, shape, cell number, and the like of the parts box code Ca (hereinafter, also referred to as a code size), and the attached position of the parts box code Ca to the parts box 30 (hereinafter, also referred to as a code position).

Further, the camera code Cb includes information for calculating the relative positional relationship between the imaging unit 13 and the second imaging unit 13a from the captured image of the camera code Cb, such as the attached position of the camera code Cb to the second imaging unit 13a and the code size.

Referring to the drawings, the monitoring area setting in the present embodiment will now be specifically described. In the following description, the case where one parts box 30 to which the parts box code Ca is provided is disposed on the shelf 2 will be described in detail.

Prior to the work analysis processing, the monitoring area setting is initiated by the control unit 11 in response to a predetermined operation. At step S201 in FIG. 23a, parts box relative coordinate estimation is performed to estimate the relative coordinates of the parts box 30 relative to the second imaging unit 13a. In the subroutine of step S201, as shown in FIG. 24, the second imaging unit 13a is ready to image the parts box code Ca (S211 in FIG. 24), and then decoding for reading the captured parts box code Ca is performed (S213).

When the parts box code Ca is successfully read since the parts box 30 is disposed on the shelf 2 (Yes at S215), the box size, code size, code position, and the like are obtained. Then, reading angle calculation is performed at step S217. At step S217, an angle of the parts box code Ca relative to the second imaging unit 13a is calculated as a reading angle $\alpha$ on the basis of the range of the parts box code Ca in the image captured by the second imaging unit 13a.

Figure 25:
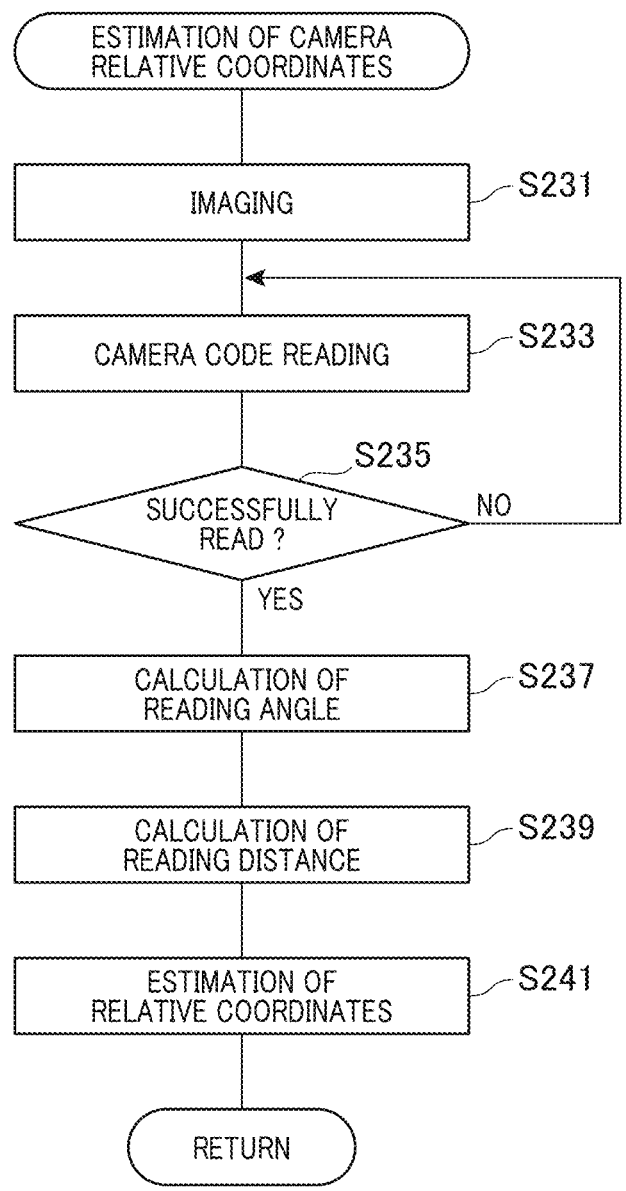
FIG. 25 is a flowchart illustrating the order of execution in a subroutine of camera relative coordinate estimation in FIG. 23.
Figure 26A:
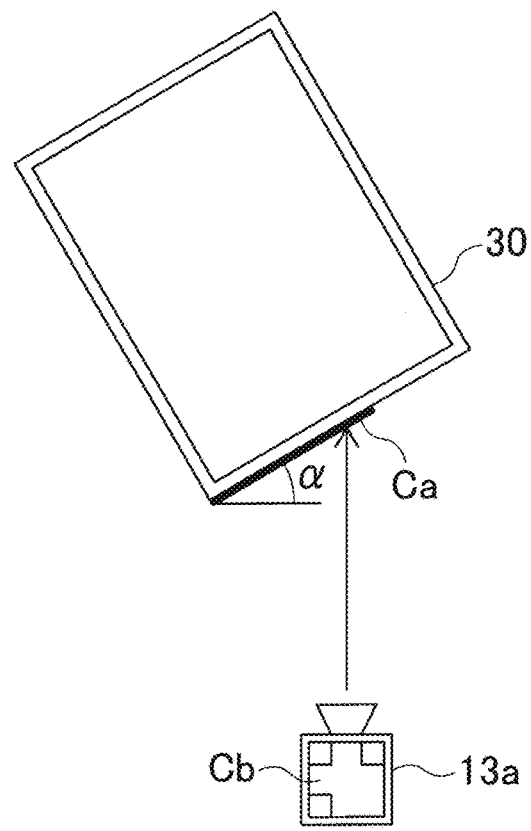
FIG. 26A is a view illustrating a positional relationship between a second imaging unit and a parts box.
Figure 26B:
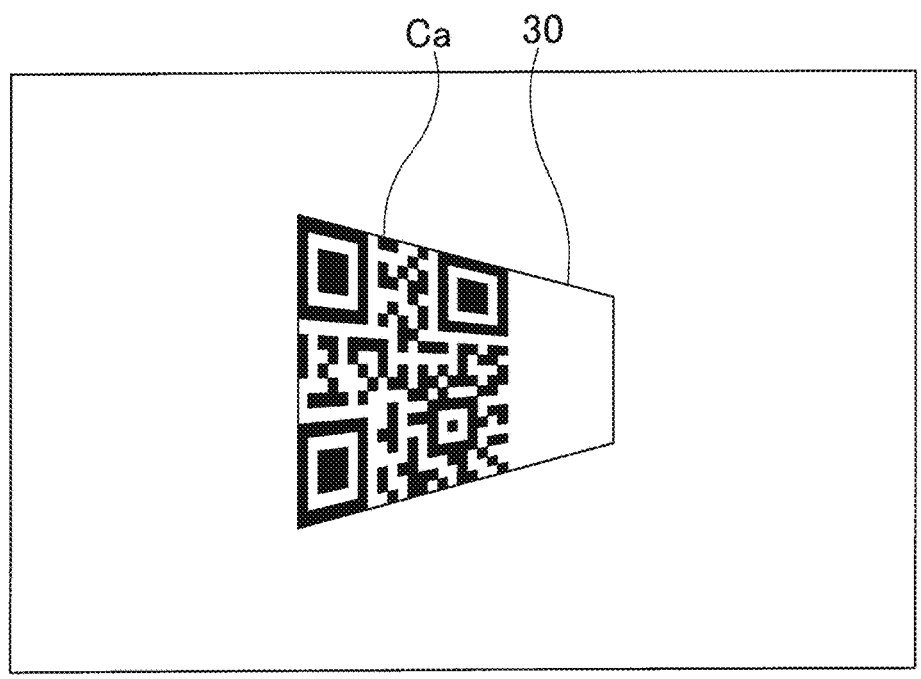
FIG. 26B is a view illustrating an image captured by the second imaging unit in the positional relationship of FIG. 26A.

For example, the parts box 30 is disposed inclined relative to the second imaging unit 13a as shown in FIG. 26A. Accordingly, when the parts box code Ca is captured as the image shown in FIG. 26B, the reading angle $\alpha$ of the parts box code Ca relative to the second imaging unit 13a is calculated on the basis of the length ratio of four sides obtained from four corner positions of the parts box code Ca (see FIG. 25A).

Subsequently, reading distance calculation is performed at step S219 in FIG. 24. At step S219, a distance from the second imaging unit 13a to the parts box code Ca is calculated as a reading distance y on the basis of the number of pixels of the parts box code Ca in the image captured by the second imaging unit 13a. The reading distance y can be calculated on the basis of the image corrected so that each angle of four corners of the parts box code Ca becomes 90° by using the reading angle $\alpha$ calculated as described above.

Figure 27:
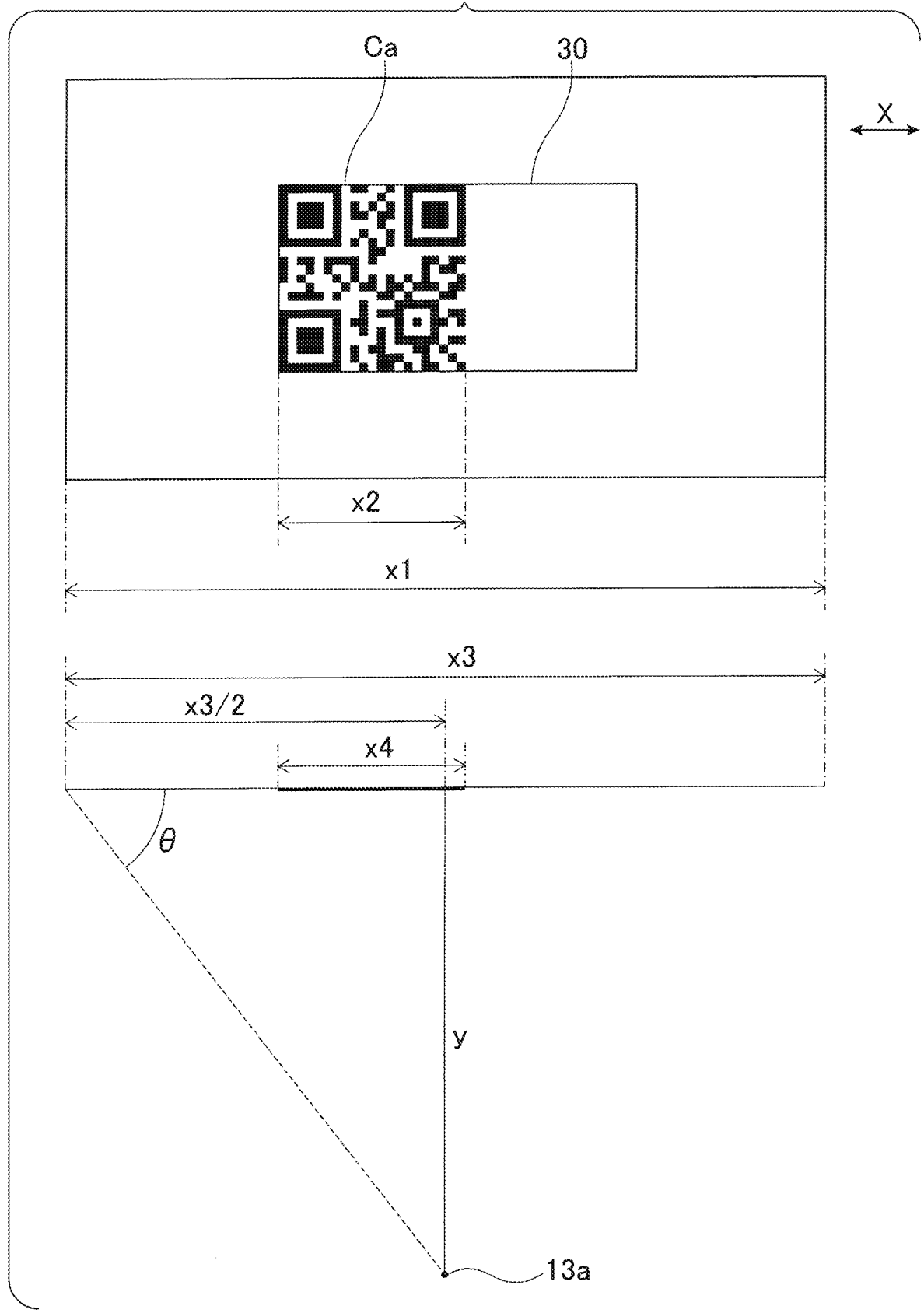
FIG. 27 is a view illustrating a method of calculating a distance from a second imaging unit to a parts box.

For example, for the parts box code Ca captured as shown in FIG. 27, the relationship of equation (1) holds when the number of pixels of the entire captured image in the x direction (horizontal direction in FIG. 27) is x1, the number of pixels of the parts box code Ca in the x direction is x2, the actual size corresponding to the entire captured image in the x direction at the position of the parts box code Ca is x3, and the actual size of the actual parts box code Ca in the x direction is x4. Further, for the reading distance y, the relationship of equation (2) is established from the size x3 corresponding to the entire captured image in the x direction at a position of the parts box code Ca, and an angle $\theta$ obtained from the angle of view, the resolution, and the like of the second imaging unit 13a.

$$x1:x2=x3:x4 \quad (1)$$

$$y=x3/2\times\tan\theta \quad (2)$$

Since x1, x4, and θ are known, the reading distance y can be calculated by the following equation (3) obtained from the equations (1) and (2) on the basis of the number of pixels x2 of the parts box code Ca in the x direction.

$$y=(x1 \times x4/x2)/2 \times \tan \theta \tag{3}$$

When the reading angle α and the reading distance y are calculated as described above, relative coordinate estimation is performed at step S221 in FIG. 24. At step S221, first, the relative coordinates of the parts box code Ca relative to the second imaging unit 13a is calculated on the basis of the reading angle α and the reading distance y calculated as described above. Then, the relative coordinates of the parts box 30 relative to the second imaging unit 13a is estimated on the basis of the relative coordinates of the parts box code Ca thus calculated, the code position, code size, box size, and the like read from the parts box code Ca. Thus, how the parts box 30 is positioned relative to the second imaging unit 13a can be estimated.

Figure 23:
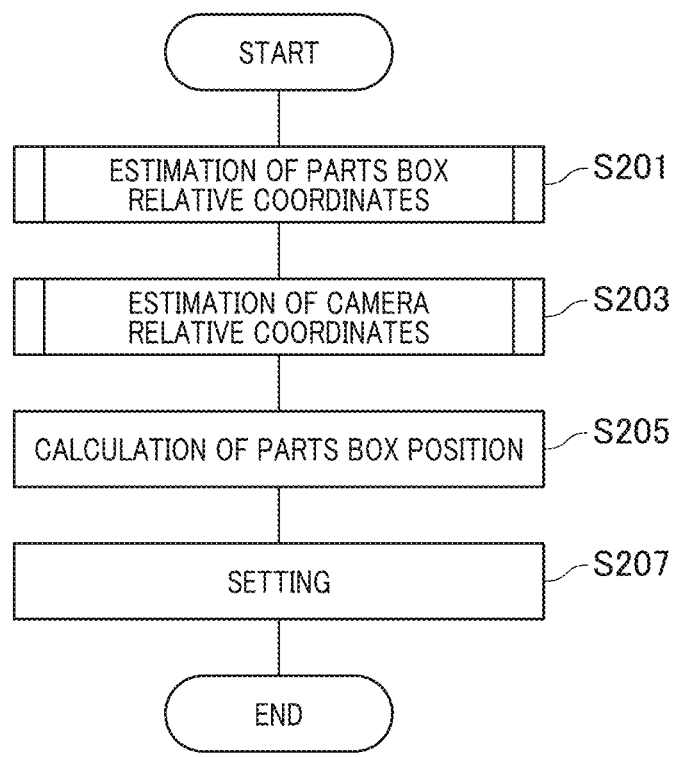
FIG. 23 is a flowchart illustrating the order of execution in monitoring area setting performed by a control unit in the eighth embodiment.
Figure 24:
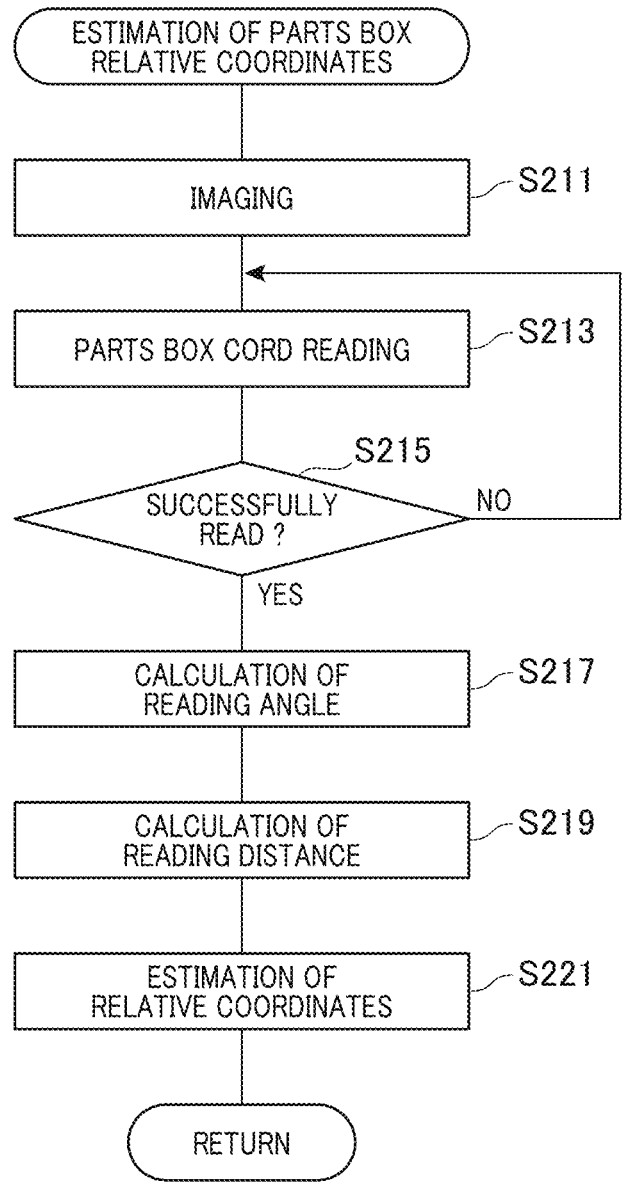
FIG. 24 is a flowchart illustrating the order of execution in a subroutine of parts box relative coordinate estimation in FIG. 23.

When the relative coordinates of the parts box 30 relative to the second imaging unit 13a is estimated as described above, and thus parts box relative coordinate estimation at step S201 in FIG. 23 is completed, the relative coordinates of the second imaging unit 13a relative to the imaging unit 13 is estimated in camera relative coordinate estimation at step S203. In the subroutine of step S203, as shown in FIG. 25, the imaging unit 13 is ready to image the camera code Cb (S231 in FIG. 25), and then decoding for reading the captured camera code Cb is performed (S233).

When the camera code Cb is successfully read (Yes at S235), reading angle calculation is performed at step S237, and the angle of the camera code Cb relative to the imaging unit 13 is calculated as a reading angle by using the same calculation method as the reading angle calculation of step S217 in FIG. 24. After step S237 in FIG. 25, reading distance calculation is performed at step S239, and the distance from the imaging unit 13 to the camera code Cb is calculated as a reading distance on the basis of the number of pixels of the camera code Cb in the image captured by the imaging unit 13 by using the same calculation method as the reading distance calculation of step S219 in FIG. 24.

When the reading angle and the reading distance are calculated as described above, relative coordinate estimation is performed at step S241 in FIG. 25, and the relative coordinates of the camera code Cb relative to the imaging unit 13 is calculated by using the same calculation method as the relative coordinate estimation of step S221 in FIG. 24. Then, the relative coordinates of the second imaging unit 13a relative to the imaging unit 13 is estimated on the basis of the relative coordinates of the camera code Cb thus calculated, the reading results read from the camera code Cb. Thus, how the second imaging unit 13a is positioned relative to the imaging unit 13 can be estimated. When the second imaging unit 13a is disposed at a predetermined position relative to the imaging unit 13, the camera relative coordinate estimation described above may be omitted since the relative coordinates of the second imaging unit 13a relative to the imaging unit 13 are specified.

When the relative coordinates of the second imaging unit 13a relative to the imaging unit 13 is estimated as described above, and thus camera relative coordinate estimation at step S203 in FIG. 23 is completed, the parts box position calculation is performed at step S205. At step S205, a position (relative coordinates) of the parts box 30 relative to the imaging unit 13 is calculated on the basis of the relative coordinates of the parts box 30 relative to the second imaging unit 13a and the relative coordinates of the second imaging unit 13a relative to the imaging unit 13.

Accordingly, since the area occupied by the parts box 30 in the image captured by the imaging unit 13 can be estimated, the area estimated as the parts box 30 in the captured image is set as a monitoring area in the setting at step S207, and the monitoring area setting ends. When a plurality of parts box codes Ca are imaged by the second imaging unit 13a in a decodable manner, the monitoring area can be set for each parts box code Ca in the order of execution described above. In particular, since the parts box code Ca also includes the information of the part 20, the type of the part 20 corresponding to the monitoring area can also be specified.

Figure 28A:
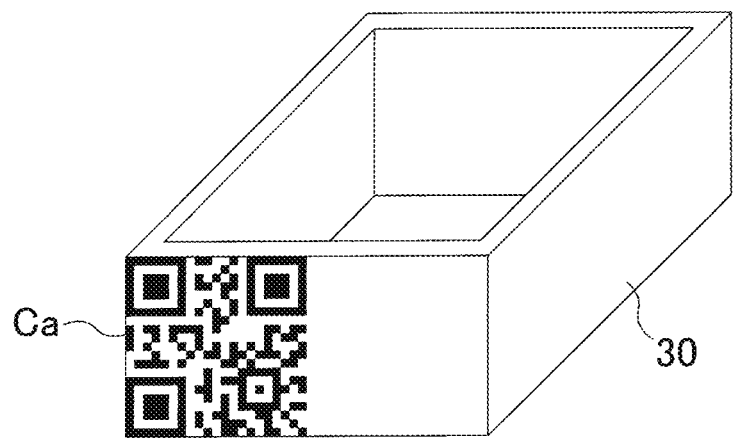
FIG. 28A is a view illustrating an attachment position of a parts box code to a parts box.
Figure 28B:
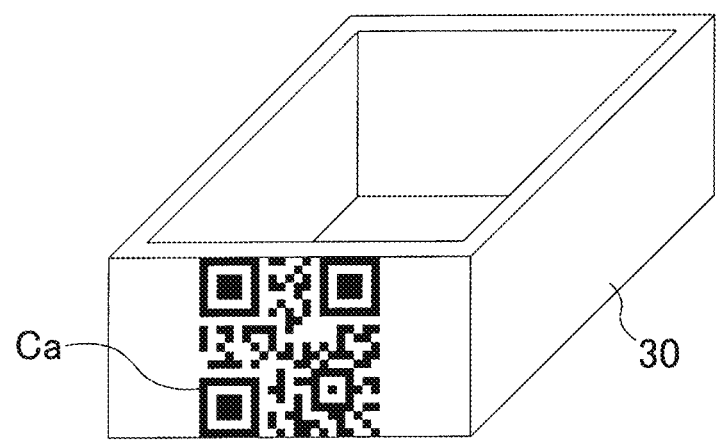
FIG. 28B is a view illustrating an attachment position of a parts box code to a parts box.
Figure 28C:
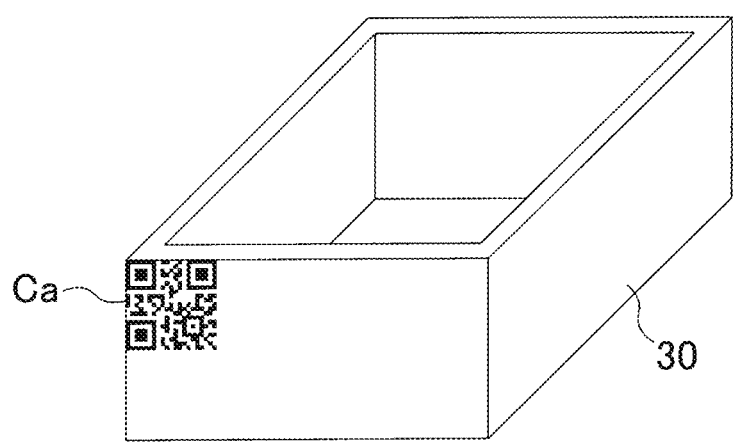
FIG. 28C is a view illustrating an attachment position of a parts box code to a parts box.

In the present embodiment, as shown in FIG. 28A, the parts box code Ca is provided close to one side of a side face of the parts box 30 which is oriented to the second imaging unit 13a, and has a size as large as possible. However, this is merely an example, and the parts box code Ca may also be provided at any position as long as it corresponds to a position of a code recorded. For example, as shown in FIG. 28B, the parts box code Ca may be provided at the center of a side face of the parts box 30 which is oriented to the second imaging unit 13a, or as shown in FIG. 28C, may be provided close to one side of a side face, and has a relatively small size.

Further, assuming the case where the position on which the parts box code Ca is provided in parts box 30 cannot be located, it is also possible to calculate the relative coordinates of the parts box code Ca and the surface of the parts box 30 on which the parts box code Ca is provided from the image captured by the second imaging unit 13a and estimate the relative coordinates of the parts box 30 relative to the second imaging unit 13a by using the calculation result and the box size and code size. In this case, the code position is not recorded in the parts box code Ca.

Figure 29A:
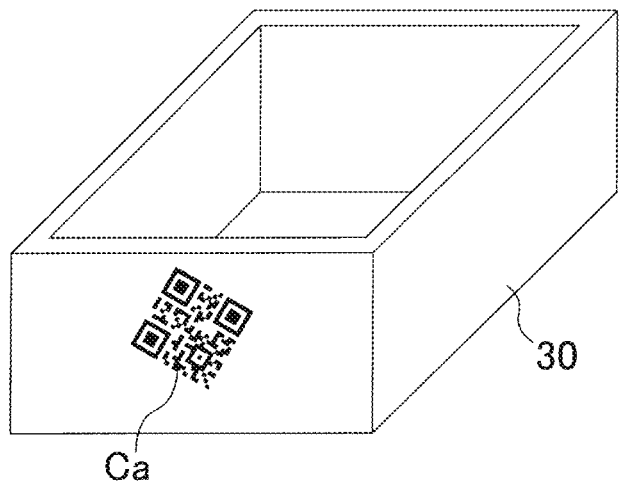
FIG. 29A is a view illustrating that a parts box code is randomly provided on a parts box.
Figure 29B:
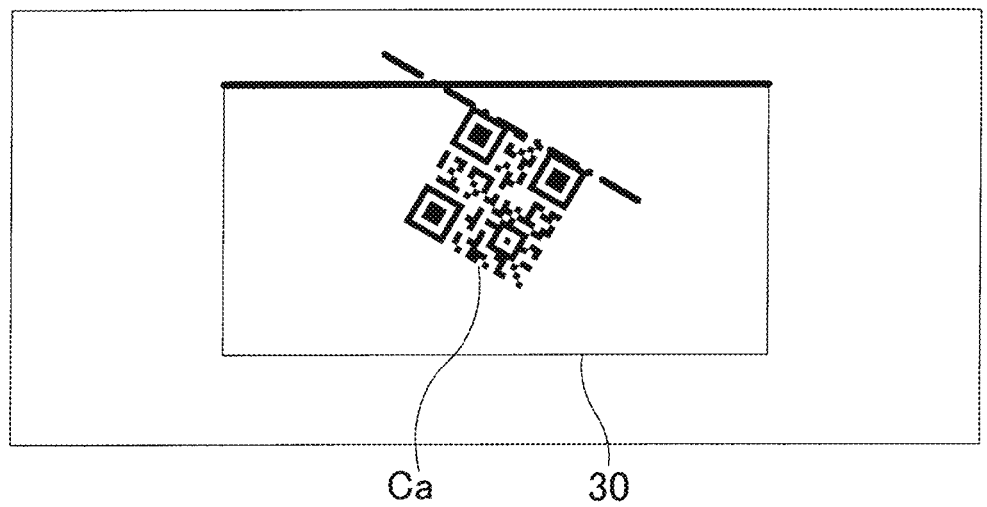
FIG. 29B is a view illustrating an image captured by the second imaging unit in the positional relationship of FIG. 29A.

For example, when the parts box code Ca is provided on the parts box 30 as shown in FIG. 29A, and thus the parts box code Ca and the parts box 30 are imaged as shown in FIG. 29B, the above relative coordinates can be calculated by detecting where on the surface of the parts box 30 the component box code Ca is provided and how it is skewed by using image processing such as edge search. For example, as indicated by the bold line in FIG. 29B, the length (known) and the angle of the upper end face of the parts box 30 can be compared with the length (known) and the angle of one side of the parts box code Ca to thereby detect where on the surface of the parts box 30 the parts box code Ca is provided and how it is skewed.

Although the front face of the second imaging unit 13a as viewed from the worker M is configured to image the parts box code Ca on each parts box 30 disposed on the shelf 2, the back face, for example, of the second imaging unit 13a as viewed from the worker M may also be configured to capture images.

Figure 30:
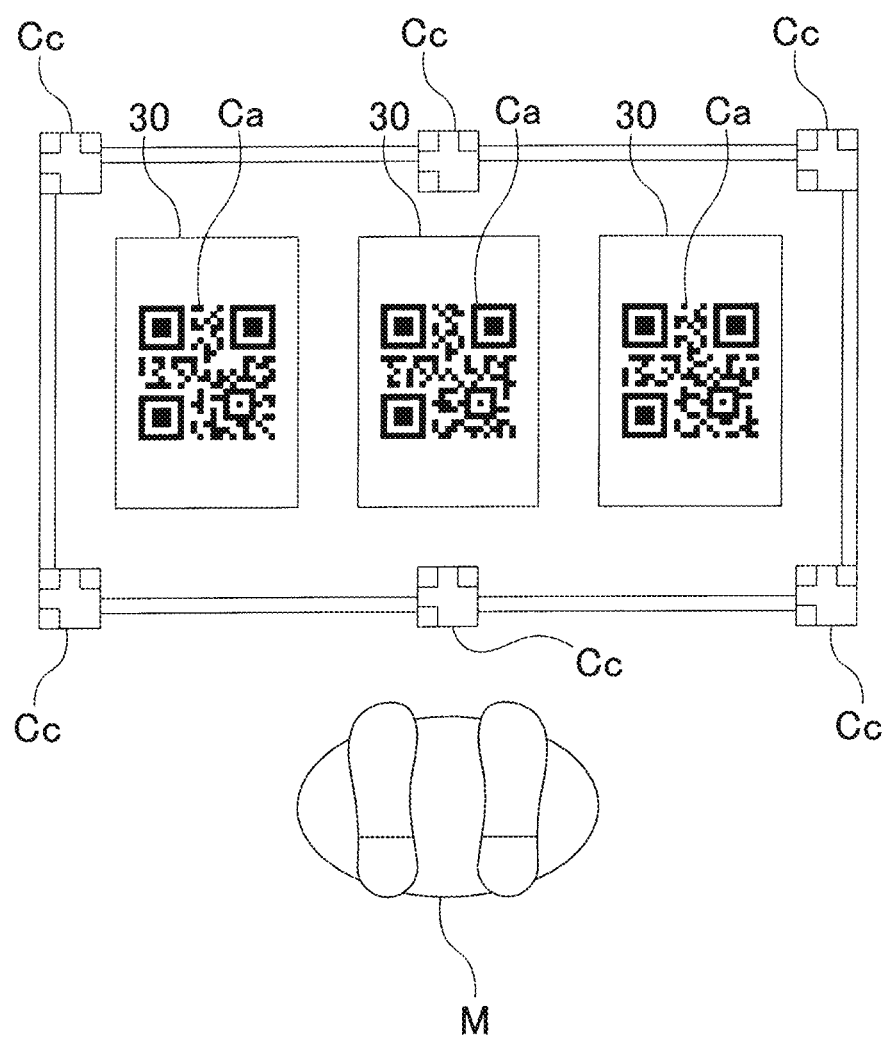
FIG. 30 is a view illustrating an essential part of a work analysis device according to a first modified example of the eighth embodiment.

FIG. 30 illustrate a first modified example of the present embodiment, in which, under the assumption that the parts boxes 30, each having the parts box code Ca provided on the bottom, are placed on a transparent portion of the shelf 2, the second imaging unit 13a is disposed at a position where it can image the parts box code Ca from underside via the transparent portion of the shelf 2. In this case, for example, the information codes Cc are provided at predetermined positions surrounding a transparent portion of the shelf 2 in the imaging range of the second imaging unit 13a. Since information on the position of the shelf 2 on which the information code Cc is provided and the like is recorded in the information code Cc, the relative coordinates of the shelf 2 relative to the second imaging unit 13a can be estimated from the image captured by the second imaging unit 13a. Accordingly, by estimating the relative coordinates of the shelf 2 relative to the imaging unit 13 by using another information code or the like, the relative coordinates of the second imaging unit 13a relative to the imaging unit 13 can be estimated. Thus, on the basis of the relative coordinates of the parts box 30 relative to the second imaging unit 13a and the relative coordinates of the second imaging unit 13a relative to the imaging unit 13, the position of the parts box 30 relative to the imaging unit 13 can be calculated. Therefore, the area occupied by the parts box 30 in the image captured by the imaging unit 13 can be set as a monitoring area.

In particular, since the parts box code Ca is provided on the bottom of the parts box 30, the parts box code Ca can be increased in size compared with the case where the parts box code Ca is provided on the side face or the like of the parts box 30. Accordingly, the accuracy in coordinate estimation by reading the parts box code Ca can be improved. Further, since the parts box code Ca and the information code Cc can be imaged at the same time by the second imaging unit 13a, the positional relationship between the parts box code Ca and the information code Cc can also be calculated with improved accuracy. Further, since the second imaging unit 13a can be disposed under the shelf 2, a space-saving work analysis device 10 can be achieved even if it includes the second imaging unit 13a. In addition, the parts box code Ca can also be provided on the parts box, such as a pallet, having no space on the side face or on the top for providing the information code. In a configuration in which the front face or back face of the second imaging unit 13a as viewed from the worker M is configured to image the parts box 30, the parts box codes Ca can be imaged when the parts boxes 30 are arranged in one array. Further, in a configuration in which the second imaging unit 13a is configured to image the parts box 30 from underside, the parts box codes Ca can be imaged even when the parts boxes 30 are arranged in two or more arrays.

Figure 31:
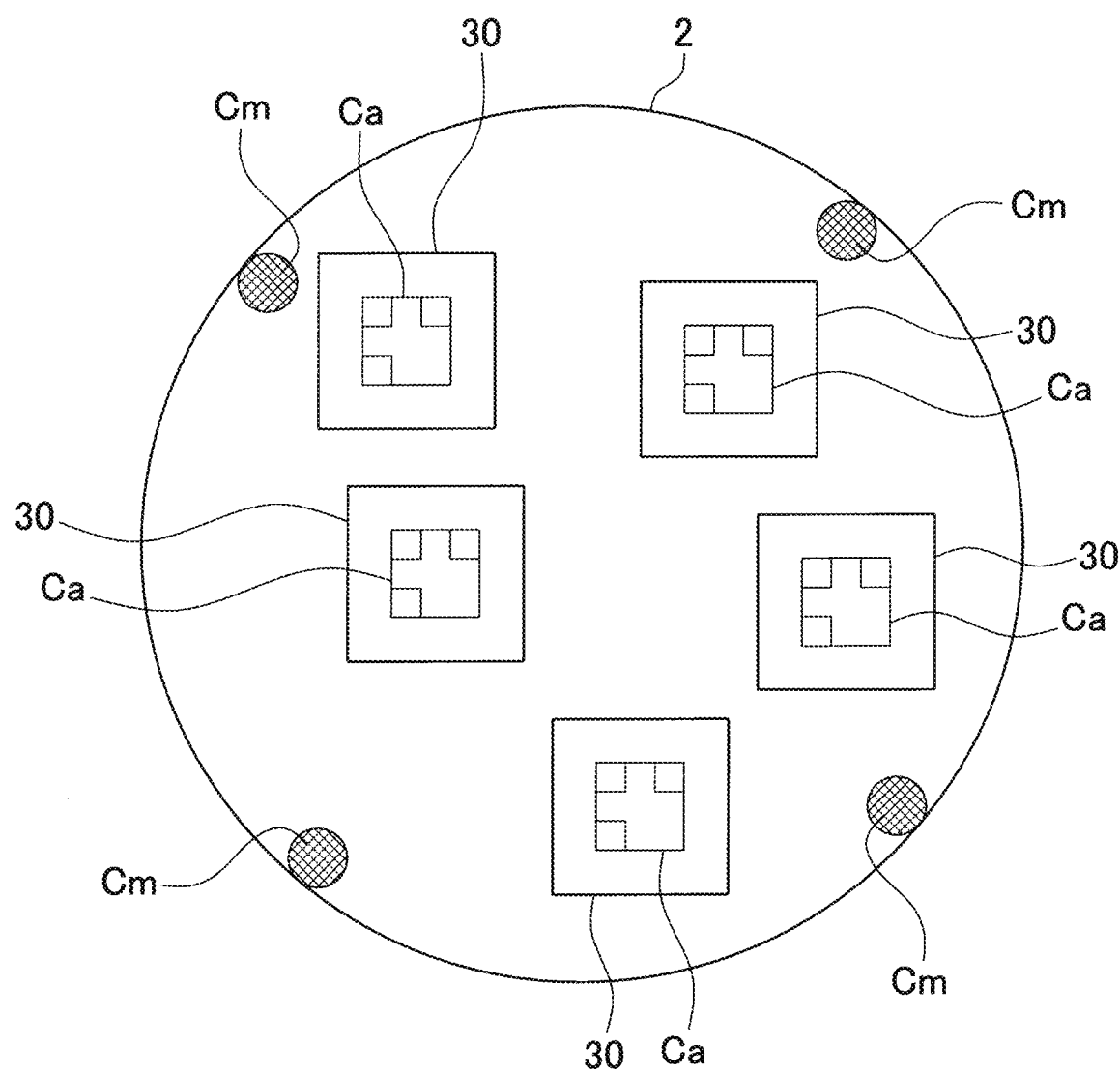
FIG. 31 is a view illustrating an essential part of a work analysis device according to a second modified example of the eighth embodiment.

Further, a transparent portion of the shelf 2 is not limited to a rectangular shape, and may also has a circular shape, for example, as in the second modified example of the present embodiment shown in FIG. 31. Further, as shown in FIG. 31, a markers Cm or the like provided at a specific position may also be used instead of the information code Cc. When the second imaging unit 13a is disposed at a predetermined position relative to the shelf 2, the information code Cc may be omitted since the relative coordinates of the shelf 2 relative to the second imaging unit 13a are specified.

Figure 32A:
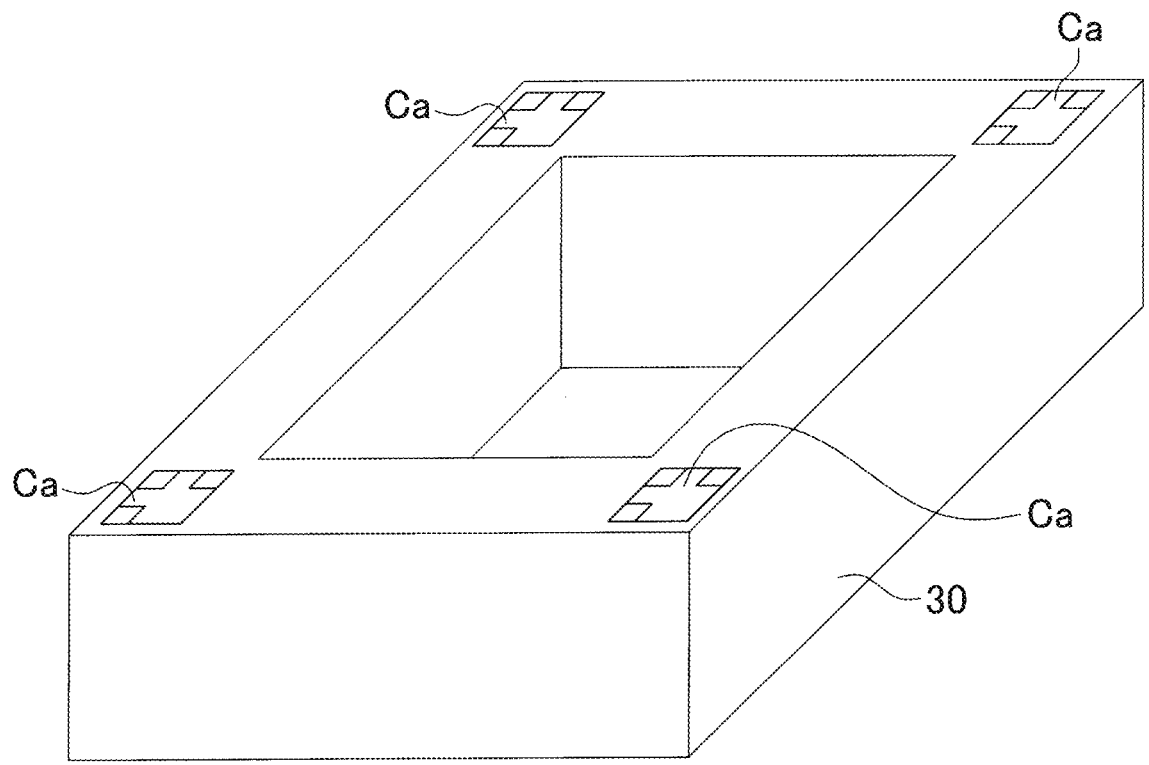
FIG. 32A is a view illustrating that a parts box code is provided on an upper end face of a peripheral wall of a parts box.
Figure 32B:
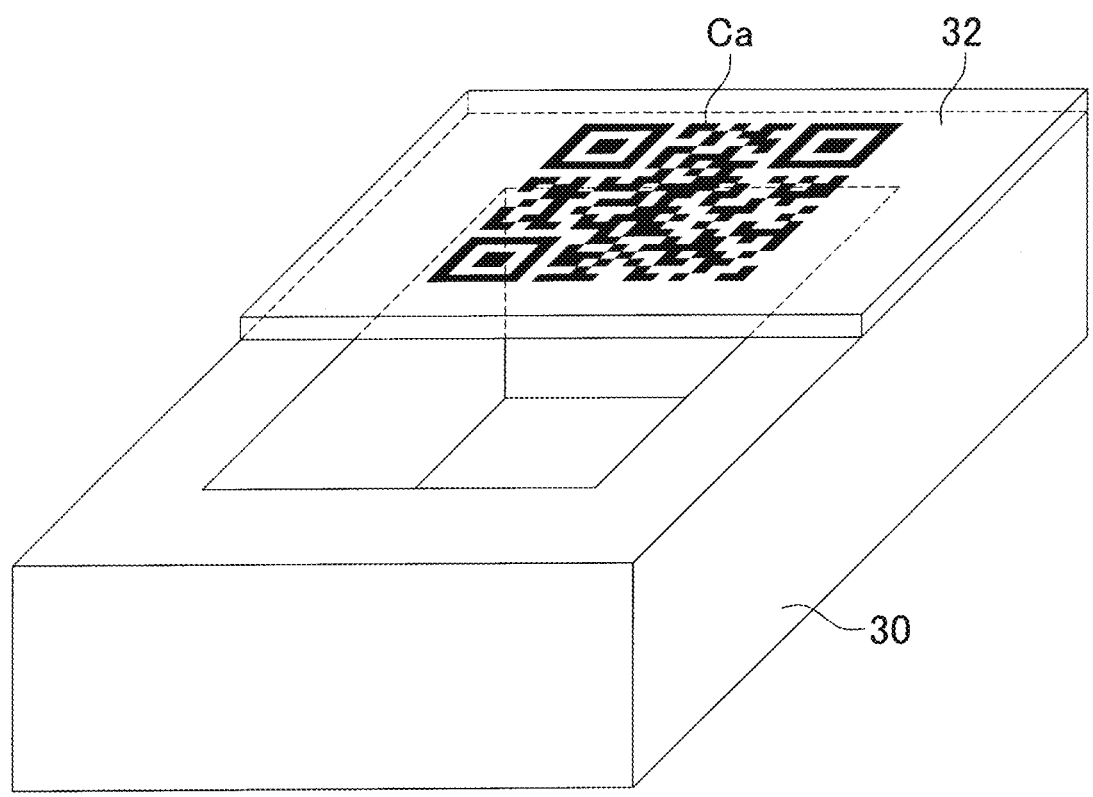
FIG. 32B is a view illustrating that a parts box code is provided on an upper lid.

In addition, the parts box code Ca is not limited to being provided on the side face or on the bottom of the parts box 30, and, for example, when the parts box 30 has a thick peripheral wall as shown in FIG. 32A, the parts box code Ca may also be provided on each corner or the like on the upper end face of the peripheral wall. Further, the parts box code Ca provided on the upper end face of the peripheral wall may be one-dimensional code in view of readability. For example, when the parts box 30 has an upper lid 32 as shown in FIG. 32B, the parts box code Ca may be provided on the upper lid 32.

The characteristic configuration of the present embodiment for setting a monitoring area corresponding to each parts box 30 by using the parts box code Ca or the like provided on each parts box 30 can also be applied to other embodiments and the like.

Ninth Embodiment

With reference to the drawings, a work analysis device and a work analysis program according to a ninth embodiment will now be described.

The ninth embodiment differs from the first embodiment in the process for setting the monitoring area. The components which are substantially the same as those of the first embodiment are denoted by the same reference signs, and the description thereof will be omitted.

Figure 33:
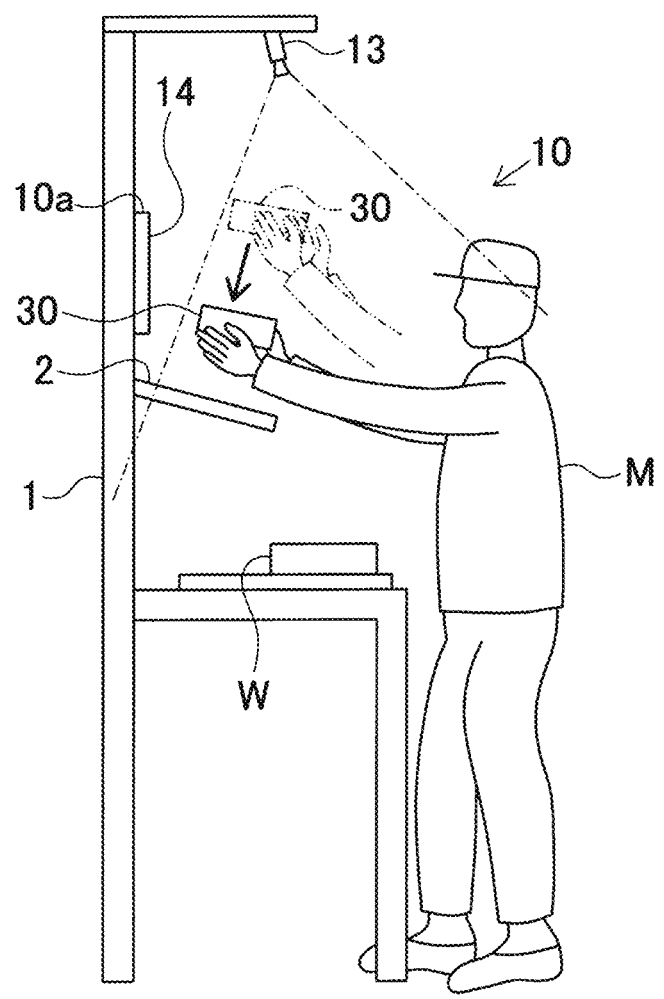
FIG. 33 is a view illustrating an essential part of a work analysis device according to a ninth embodiment.

In the present embodiment, prior to the work analysis processing, monitoring area setting is performed by the control unit 11 to set each monitoring area. In this monitoring area setting, a monitoring area corresponding to a parts box 30 is set by detecting a movement of the parts box 30 when it is placed on the shelf 2. Specifically, as shown in FIG. 33, the parts box 30 is brought closer to the imaging unit 13, and is then gradually moved away from the imaging unit 13 to be placed on the shelf 2. In so doing, a range where the distance from the imaging unit 13 gradually changes in the image captured by the imaging unit 13 is set as a monitoring area corresponding to the parts box 30.

Figure 34A:
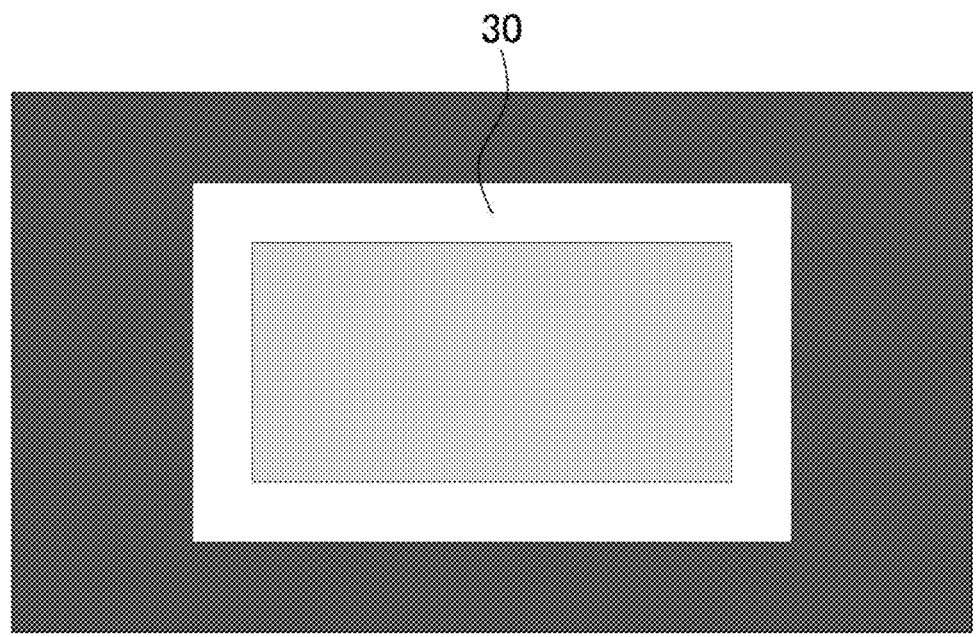
FIG. 34A is a view illustrating a distance image in a state in which a parts box is imaged near an imaging unit.
Figure 34B:
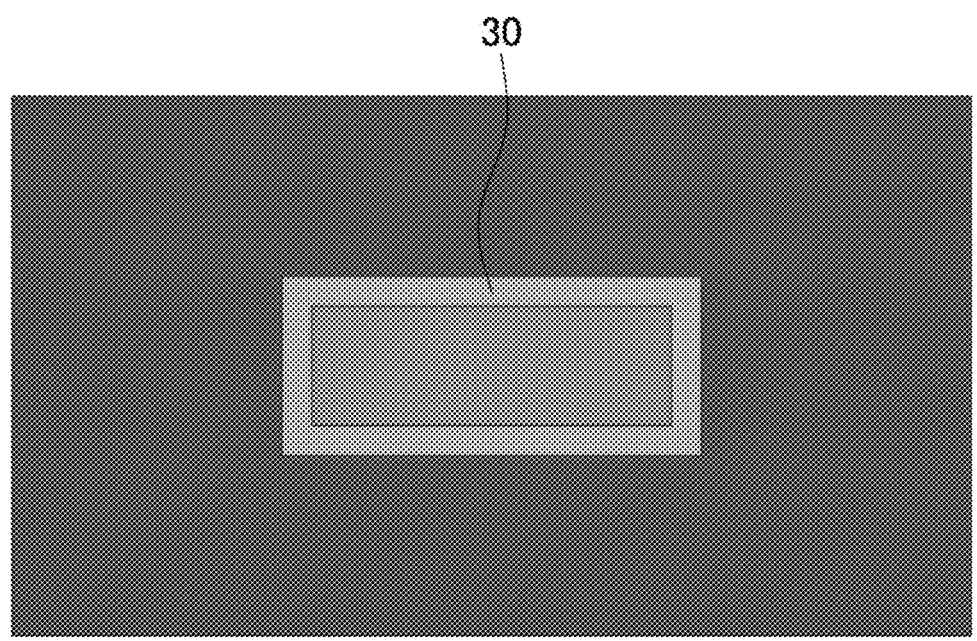
FIG. 34B is a view illustrating a distance image in a state in which a parts box is imaged at a position farther away from a position in FIG. 34A.

In the present embodiment, a ToF camera that can measure a distance to an object to be imaged is used as the imaging unit 13. For example, when a ToF camera used as the imaging unit 13 is located closer to an object to be imaged, the image appears lighter, whereas, when a ToF camera is located farther away from an object to be imaged, the image appears darker. Hence, when the parts box 30 located relatively close to the imaging unit 13 is imaged, the image of the parts box 30 appears in lighter color, as illustrated as a distance image in FIG. 34A. When the parts box 30 is moved farther away from the imaging unit 13, the image of the parts box 30 appears darker and gets closer to the color corresponding to the shelf 2, as illustrated as a distance image in FIG. 34B. Further, another ToF camera may be provided separately from the imaging unit 13 to set a monitoring area corresponding to the parts box 30 by using the imaging result of this ToF camera.

Referring to the drawings, the monitoring area setting performed by the control unit 11 in the present embodiment will now be specifically described.

Figure 35:
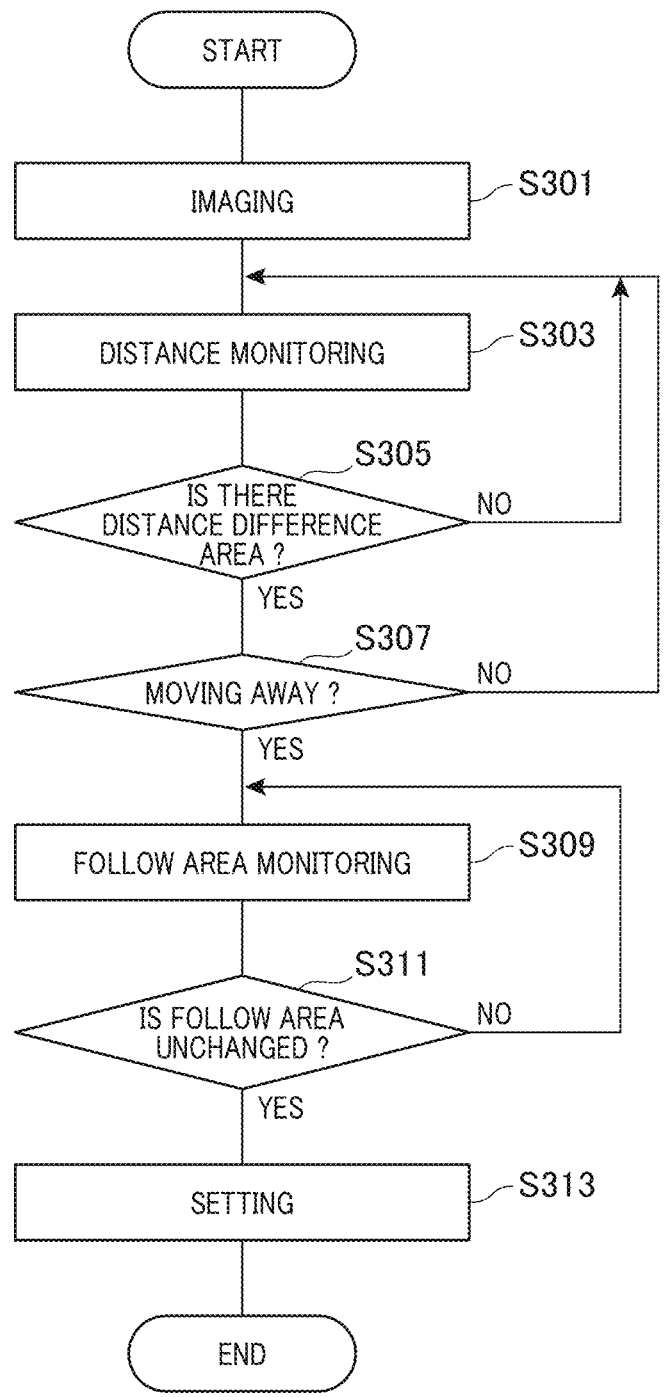
FIG. 35 is a flowchart illustrating the order of execution in monitoring area setting performed by a control unit in the ninth embodiment.

Prior to the work analysis processing, the monitoring area setting is initiated by the control unit 11 in response to a predetermined operation. In imaging at step S301 in FIG. 35, the parts box 30 can be imaged while it is being placed on the shelf 2. Subsequently, distance monitoring is performed at step S303 so that a distance from the imaging unit 13 can be measured according to a captured image in the imaging range of a portion of the shelf 2 where the parts box 30 is to be placed.

Subsequently, in determination at step S305, it is determined whether or not there is an area in which a distance difference is generated due to a movement of an object (hereinafter, also referred to as a distance difference area) in an imaging range of the imaging unit 13. If the parts box 30 is not brought closer to the shelf 2, and there is no movement in the imaging range of the imaging unit 13, it is determined as "No" at step S305 repeatedly.

When a distance difference area is generated due to the parts box 30 entering the imaging range of the imaging unit 13 since it is brought closer to the imaging unit 13 by the worker M, it is determined as "Yes" at step S305. Then, in determination at step S307, it is determined whether or not the distance difference area is attributed to movement away from the imaging unit 13. As the parts box 30, which has entered the imaging range of the imaging unit 13, is moved and placed on the shelf 2 by the worker M, the distance between the imaging unit 13 and the parts box 30 increases. In this case, the distance difference area becomes smaller in size while getting darker. Accordingly, it is determined that the distance difference area is attributed to movement away from the imaging unit 13 (Yes at S307).

In this case, in follow area monitoring at step S309, the distance difference area is set as a follow area corresponding to the parts box 30, which is to be followed, and how the follow area changes is monitored. Subsequently, in determination at step S311, it is determined whether or not the follow area defined as described above does not change any more, that is, whether or not the follow area is unchanged. If the worker M is in the process of placing the parts box 30 on the shelf 2 and thus the parts box 30 is being farther away from the imaging unit 13, the follow area continues to change. In this case, it is determined as "No" at step S311 repeatedly.

When the parts box 30 is placed on the shelf 2 by the worker M, the distance from the parts box 30 to the imaging unit 13, and thus the follow area, does not change any more. Since the follow area is unchanged, it is determined as "Yes" at step S311. When it is determined as "Yes" at step S311, the follow area which does not change any more is set as a monitoring area in setting at step S313, and the monitoring area setting ends. Further, when work is performed by using a plurality of parts boxes 30, monitoring areas corresponding to the respective parts boxes 30 can be set by performing the above monitoring area setting each time when one parts box 30 is placed on the shelf 2.

According to the present embodiment, since a monitoring area can be set by a general motion of the worker M placing the parts box 30 on the shelf 2 from above, there is no need of providing a device for setting a monitoring area and performing presetting or complicated terminal operations. Accordingly, it is possible to reduce a motion of the worker M required to set a monitoring area. A monitoring area can be set at a timing when the parts box 30 is placed on the shelf 2. In particular, since the monitoring area is not specified by the worker M, a deviation in setting of the monitoring area can also be reduced. Further, in the above monitoring area setting, even if an object different from the parts box 30 is present in the imaging range of the imaging unit 13, a monitoring area is not set until the object moves away from the imaging unit 13 and then it stops moving. Accordingly, setting accuracy for the monitoring area can be improved. Further, even if the image or shape of the parts box 30 varies, a monitoring area is not set until a follow area is set and then the follow area stops changing. Accordingly, a monitoring area can be set for various types of parts boxes 30.

In addition, the imaging unit 13 is not limited to a ToF camera, and may also be a general RGB camera or the like. From the image captured by this camera, a state in which the parts box 30 is moving away can be detected to thereby set the above follow area. In this configuration, the farther the parts box 30 moves away from the imaging unit 13, the smaller the area of the parts box 30 in the captured image. Accordingly, the fact that the parts box 30 is away from the imaging unit 13 can be recognized in a pseudo manner.

The above monitoring area setting is initiated not only by a predetermined operation performed by the worker M, but also, for example, by capturing predetermined information code by using the imaging unit 13, or by the worker M performing a predetermined gesture in the imaging range of the imaging unit 13.

The characteristic configuration of the present embodiment for setting a monitoring area corresponding to each parts box 30 by detecting the movement of the parts box 30 when it is being placed on the shelf 2 can also be applied to other embodiments and the like.

Tenth Embodiment

With reference to the drawings, a work analysis device and a work analysis program according to a tenth embodiment will now be described.

The tenth embodiment differs from the first embodiment in the process for setting the monitoring area. The components which are substantially the same as those of the first embodiment are denoted by the same reference signs, and the description thereof will be omitted.

Although the parts 20 are accommodated in the parts box 30 in various manners such as being organized or random, the same type of parts 20 are basically accommodated together. That is, it is considered that similar parts are together contained in each parts box 30.

In the present embodiment, the image of the parts box 30 divided into blocks, and the feature of each block is calculated. Then, it is determined that the parts 20 are present in a portion where blocks with similar features are collected. Various features including an edge feature such as color histogram or HoG (Histogram of Gradient), and a frequency may be used.

Figure 36A:
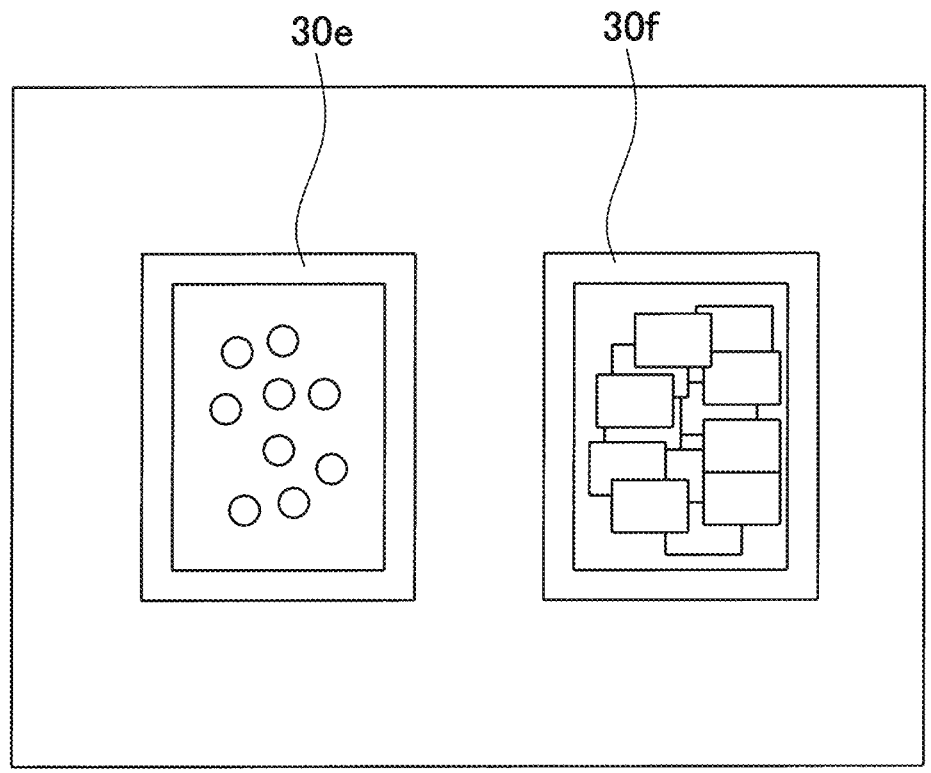
FIG. 36A is a view illustrating a captured image of two parts boxes placed on a shelf.
Figure 36B:
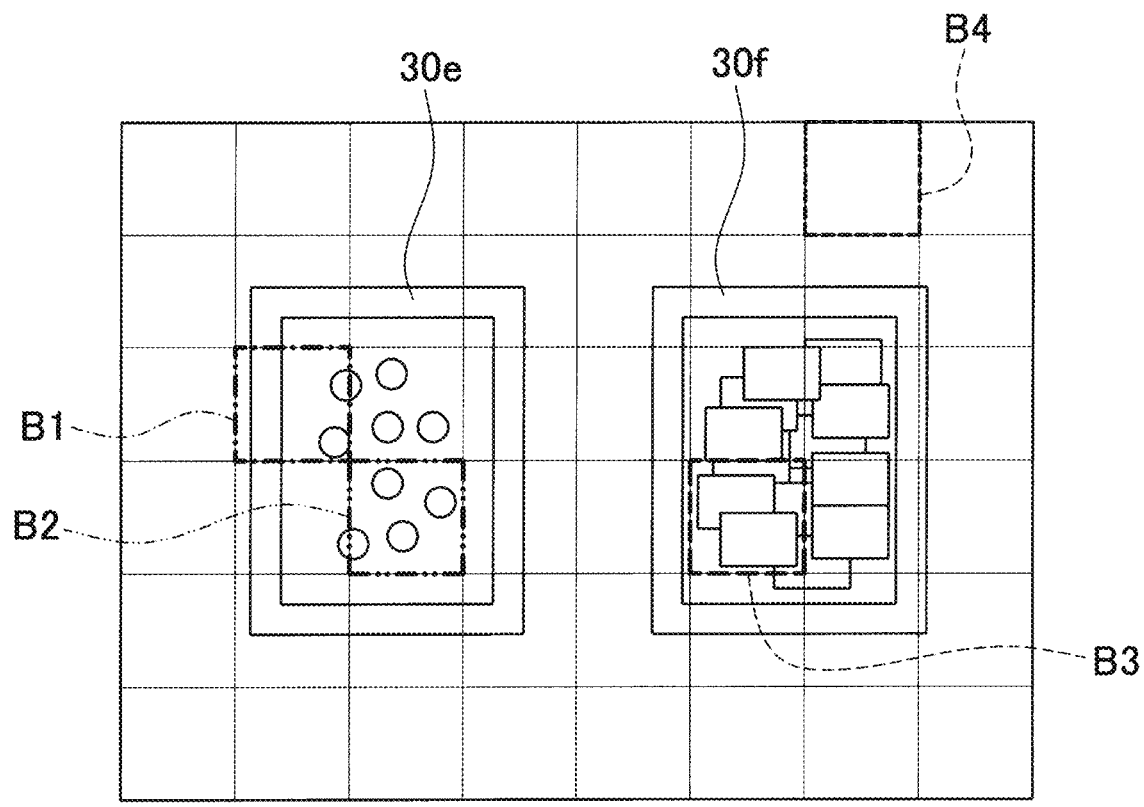
FIG. 36B is a view illustrating that FIG. 36A is divided into blocks.
Figure 37:
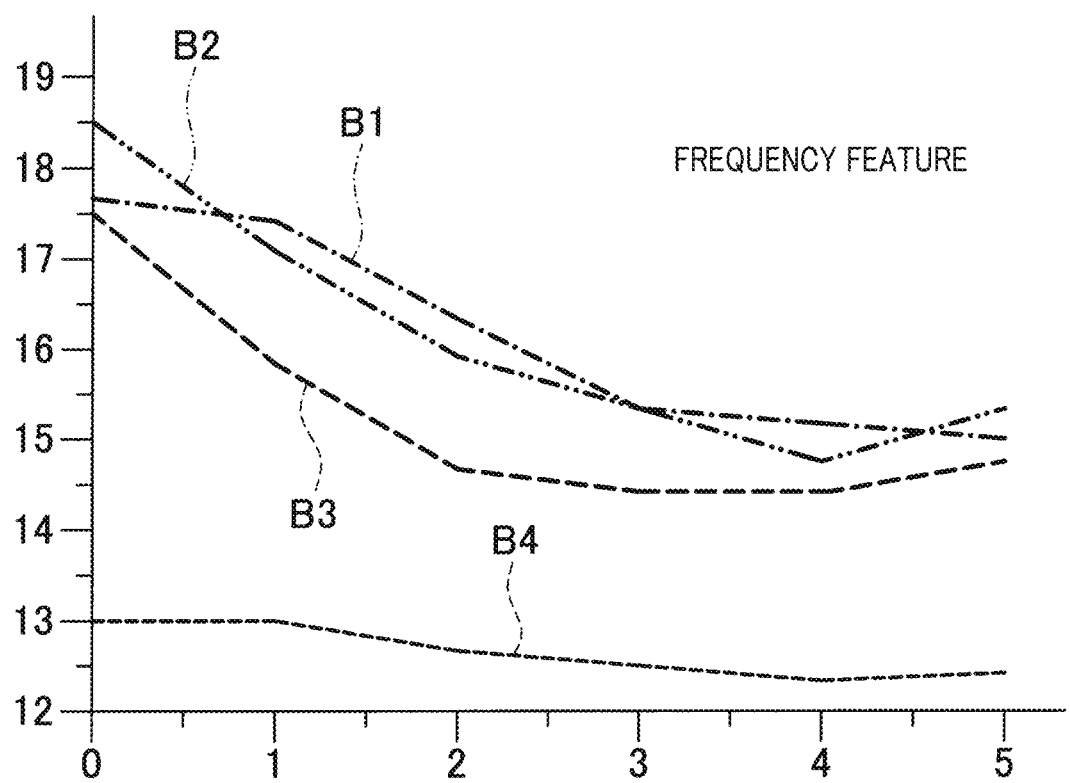
FIG. 37 is a graph of frequency features extracted from respective blocks B1 to B4 of FIG. 36B.

For example, as shown in FIG. 36A, when two parts boxes 30e and 30f are placed on the shelf 2, the captured image of the parts boxes 30e and 30f is divided into blocks as shown in FIG. 36B, and a predetermined feature is extracted from each block. In the present embodiment, a feature based on frequency is extracted, and, for example, frequency features shown in FIG. 37 are extracted from the respective blocks B1 to B4 in FIG. 36B.

When features are extracted from the respective blocks, the blocks with similar features are grouped together. This grouping can be performed, for example, by technique of grouping similar parameters such as k-means or x-means together into clusters and dividing them.

Then, if there are blocks grouped together in a rectangular area such as the parts box 30, an area formed of the grouped blocks can be set as a monitoring area corresponding to the parts box 30.

Further, the characteristic configuration of the present embodiment for setting a monitoring area corresponding to the parts box 30 by using a feature extracted from each block can also be applied to other embodiments and the like.

Eleventh Embodiment

With reference to the drawings, a work analysis device and a work analysis program according to an eleventh embodiment will now be described.

The eleventh embodiment mainly differs from the first embodiment in the process for setting the monitoring area. The components which are substantially the same as those of the first embodiment are denoted by the same reference signs, and the description thereof will be omitted.

Usually, the parts box 30 has a box shape having an upper opening of a rectangular shape. The box shape has a characteristic that the upper end face of the peripheral wall is located at the same height. Therefore, in the present embodiment, a ToF camera is used as the imaging unit 13 to measure a distance to an area where the parts box 30 is to be placed. Then, a region located at the same height is extracted, and the monitoring area corresponding to the parts box 30 is set according to the extracted shape. That is, when a region at the same height is extracted as a rectangular ring shape, the parts box 30 is detected with the region of the rectangular ring shape being taken as a peripheral wall, and a monitoring area is set to include this region. In the present embodiment, it is assumed that a placement surface of the shelf 2 on which the parts box 30 is placed is located horizontally relative to the imaging unit 13.

Figure 38A:
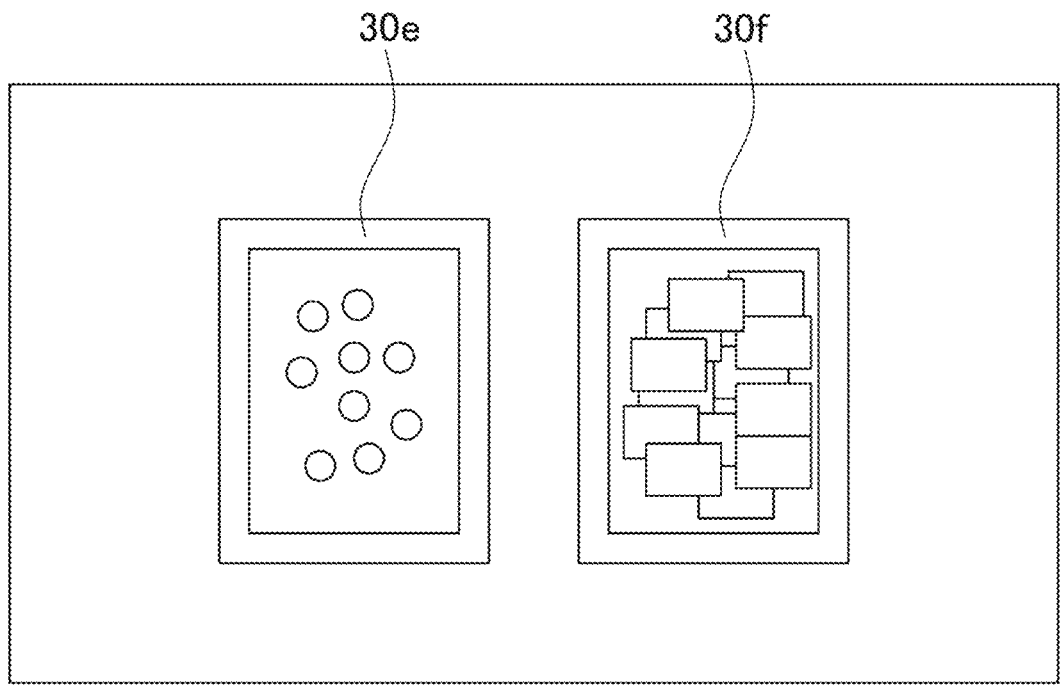
FIG. 38A and FIG. 38B is a view illustrating that two parts boxes are placed on a shelf.
Figure 38B:
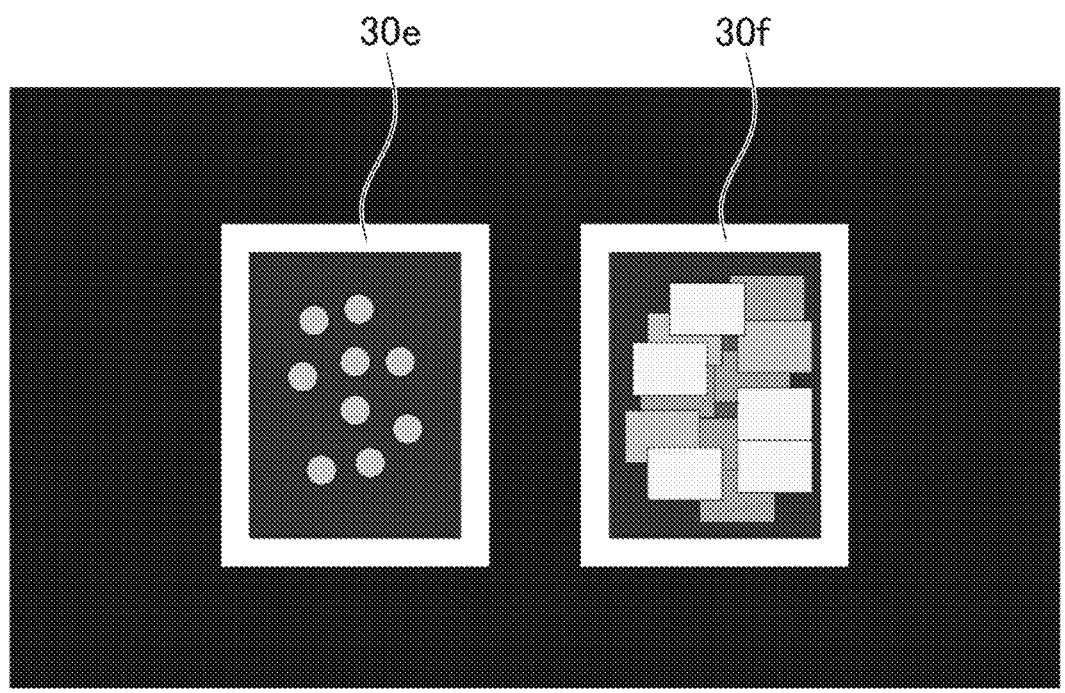

Specifically, when two parts boxes 30e and 30f are placed on the shelf 2 as shown in FIG. 38A, rectangular ring shapes are extracted as shown in the distance image shown in FIG. 38B, in which the upper end face of the peripheral wall of each parts box 30 is located at the same height.

Since a monitoring area corresponding to the parts box 30 can be set on the basis of a region at the same height in the distance image, there is no need of providing a device for setting a monitoring area and performing presetting or complicated terminal operations. Accordingly, it is possible to reduce a motion of the worker M required to set a monitoring area.

Further, another ToF camera may be provided separately from the imaging unit 13 to extract a region located at the same height. Further, when a placement surface of the shelf 2 on which each parts box 30 is located is inclined relative to the imaging unit 13, the inclination angle can be measured in advance so that the height can be corrected taking the inclination angle into consideration in the distance image. Further, the characteristic configuration of the present embodiment for setting a monitoring area corresponding to the parts box 30 on the basis of the region located at the same height in the distance image can also be applied to other embodiments and the like.

Twelfth Embodiment

With reference to the drawings, a work analysis device and a work analysis program according to a twelfth embodiment will now be described.

The twelfth embodiment differs from the first embodiment in the process for setting the monitoring area. The components which are substantially the same as those of the first embodiment are denoted by the same reference signs, and the description thereof will be omitted.

In the present embodiment, the color of each parts box 30 has a specific characteristic so that the area occupied by each parts box 30 can be easily extracted as a monitoring area from the captured image. The color that may be selected for each parts box 30 is unique to each parts box 30 and easily distinguishable from the surrounding color such as the shelf 2 or the color of the hand of the worker M.

Figure 39A:
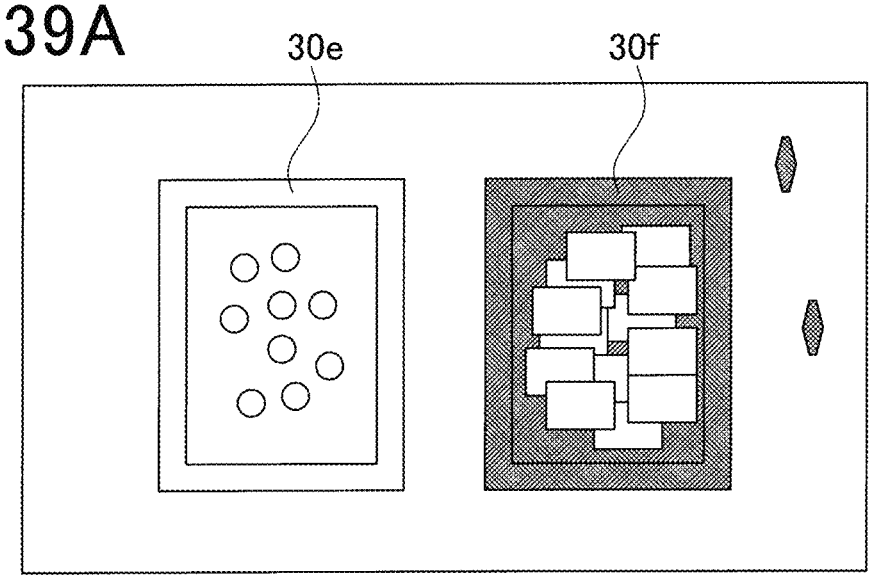
FIG. 39A is a view illustrating an essential part of a work analysis device according to a twelfth embodiment, in which this view illustrates a captured image of two parts boxes placed on a shelf.
Figure 39B:
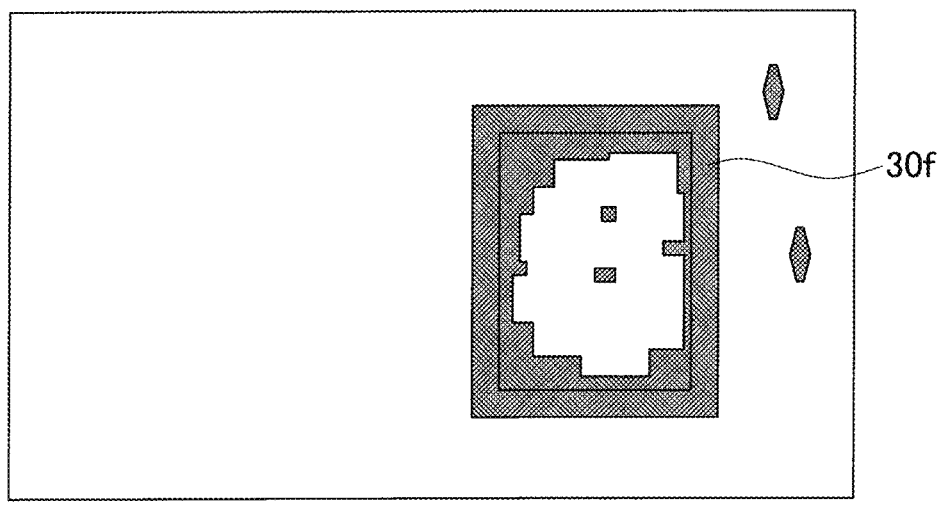
FIG. 39B is a view illustrating an essential part of a work analysis device according to the twelfth embodiment, in which this view illustrates a captured image in which an area of a second color is extracted.
Figure 39C:
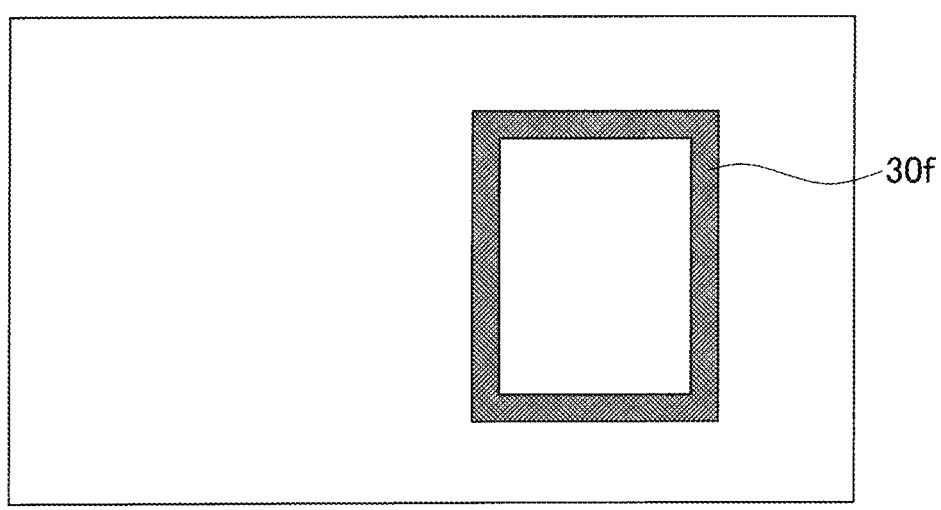
FIG. 39C is a view illustrating an essential part of a work analysis device according to the twelfth embodiment, in which this view illustrates a captured image after filtering is performed.

For example, as shown in FIG. 39A, in a captured image of the parts boxes 30e and 30f, the parts box 30e may be a first color (for example, green), and the parts box 30f may be a second color (for example, blue). When the monitoring area for the parts box 30f is set by using this captured image, an area of the second color is extracted from the image as shown in FIG. 39B. Then, filtering such as expansion and contraction, including noise removal, is performed to the image in which the area of the second color is extracted. Thus, a rectangular ring area is extracted as shown in FIG. 39C. Accordingly, an area including the extracted rectangular ring area can be set as the above monitoring area. In FIGS. 39A to 39C, only the second color is hatched.

In particular, distinguishing the color for each parts box 30 can facilitate recognition of the type of the parts box 30 corresponding to the extracted monitoring area. Thus, by associating the color with the type of the parts box 30, it is possible to detect what parts boxes 30 are arranged in what order. Even if some parts 20 have similar colors, they can be distinguished by comparison with the right arrangement order of the parts boxes 30 or the like. Depending on the environment in which the work analysis device 10 is installed, there may be an influence from an external lighting or the like. Therefore, a color space such as HSV, which has high brightness variations, can also be used to prevent erroneous recognition.

Thirteenth Embodiment

With reference to the drawings, a work analysis device and a work analysis program according to a thirteenth embodiment will now be described.

The thirteenth embodiment differs from the first embodiment in the process for setting the monitoring area. The components which are substantially the same as those of the first embodiment are denoted by the same reference signs, and the description thereof will be omitted.

In the present embodiment, prior to the work analysis processing, monitoring area setting is performed by the control unit 11 to set each monitoring area. In this monitoring area setting, an area in which an object assumed as the part 20 is imaged in the image captured by the imaging unit 13 is defined as a parts area Pn. Then, an area of the parts box 30, that is, a monitoring area, is set on the basis of the parts area Pn.

Figure 40:
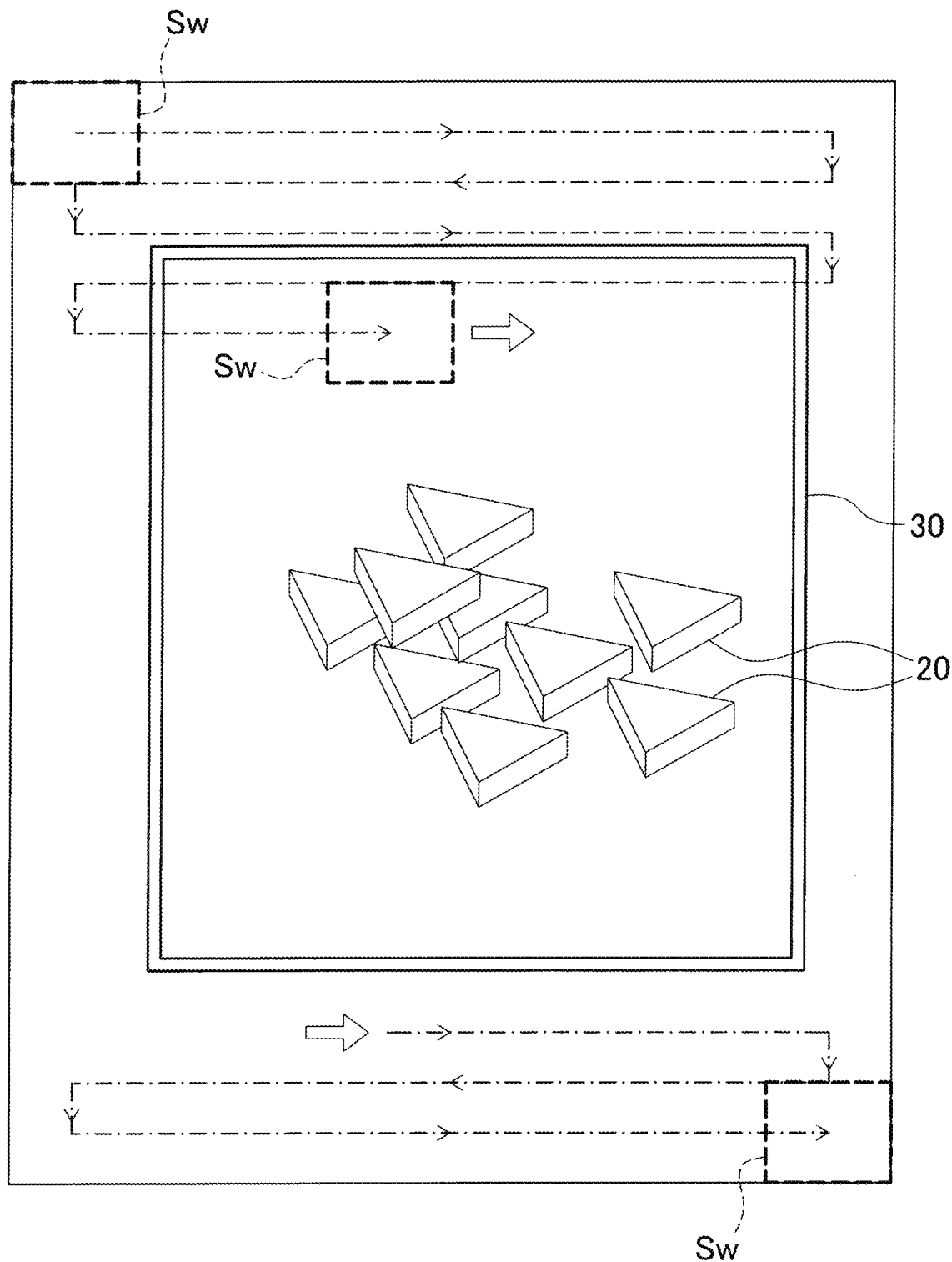
FIG. 40 is a view illustrating an essential part of monitoring area setting performed by a work analysis device according to a thirteenth embodiment.

Specifically, a single part image of the target part 20 or two or more part images of the target part 20 with different view angles (template) is prepared in advance. As shown in FIG. 40, in an extraction image in which an area where the parts box 30 may be placed is extracted from the image captured by the imaging unit 13, an area having high degree of similarity to the above part image is searched (template matching). In the present embodiment, a detection window Sw is set according to the size of the part 20 to be imaged, and an area having high degree of similarity is searched by sliding the detection window Sw in the above extraction image.

Referring to the drawings, the monitoring area setting performed by the control unit 11 in the present embodiment will now be specifically described.

Prior to the work analysis processing, the monitoring area setting is initiated by the control unit 11 in response to a predetermined operation while the parts box 30 is placed on the shelf 2. In initial setting at step S401 in FIG. 41, the type of the parts box 30 for which a monitoring area is to be set is specified, and the part image of the part 20 contained in this parts box 30 is obtained. The part image may be obtained from the storage unit 12, in which the part image is pre-stored, or may be externally obtained each time the monitoring area setting is performed.

Figure 42:
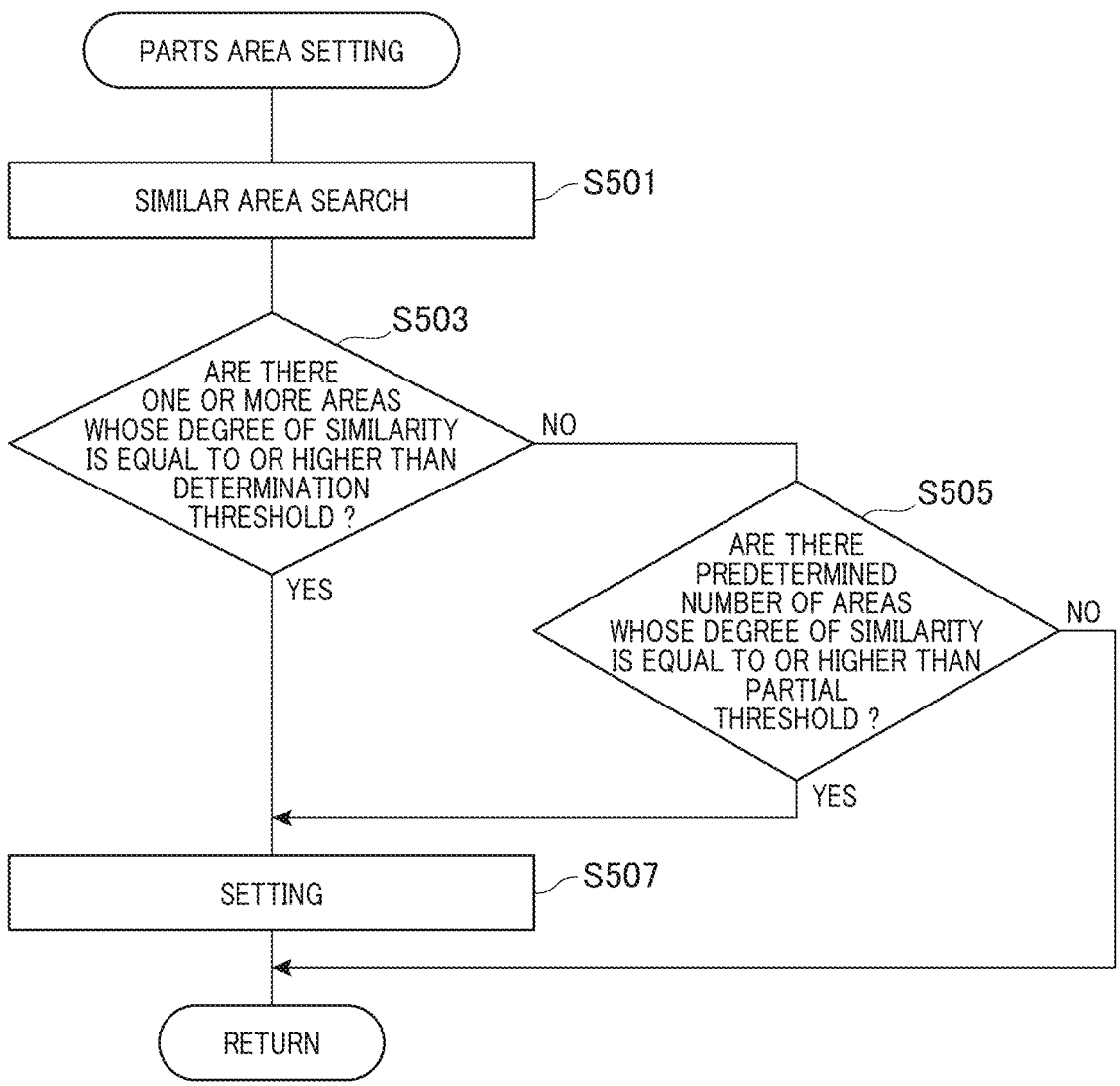
FIG. 42 is a flowchart illustrating the order of execution in a subroutine of parts area setting in FIG. 41.

When all the monitoring areas are not set (No at S403), the imaging unit 13 is ready to perform imaging (S405), and then parts area setting is performed at step S407. In the subroutine of step S407, as shown in FIG. 42, similar area search is performed at step S501. At step S501, as described above, the detection window Sw is slid at a predetermined interval (for example, by each pixel or by several pixels) in the above extraction image to search an area having high degree of similarity (see FIG. 40).

When search of an area having high degree of similarity is completed for all the extraction images, determination is performed at step S503 to determine whether or not an area having degree of similarity equal to or higher than a determination threshold has been included. In the present embodiment, for example, the determination threshold is set to 0.8. When the search result includes at least one area whose degree of similarity is equal to or higher than the determination threshold, it is determined as "Yes" at step S503. Further, even if the search result does not include at least one area whose degree of similarity is equal to or higher than the determination threshold (No at S503), it is determined as "Yes" at step S505 as long as a predetermined number of (for example, 10) areas whose degree of similarity is equal to or higher than a partial threshold (for example, 0.2) are included.

Figure 43:
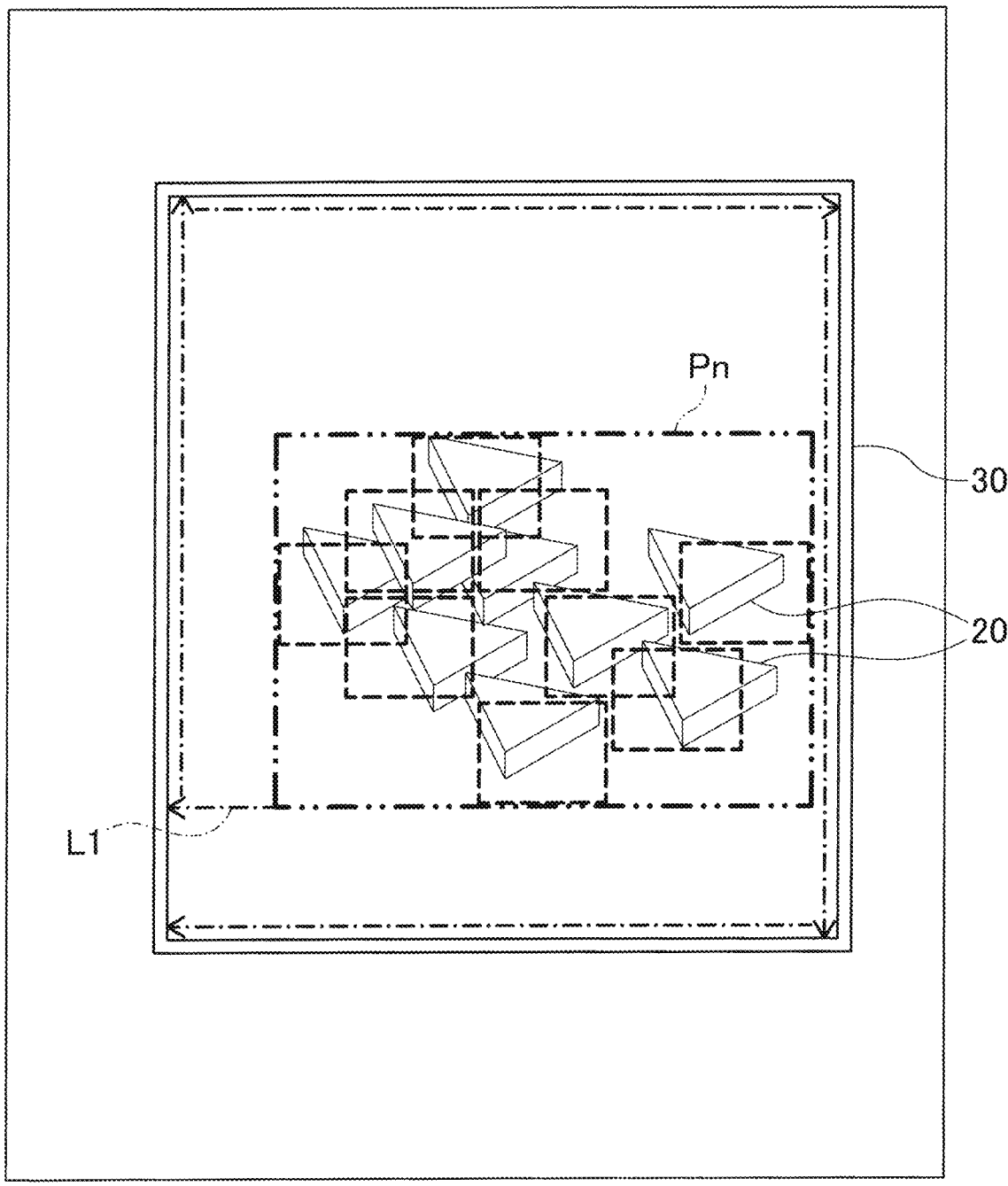
FIG. 43 is a view illustrating a monitoring area set by a parts area.

As described above, if determination at step S503 is "Yes" or determination at step S505 is "Yes," setting is performed at step S507 to set the parts area Pn on the basis of the searched area. Specifically, as shown in FIG. 43, a rectangular area including all the areas whose degree of similarity is equal to or higher than the above partial threshold is set as the parts area Pn, and the subroutine of parts area setting ends. In FIG. 43, some of the areas whose degree of similarity is equal to or higher than the above partial threshold are illustrated as the rectangles indicated by the dotted line.

On the other hand, if the search result does not include an area whose degree of similarity is equal to or higher than the determination threshold (No at S503 in FIG. 42) and does not include the predetermined number of areas whose degree of similarity is equal to or higher than the partial threshold (No at S505), the subroutine of parts area setting ends without setting the parts area Pn.

Figure 41:
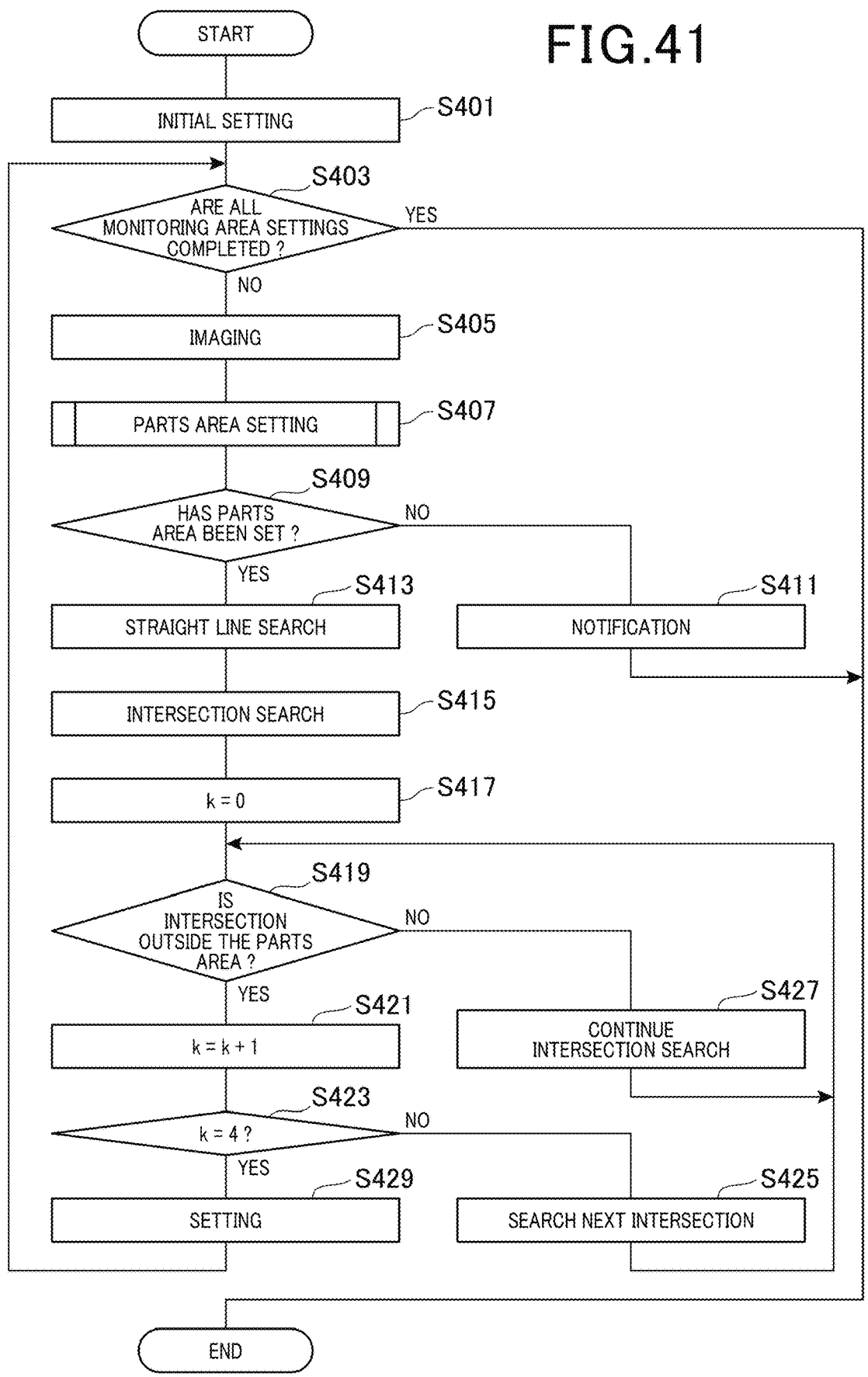
FIG. 41 is a flowchart illustrating the order of execution in monitoring area setting performed by a control unit in the thirteenth embodiment.

As described above, when the subroutine of parts area setting shown in FIG. 42 ends, determination is performed at step S409 in FIG. 41 to determine whether or not the parts area Pn has been set. If the parts area Pn has not been set, it is determined as "No" at step S409, and notification is performed at step S411. At step S411, notification is performed to notify by the displaying unit 14 that the part 20 of the search target is not found in the captured image, and the monitoring area setting ends.

On the other hand, if the parts area Pn has been set (Yes at S409), straight line search is performed at step S413. At step S413, straight line is searched toward outside from a point on the edge of the parts area Pn in the extraction image. In the present embodiment, as shown in FIG. 43, straight line is searched from the minimum X coordinate and Y coordinate in the parts area Pn in the negative X direction (see reference numeral L1 in FIG. 43). Since the parts area Pn is set within the area corresponding to the parts box 30, a straight line corresponding to the inner surface of the peripheral wall of the parts box 30 is searched by this straight line search. In addition, it is not limited to searching from the minimum X coordinate and Y coordinate in the parts area Pn in the negative X direction, and a straight line can also be searched toward outside from any point on the edge of the parts area Pn.

When the straight line is searched as described above, intersection search is performed at step S415 to search an intersection where a tip of the straight line that has been searched intersects with another straight line in the extraction image. When an intersection is searched clockwise or counterclockwise on the straight line, the number of searched intersections, or k, is initialized to 0 (S417). Then, if the intersection is outside the parts area Pn (Yes at S419), the number of searched intersections k is incremented (S421). If it is immediately after the number of intersections k is set to 0, the number of intersections k is set to 1.

If the number of intersections k is not 4 (No at S423), next intersection, which is the tip of another straight line continuous from the intersection is searched (S425). If the searched intersection is outside the parts area Pn (Yes at S419), and the number of incremented intersections k is not 4 (No at S423), the steps from step S425 onward are repeated. Further, if the searched intersection is inside the parts area Pn (No at S419), it is determined that an erroneous intersection has been searched. Then, search for an intersection on the straight line is continuously performed (S427).

Then, next intersection is searched (S425), and the number of incremented intersections k becomes 4 (Yes at S423), setting is performed at step S429. At step S429, since the rectangular area having four corners at four searched intersections corresponds to a rectangular area surrounded by the peripheral wall of the parts box 30, setting is performed to set the above rectangular area as a monitoring area. Then, after completion of step S429, the steps from step S403 onward are performed to set a monitoring area of the next parts box 30. When a monitoring area for all the parts boxes 30 are set, it is determined as "Yes" at step S403, and the monitoring area setting ends.

In the monitoring area setting of the present embodiment, an area in which an object assumed as the part 20 is imaged is defined as a parts area Pn. Then, an area of the parts box 30, that is, a monitoring area, is set on the basis of the parts area Pn. Accordingly, there is no need of providing a device for setting a monitoring area and performing presetting or complicated terminal operations, so it is possible to reduce a motion of the worker M required to set a monitoring area.

The parts area Pn is not limited to being set by using the degree of similarity to the part image, and other technique may also be used. For example, in a first modified example of the present embodiment, the parts area Pn can be set on the basis of the detection result obtained by using an edge detection algorithm (for example, Canny method).

Figure 44:
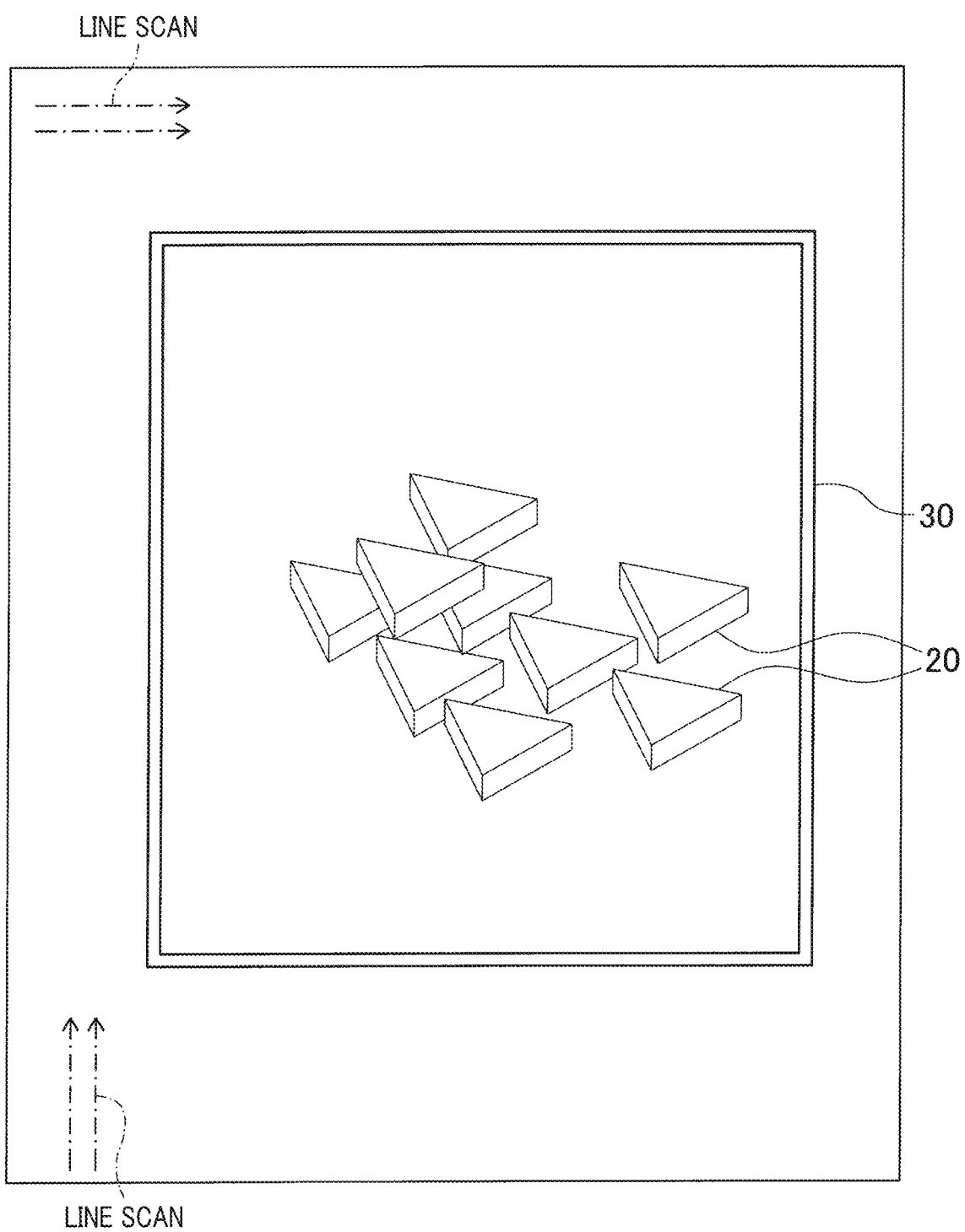
FIG. 44 is a view illustrating an essential part of monitoring area setting performed by a work analysis device according to a first modified example of the thirteenth embodiment.
Figure 45:
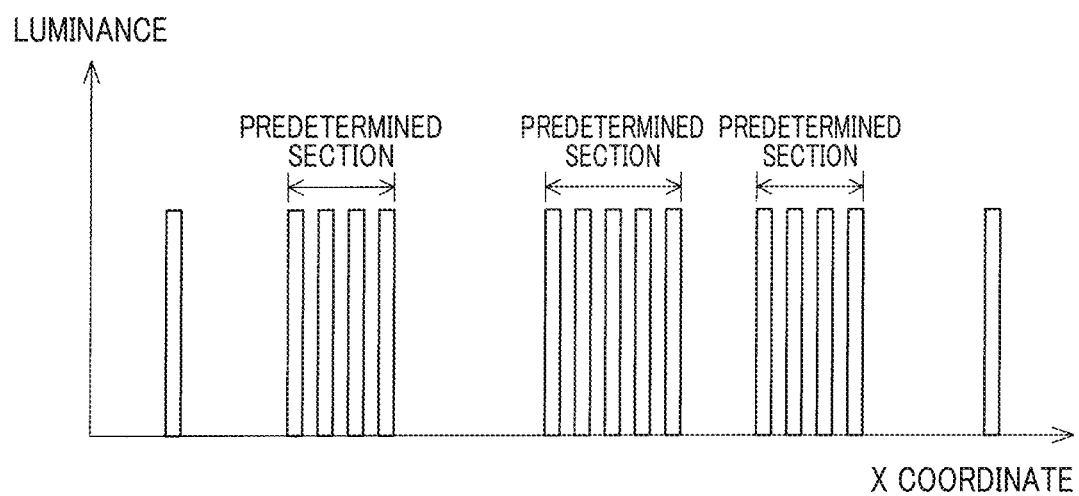
FIG. 45 is a view illustrating a detection result obtained by line-scanning a luminance in the X coordinate direction with respect to a predetermined Y coordinate.

Specifically, luminance is line-scanned in the X coordinate direction for the gray scale in the above extraction image (see FIG. 44). The Y coordinates of the start and end of a section in which an amplitude is continuously detected for a threshold number of times (e.g., four times) or more within a predetermined section (e.g., within 10 pixels) is stored. Further, luminance is also line-scanned in the Y coordinate direction (see FIG. 44), the X coordinates of the start and end of the detected section is stored. FIG. 45 conceptually illustrates a detection result obtained by line-scanning the luminance in the X coordinate direction with respect to a predetermined Y coordinate. Among the stored X coordinates and the Y coordinates, the coordinate closest to the origin is set as a point through which two of the four straight lines forming the outer edge of the parts area Pn pass, and the coordinate farthest from the origin is set as a point through which the remaining two straight lines pass. Thus, the parts area Pn is set. The above effect is also achieved even when a monitoring area is set on the basis of the parts area Pn that has been set in the above described manner.

Further, in a second modified example of the present embodiment, the parts area Pn can be set on the basis of the detection result obtained by using a corner detection algorithm (for example, Harris Corner detection).

Figure 46:
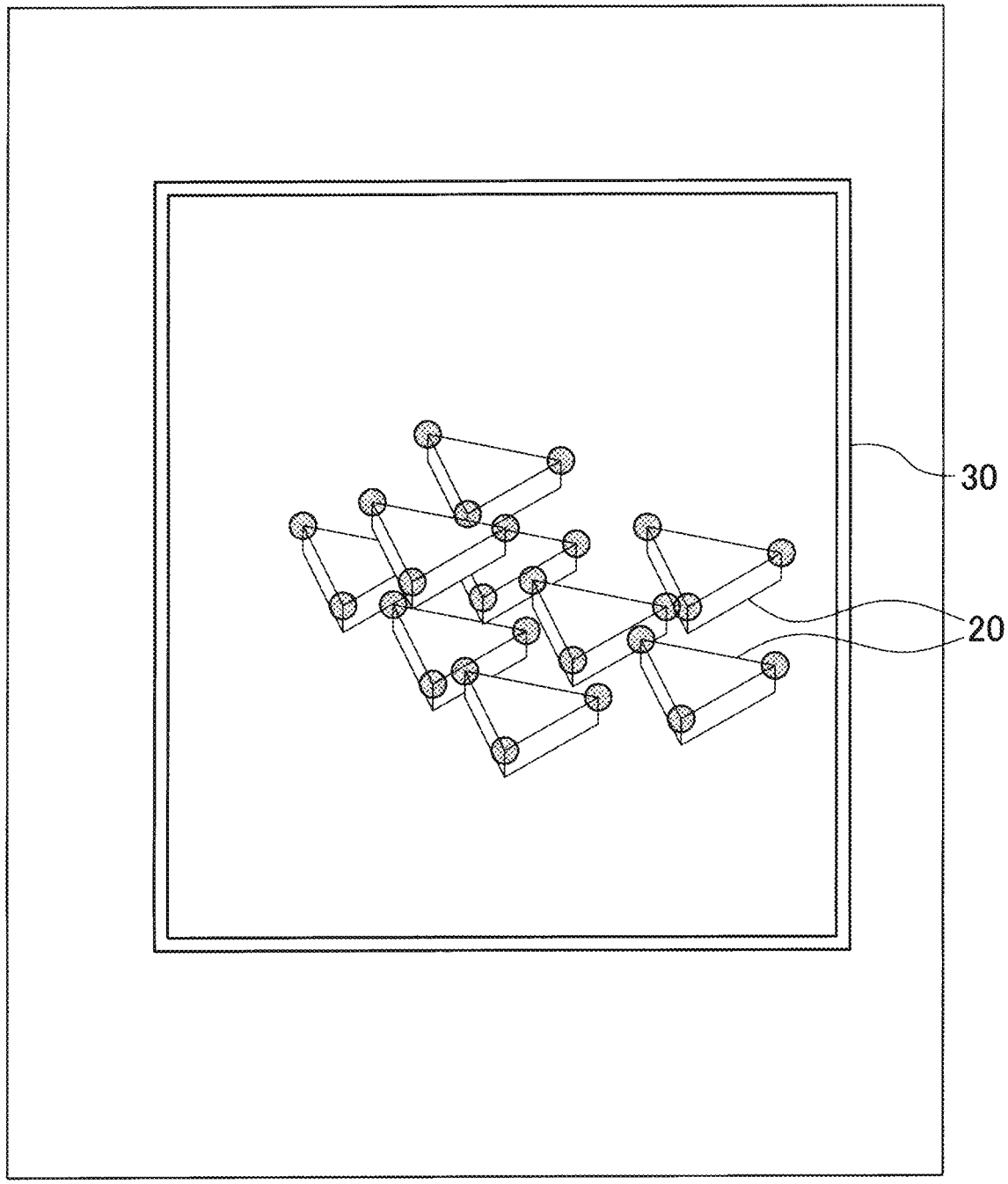
FIG. 46 is a view illustrating an essential part of monitoring area setting performed by a work analysis device according to a second modified example of the thirteenth embodiment.
Figure 47:
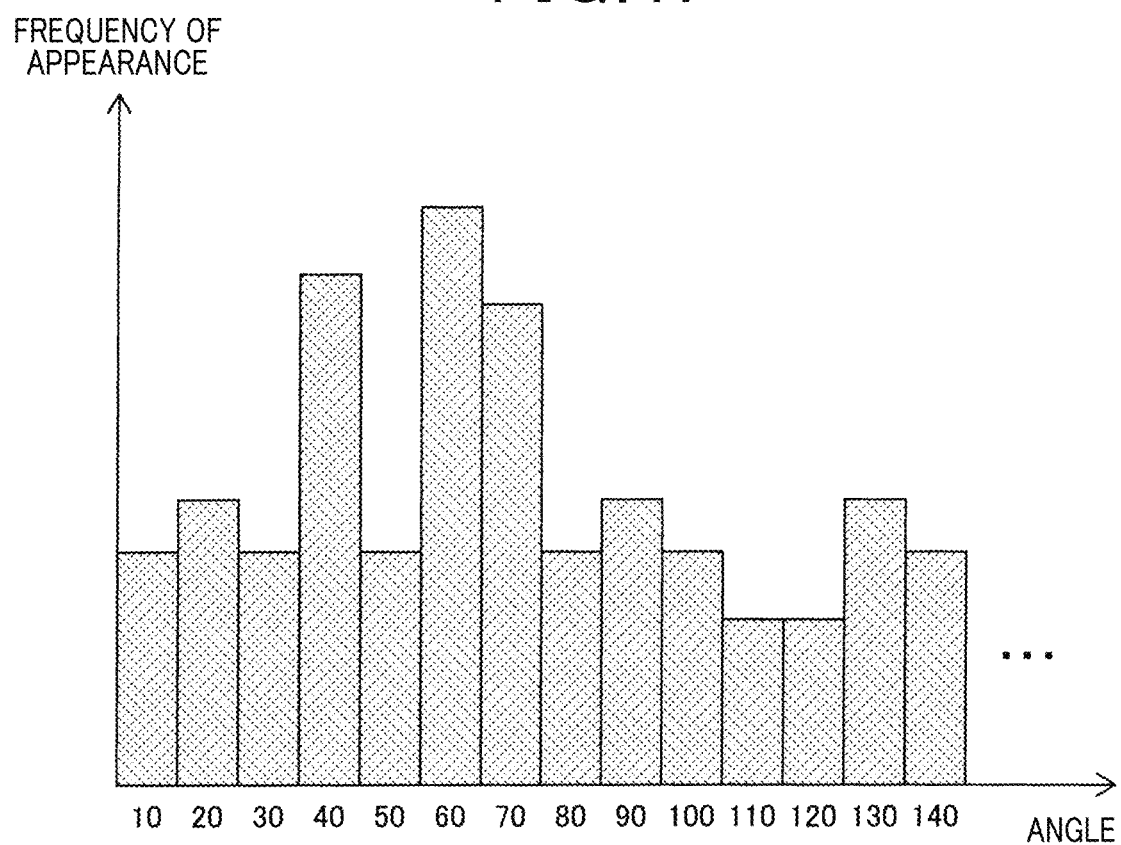
FIG. 47 is a graph showing the frequency of appearance of the angle of corner obtained by corner detection in an extraction image.

Specifically, in the above extraction image, the corners of each object are detected, and an angle of a smaller corner (less than 180 degrees) formed by two straight lines intersecting each other at the detected corners and the coordinates thereof are detected (see the hatched area in FIG. 46). Then, the histogram is calculated for each approximate corner angle (see FIG. 47). The parts area Pn is set so as to correspond to an area surrounded by the X coordinates and Y coordinates closest to the origin and the X coordinates and Y coordinates farthest from the origin in the angles whose frequency of appearance in the histogram is within a predetermined number from the top (the number depends on the shape of the part, and, for example, top three for a triangular shape). The above effect is also achieved even when a monitoring area is set on the basis of the parts area Pn that has been set in the above described manner.

The characteristic configuration of the present embodiment for setting the parts area Pn to set a monitoring area by using the parts area Pn can also be applied to other embodiments and the like.

The present invention is not limited to the first to thirteenth embodiments and modified examples thereof, and, for example, may be embodied as described below.

(1) The predetermined work to be analyzed is not limited to assembly work composed of four fundamental work operations A to D. For example, assembly work composed of one to three fundamental work operations may be adopted, or assembly work composed of five or more fundamental work operations may be adopted.

(2) The aforementioned delimitation motion (a predetermined motion) is not limited to a motion of taking out the part 20 from the parts box 30 (first embodiment), or a motion of transferring the part 20 to an assembly position in the workpiece W (second embodiment). The delimitation motion may also be another motion that is essential for the fundamental work operation, or a motion whose image is easily recognized and that is irrelevant to the fundamental work operation.

(3) The invention can be applied not only to work analysis in assembly of the parts to the workpiece W such as a printed circuit board according to a predetermined work procedure, but also to work analysis in assembly of the parts to a semi-finished product, for example, in an assembly line for high-mix low-volume products according to a predetermined work procedure.

(4) Information or delimitation information of the fundamental work operation determined to be abnormal in the work analysis processing can be displayed on the displaying unit 14 or the like to provide an opportunity for correcting the delimitation information, if necessary, by a manual operation.

Fourteenth Embodiment

With reference to the drawings, a work analysis device and a work analysis program according to a fourteenth embodiment will now be described.

In the present embodiment, whether or not the fundamental work operation is performed is determined on the basis of the reliability set for each monitoring area. The components which are substantially the same as those of the first embodiment are denoted by the same reference signs, and the description thereof will be omitted.

Similarly to the first embodiment, the work analysis device 10 according to the present embodiment is installed on a place such as the work table 1 shown in FIG. 1, and is configured as a device that acquires a work video image for work analysis by repeatedly capturing predetermined work, in which a plurality of fundamental work operations are performed in a predetermined order by the worker M.

Figure 48:
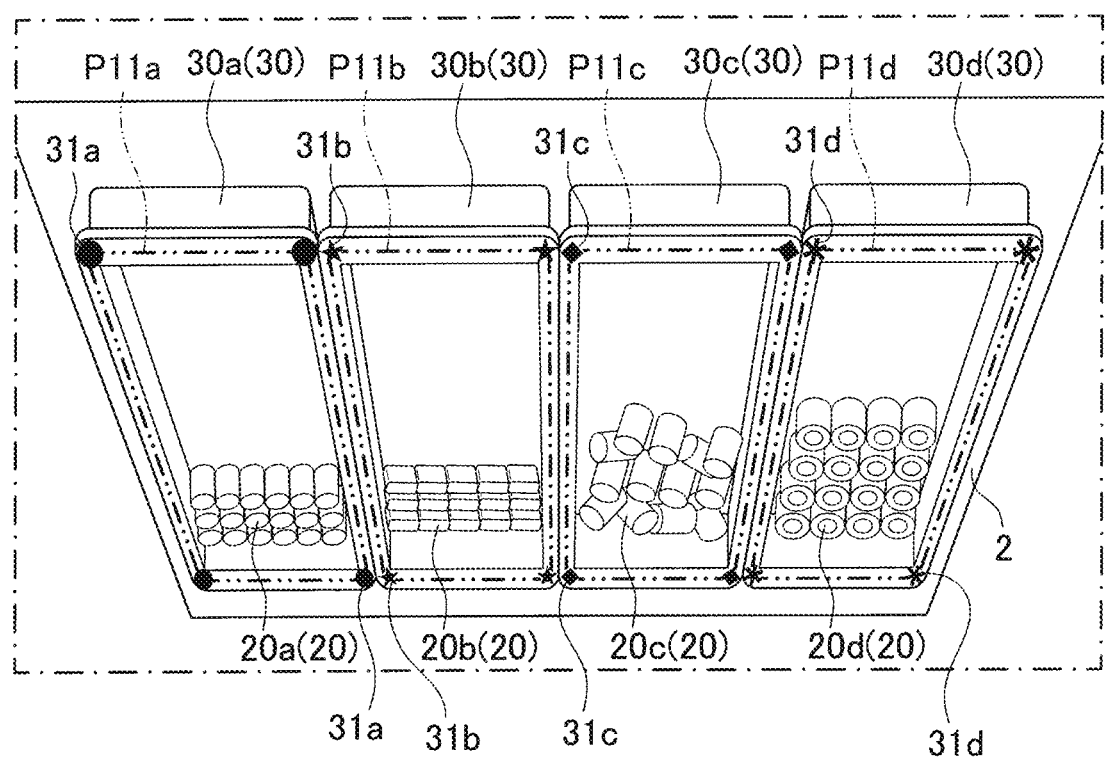
FIG. 48 is a view illustrating that monitoring areas are set by using markers in an image in which parts boxes are imaged.

In the present embodiment, as shown in FIG. 48, markers 31a to 31d are provided at four corners on the upper end face of the parts boxes 30a to 30d, respectively, so that the ranges of accommodating the parts in the parts boxes are recognized from the captured image. The markers 31a to 31d are different for each terminal box. In the captured image, a range having the markers 31a as four corners is set as a monitoring area P11a, a range having the markers 31b as four corners is set as a monitoring area P11b, a range having the markers 31c as four corners is set as a monitoring area P11c, and a range having the markers 31d as four corners is set as a monitoring area P11d. In the present embodiment, the marker 31a is formed as a black circle, the marker 31b is formed as a black star shape, the marker 31c is formed as a black diamond shape, and the marker 31d is formed as an asterisk shape. However, these shapes are merely examples, and any shape can also be used as long as four corners of the parts box can be recognized from the captured image. Further, FIG. 48 is an enlarged view of a portion near the parts boxes 30a to 30d in an image captured by the imaging unit 13, which will be described later.

The following description will be given of the work analysis processing performed on the basis of the work analysis program, which is performed by the control unit 11, when the worker M performs the predetermined work by which parts contained in a plurality of parts boxes are assembled to the workpiece W in sequence according to a predetermined work procedure.

Figure 49A:
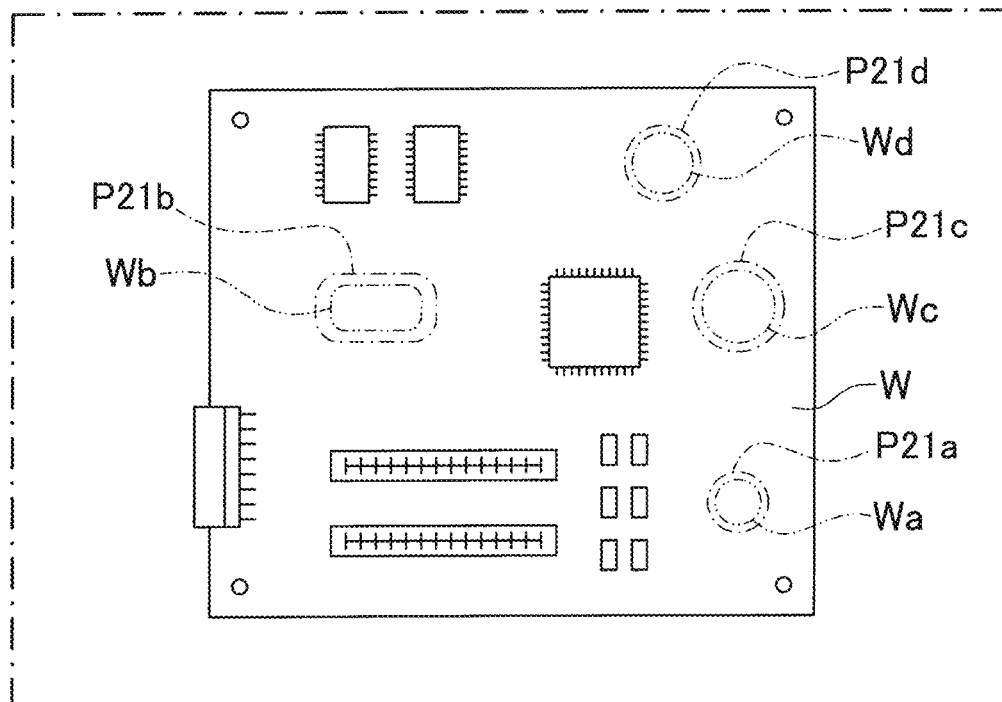
FIG. 49A is a view illustrating a state before parts are assembled to a workpiece, together with the respective monitoring areas.
Figure 49B:
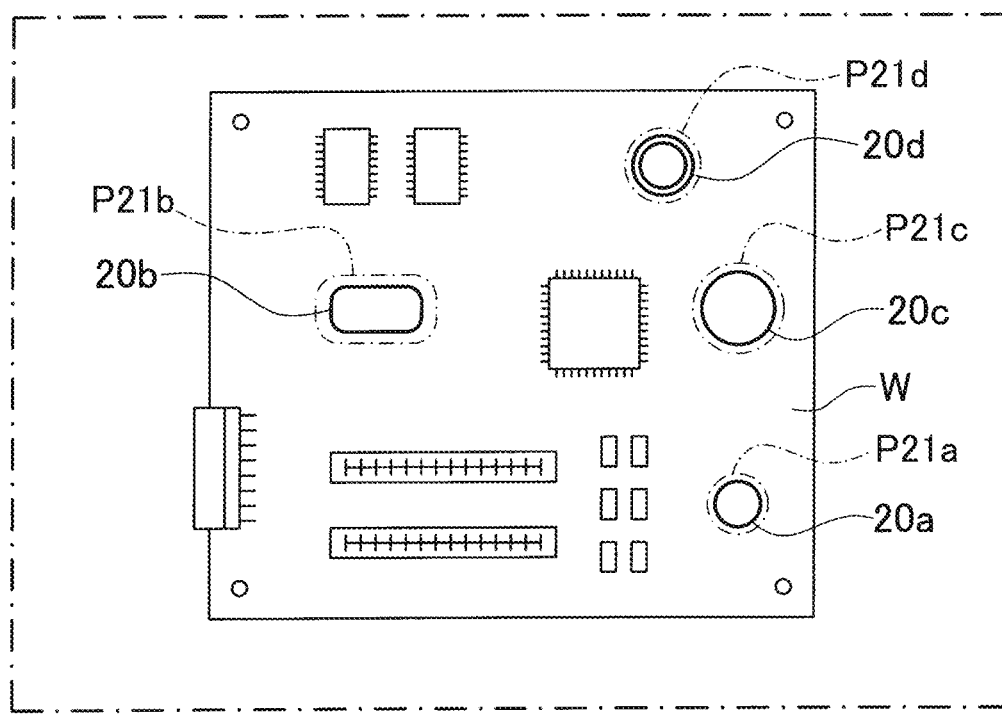
FIG. 49B is a view illustrating a state after parts are assembled to a workpiece, together with the respective monitoring areas.

In the present embodiment, the predetermined work to be analyzed includes fundamental work operations E to H, by which four types of parts 20a to 20d are assembled in sequence to the workpiece W in the state shown in FIG. 49A, respectively, to thereby provide the workpiece W in the state shown in FIG. 49B. The fundamental work operation E is taking out the part 20a from the parts box 30a and assembling the part 20a that has been taken out to an assembly position Wa in the workpiece W. The fundamental work operation F is taking out the part 20b from the parts box 30b and assembling the part 20b that has been taken out to an assembly position Wb in the workpiece W. The fundamental work operation G is taking out the part 20c from the parts box 30c and assembling the part 20c that has been taken out to an assembly position Wc in the workpiece W. The fundamental work operation H is taking out the part 20d from the parts box 30d and assembling the part 20d that has been taken out to an assembly position Wd in the workpiece W. In the present embodiment, according to a predetermined work procedure, the fundamental work operation E, the fundamental work operation F, the fundamental work operation G, and the fundamental work operation H are performed in this order.

As shown in FIGS. 48 and 49, a first monitoring area for detecting a start motion of the fundamental work operation E (a motion of taking out the part 20a from the parts box 30a) is set as a monitoring area P11a, which is a range having the markers 31a as four corners thereof (a range corresponding to the parts box 30a) in the imaging range of the imaging unit 13. Further, a second monitoring area for detecting a completion motion of the fundamental work operation E (a motion of assembling the part 20a to the assembly position Wa in the workpiece W) is set as a monitoring area P21a, which is a range around the assembly position Wa in the imaging range of the imaging unit 13.

In addition, a first monitoring area for detecting a start motion of the fundamental work operation F (a motion of taking out the part 20b from the parts box 30b) is set as a monitoring area P11b, which is a range having the markers 31b as four corners thereof (a range corresponding to the parts box 30b) in the imaging range of the imaging unit 13. Further, a second monitoring area for detecting a completion motion of the fundamental work operation F (a motion of assembling the part 20b to the assembly position Wb in the workpiece W) is set as a monitoring area P21b, which is a range around the assembly position Wb in the imaging range of the imaging unit 13. In addition, a first monitoring area for detecting a start motion of the fundamental work operation G (a motion of taking out the part 20c from the parts box 30c) is set as a monitoring area P11c, which is a range having the markers 31c as four corners thereof (a range corresponding to the parts box 30c) in the imaging range of the imaging unit 13.

Further, a second monitoring area for detecting a completion motion of the fundamental work operation G (a motion of assembling the part 20c to the assembly position Wc in the workpiece W) is set as a monitoring area P21c, which is a range around the assembly position Wc in the imaging range of the imaging unit 13. In addition, a first monitoring area for detecting a start motion of the fundamental work operation H (a motion of taking out the part 20d from the parts box 30d) is set as a monitoring area P11d, which is a range having the markers 31d as four corners thereof (a range corresponding to the parts box 30d) in the imaging range of the imaging unit 13. Further, a second monitoring area for detecting a completion motion of the fundamental work operation H (a motion of assembling the part 20d to the assembly position Wd in the workpiece W) is set as a monitoring area P21d, which is a range around the assembly position Wd in the imaging range of the imaging unit 13. Each start motion described above corresponds to an example of a "first motion," and each completion motion described above corresponds to an example of a "second motion."

In the work analysis processing in which the monitoring areas P11a to P11d and P21a to P21d are set as described above, a reliability (hereinafter, also referred to as a first reliability) is set in a manner to become higher with an increase in probability of determining that a motion of taking out the part from the monitoring area (parts box) is performed, on the basis of comparison result of the images captured before and after the hand of the worker M enters the monitoring areas P11a to P11d, which are set as the first monitoring areas. Further, a reliability (hereinafter, also referred to as a second reliability) is set in a manner to become higher with an increase in probability of determining that a motion of assembling the part to the monitoring area (assembly position of the workpiece W) is performed, on the basis of comparison result of the images captured before and after the hand of the worker M enters the monitoring areas P21a to P21d, which are set as the second monitoring areas.

Then, the reliability set as described above are each quantified, and, on the basis of the sum of two reliability values, it is determined whether or not the corresponding fundamental work operations are performed. When the determination is positive, the delimitation information for delimiting the work video image is set so that the timing of having captured the image for setting the reliability in the first monitoring area is set as a work start timing, and the timing of having captured the image for setting the reliability in the second monitoring area is set as a work completion timing.

The monitoring areas P11a to P11d is not limited to being set by using the markers 31a to 31d provided at four corners on the upper end face of the parts boxes 30a to 30d as described above each time the work analysis processing is performed, but may also be set on the basis of the image difference generated by continuously capturing the parts boxes 30a to 30d while they are individually swinging. The monitoring areas P11a to P11d can be set as standard ranges without requiring an image analysis or the like, under the assumption that the parts boxes 30a to 30d, each having a predetermined shape, are placed in position.

Figure 50:
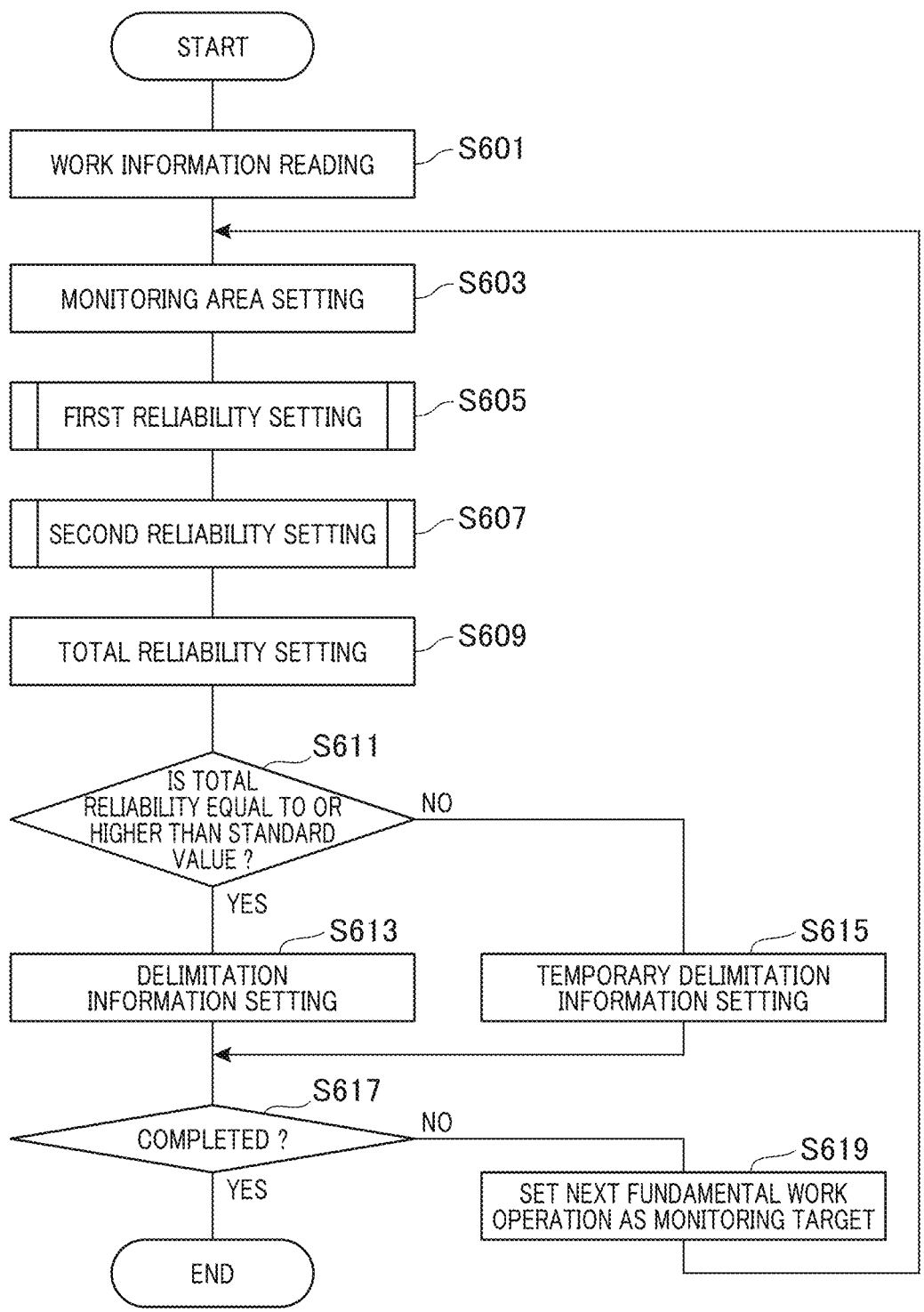
FIG. 50 is a flowchart illustrating the order of execution in work analysis processing performed by a control unit.

Referring to a flowchart of FIGS. 50 to 52, the work analysis processing performed by the control unit 11 will now be described in detail.

The control unit 11 starts the work analysis processing when a predetermined start operation is performed to the operation unit 17. At step S601 in FIG. 50, work information reading is performed to read the work information on the specified predetermined work (information on the types and amount (predetermined amount) of the parts used for the work, the types of workpiece W, the monitoring area, and the like) from the storage unit 12. The work information includes information on whether the amount of the parts taken out is countable on the basis of the image difference in the imaging unit 13 when the target parts are taken out from the parts box. That is, when the parts are large enough to count the number of parts taken out on the basis of the image difference, countable information is imparted, whereas, when the parts are too small to count the number of parts taken out on the basis of the image difference, uncountable information is imparted. Further, in the present embodiment, the above work information is stored in the storage unit 12 each time an information code or an RF tag is read from the work instruction or the like, in which the work procedure for the manufacturing lot is recorded. Further, the above work information can be stored in the storage unit 12 via an input operation or the like from the operation unit 17, or may be stored in the storage unit 12 when it receives the work information from a higher level device or the like via the communication unit 18.

When the work information is read as described above, monitoring area setting is performed at step S603. At step S603, in a captured image in a state in which imaging of the work performed by the worker M is imaged as a work video image by the imaging unit 13, setting of the first monitoring area and the second monitoring area is performed for each fundamental work operation. First, for the fundamental work operation E, which is the first fundamental work operation, a range having the markers 31a, which are specified in the image captured by the imaging unit 13, as four corners is set as a monitoring area (first monitoring area) P11a, and a range around the assembly position Wa in the imaging range of the imaging unit 13 is set as a monitoring area (second monitoring area) P21a. Further, the control unit 11 that performs monitoring area setting at step S603 can correspond to an example of a "monitoring area setting unit."

When the first monitoring area and the second monitoring area are set as described above, first reliability setting is performed at step S605. At step S605, first reliability setting is performed to set the first reliability on the basis of the comparison result of the images captured before and after the hand of the worker M enters the monitoring area P11a.

Figure 51:
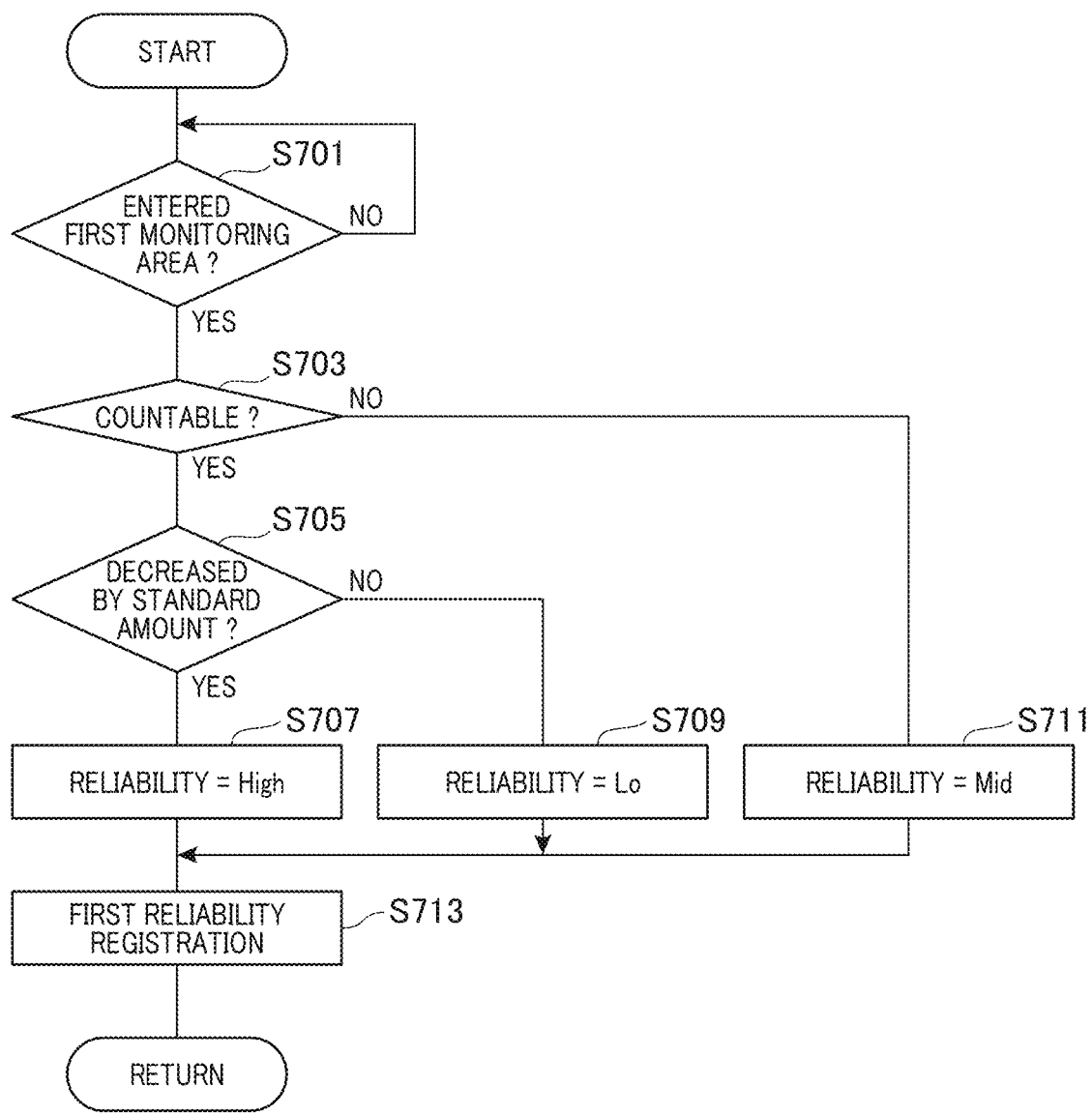
FIG. 51 is a flowchart illustrating the order of execution in first reliability setting in FIG. 50.

Specifically, in determination at step S701 in FIG. 51, it is determined whether or not the hand of the worker M has been present in the monitoring area P11a for a predetermined period of time, by using a video image acquired by the imaging unit 13. It is determined as "No" repeatedly until an image difference occurs in the monitoring area P11a. If it is determined that the hand of the worker M has been present in the monitoring area P11a for a predetermined period of time according to the image difference (Yes at S701), it is determined whether or not the parts to be taken out are countable in determination at step S703. That is, in the present embodiment, setting method for the first reliability in the first monitoring area is changed depending on whether the parts are countable or not. If the work information read as described above includes the countable information, which is imparted to the parts to be taken out from the monitoring area P11a, it is determined that the parts are countable and determination at step S703 is "Yes."

Subsequently, in determination at step S705, it is determined whether the standard number of parts has decreased or not. On the basis of the image difference, which is a comparison result between the image captured immediately before the hand enters the monitoring area P11a and the image captured immediately after the hand exits the monitoring area P11a, if the number of parts counted is attributed to a decrease of the standard number of parts, which is recognized from the above work information, the probability that the standard number of parts 20a have been taken out from the monitoring area P11a is determined to be high, and determination at step S705 is "Yes." In this case, the first reliability is set to "High," which is highest as the settable reliability (S707).

Further, on the basis of the image difference between the image captured immediately before the hand enters the monitoring area P11a and the image captured immediately after the hand exits the monitoring area P11a, if the number of parts counted is not attributed to a decrease of the standard number of parts, for example, if the number of parts counted is unchanged, the probability that the standard number of parts 20a have been taken out from the monitoring area P11a is determined to be low, and determination at step S705 is "No." In this case, the first reliability is set to "Lo," which is lowest as the settable reliability (S709).

On the other hand, if the work information read as described above includes the uncountable information, which is imparted to the parts to be taken out from the monitoring area P11a, determination at step S703 is "No." In this case, the first reliability is set to "Mid," which is lower than "High" and higher than "Lo" in the settable reliability (S711).

Among the images used for the above image difference, the timing (time) of having captured the image immediately before the hand enters can be set as a work start timing. When the first reliability is set to any one of the "High," "Mid," and "Lo," the first reliability is registered using the database of the storage unit 12 (S713) together with the above work start timing, and the first reliability setting ends. Further, among the images used for the above image difference, the timing (time) of having captured the image immediately after the hand exits may also be set as a work start timing depending on the work content or the like.

Subsequently, second reliability setting is performed at step S607 in FIG. 50. At step S607, second reliability setting is performed to set the second reliability on the basis of the comparison result of the images captured before and after the hand of the worker M enters the monitoring area P21a.

Figure 52:
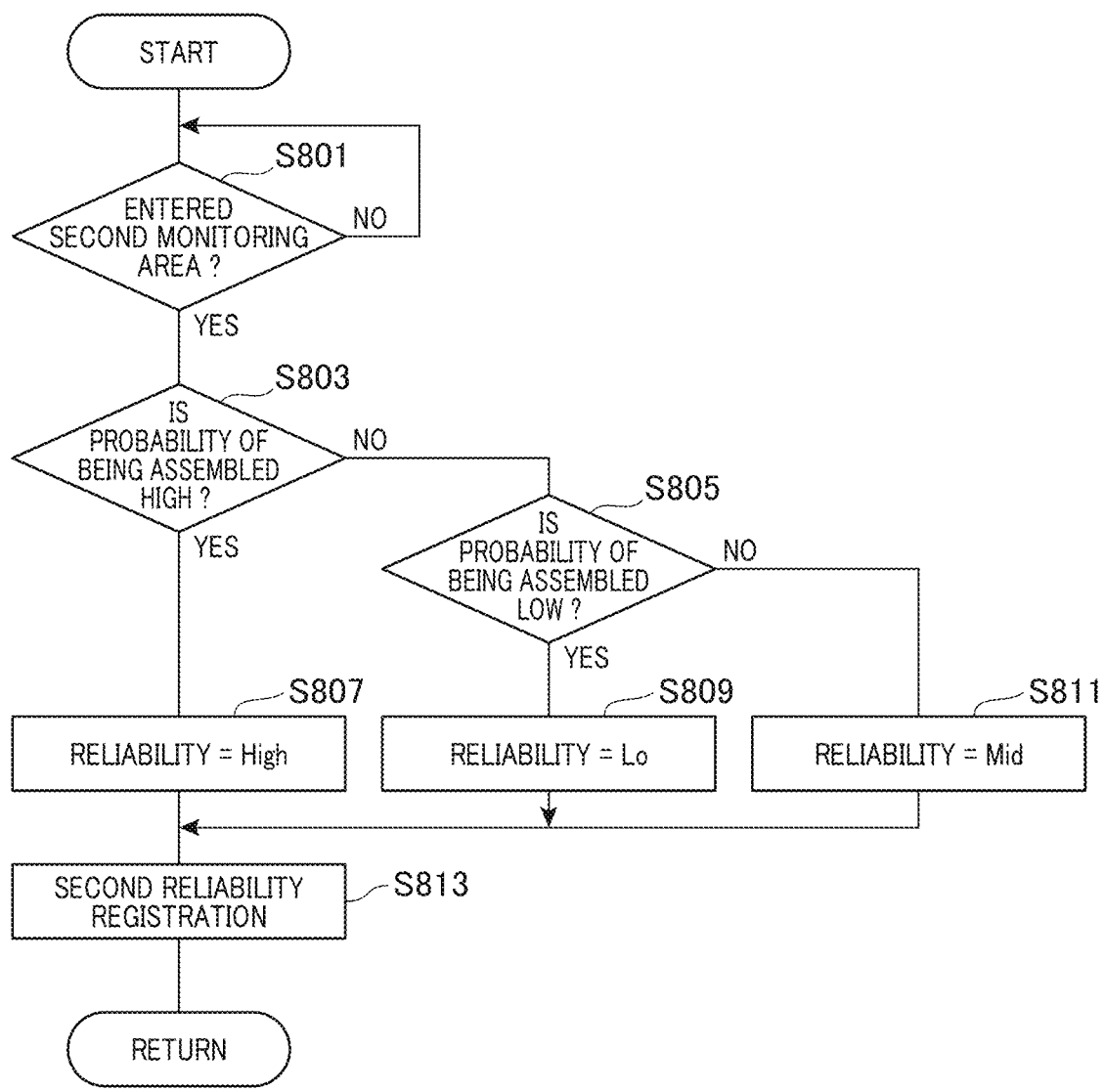
FIG. 52 is a flowchart illustrating the order of execution in second reliability setting in FIG. 50.

Specifically, in determination at step S801 in FIG. 52, it is determined whether or not the hand of the worker M has been present in the monitoring area P21a for a predetermined period of time, by using a video image acquired by the imaging unit 13. It is determined as "No" repeatedly until an image difference occurs in the monitoring area P21a. If it is determined that the hand of the worker M has been present in the monitoring area P21a for a predetermined period of time according to the image difference (Yes at S801), it is determined whether or not the part 20a has been assembled to the assembly position Wa in the workpiece W in determination at step S803.

On the basis of the comparison result (image difference) between the image captured immediately before the hand enters the monitoring area P21a and the image captured immediately after the hand exits the monitoring area P21a, when the image difference substantially matches the image of the part 20a assembled to the assembly position Wa, the probability that the part 20a is assembled to the assembly position Wa of the workpiece W is determined to be high. Then, it is determined as "Yes" at step S803. When the determination at step S803 is "Yes," the second reliability is set to "High," which is highest as the settable reliability (S807).

On the basis of the comparison result (image difference) between the image captured immediately before the hand enters the monitoring area P21a and the image captured immediately after the hand exits the monitoring area P21a, when the image difference obviously does not match the image of the part 20a assembled to the assembly position Wa, the probability that the part 20a is assembled to the assembly position Wa of the workpiece W is determined to be low. Then, it is determined as "No" at step S803, and "Yes" at step S805. When the determination at step S803 is "No" and determination at step S805 is "Yes," the second reliability is set to "Lo," which is lowest as the settable reliability (S809).

On the other hand, on the basis of the comparison result (image difference) between the image captured immediately before the hand enters the monitoring area P21a and the image captured immediately after the hand exits the monitoring area P21a, there may be a case where the probability that the part 20a is assembled to the assembly position Wa of the workpiece W cannot be determined to be high or low. For example, there may be cases where the part 20a is assembled in a state deviated from the assembly position Wa, a different part having a color or a shape similar to that of the part 20a is assembled to the assembly position Wa, or the part 20a is so small that the image of the part 20a cannot be clearly recognized. In such a case, determination at step S803 is No and determination at step S805 is No, and the second reliability is set to "Mid" (S811).

Among the images used for the above image difference, the timing (time) of having captured the image immediately after the hand exits can be set as a work completion timing. When the second reliability is set to any one of the "High," "Mid," and "Lo," the second reliability is registered using the database of the storage unit 12 (S813) together with the above work completion timing, and the second reliability setting ends. Further, among the images used for the above image difference, the timing (time) of having captured the image immediately before the hand enters may also be set as a work completion timing depending on the work content or the like.

In a modified example of the second reliability setting, for example, for countable parts, it is determined whether or not the image difference substantially matches the image of the part assembled to the assembly position. When the determination is positive, the second reliability may be set to "High," and, when the determination is negative, the second reliability may be set to "Lo." For uncountable parts, the second reliability may be set to "Mid." In addition, the control unit 11 that performs the first reliability setting at step S605 and the second reliability setting at step S607 corresponds to an example of a "reliability setting unit."

When the first reliability and the second reliability are set as described above, total reliability setting is performed at step S609. In this step, a sum of a reliability score obtained by quantifying the first reliability and a reliability score obtained by quantifying the second reliability is set as a total reliability. Specifically, for example, as shown in FIG. 53, "High," "Mid," and "Lo" in the first reliability are quantified as "2," "1," and "0," respectively, and "High," "Mid," and "Lo" in the second reliability are quantified as "3," "2," and "1," respectively, so as to be weighted more than the first reliability. Then, these scores are summed (added) together to set (calculate) a total reliability. For example, as shown in FIG. 53, when the first reliability and the second reliability are both set to "High," the total reliability is set to "5."

Subsequently, in determination at step S611 in FIG. 50, it is determined whether the reliability is equal to or higher than the standard value. In the present embodiment, the standard value is set to "2" (see FIG. 53). For example, when both the first reliability and the second reliability are "High" and thus the total reliability becomes equal to or higher than the standard value (Yes at S611), it is determined that the fundamental work operation E is performed. Then, delimitation information setting is performed at step S613. At step S613, for the fundamental work operation E, which is the monitoring target, the delimitation information for delimiting the work video image is set so that an imaging timing associated with the first reliability is set as a work start timing, and an imaging timing associated with the second reliability is set as a work completion timing, and the delimitation information is stored in the storage unit 12. Further, the control unit 11 that performs determination at step S611 corresponds to an example of a "determination unit," and the control unit 11 that performs delimitation information setting at step S613 corresponds to an example of a "delimitation information setting unit."

When the delimitation information is set as described above, and the work is not completed (No at S617), the next fundamental work operation, or the fundamental work operation F, is set as the monitoring target (S619). Then, the steps from step S603 onward are performed to the fundamental work operation F. In this case, step S603 is performed to the fundamental work operation F. At step S603, a range having the markers 31*b*, which are specified in the image captured by the imaging unit 13, as four corners is set as a monitoring area (first monitoring area) P11*b*, and a range around the assembly position Wb in the imaging range of the imaging unit 13 is set as a monitoring area (second monitoring area) P21*b*. Then, at step S605, first reliability setting is performed to set the first reliability on the basis of the comparison result of the images captured before and after the hand of the worker M enters the monitoring area P11*b*. Subsequently, at step S607, second reliability setting is performed to set the second reliability on the basis of the comparison result of the images captured before and after the hand of the worker M enters the monitoring area P21*b*.

Then, a sum of a reliability score obtained by quantifying the first reliability and a reliability score obtained by quantifying the second reliability is set as a total reliability (S609). When the total reliability thus determined becomes equal to or higher than the standard value (Yes at S611), it is determined that the fundamental work operation F is performed. Then, for the fundamental work operation F, the delimitation information for delimiting the work video image is set so that an imaging timing associated with the first reliability is set as a work start timing, and an imaging timing associated with the second reliability is set as a work completion timing, and the delimitation information is stored in the storage unit 12 (S613).

Subsequently, for the fundamental work operation G, the first reliability is set in the same manner as above on the basis of the comparison result of the images captured before and after the hand of the worker M enters the monitoring area P11*c* (S605), and the second reliability is set on the basis of the comparison result of the images captured before and after the hand of the worker M enters the monitoring area P21*c* (S607). Thus, the total reliability is set (S609). When the total reliability thus determined becomes equal to or higher than the standard value (Yes at S611), it is determined that the fundamental work operation G is performed. Then, for the fundamental work operation G, the delimitation information for delimiting the work video image is set so that an imaging timing associated with the first reliability is set as a work start timing, and an imaging timing associated with the second reliability is set as a work completion timing, and the delimitation information is stored in the storage unit 12 (S613).

Similarly, for the fundamental work operation H, the first reliability is set in the same manner as above on the basis of the comparison result of the images captured before and after the hand of the worker M enters the monitoring area P11*d* (S605), and the second reliability is set on the basis of the comparison result of the images captured before and after the hand of the worker M enters the monitoring area P21*d* (S607). Thus, the total reliability is set (S609). When the total reliability thus determined becomes equal to or higher than the standard value (Yes at S611), it is determined that the fundamental work operation H is performed. Then, for the fundamental work operation H, the delimitation information for delimiting the work video image is set so that an imaging timing associated with the first reliability is set as a work start timing, and an imaging timing associated with the second reliability is set as a work completion timing, and the delimitation information is stored in the storage unit 12 (S613).

As described above, even after the delimitation information is set as the predetermined work for four fundamental work operations E to H, the fundamental work operations E to H are repeatedly performed. Accordingly, the delimitation information is set for each fundamental work operation. Since the delimitation information is set for a number of fundamental work operations, it is possible to generate data for supporting the work such as work procedure check and cycle time measurement by simply analyzing the work video image delimited by using the delimitation information. Further, the determination data (annotation data) for determining whether or not the correct work is performed can be automatically generated.

On the other hand, when the total reliability becomes less than the standard value (No at S611), temporary delimitation information setting is performed at step S615. At step S615, unlike the delimitation information setting at step S613, the temporary delimitation information is set. That is, for the fundamental work operation with the total reliability of less than the standard value, a temporary delimitation information is separately set from the delimitation information so that an imaging timing associated with the first reliability is set as a temporary work start timing, and an imaging timing associated with the second reliability is set as a temporary work completion timing, and the temporary delimitation information is stored in the storage unit 12.

The temporary delimitation information stored in the storage unit 12 together with the reliability can be displayed on the displaying unit 14 or the like in an editable manner after completion of the work so that the worker or the like can edit the temporary delimitation information while watching the work video image to thereby obtain correct delimitation information. In particular, since the temporary delimitation position is graphically displayed, the worker or the like can check the work delimitation having low reliability, and the work delimitation that has failed in correct determination.

As described above, according to the work analysis device 10 of the present embodiment, the first monitoring area (P11a to P11d) for detecting the start motion (first motion) of the fundamental work operation and the second monitoring area (P21a to P21d) for detecting the completion motion (second motion) of the fundamental work operation are set for each fundamental work operation in the imaging range of the imaging unit 13. On the basis of the comparison result, among the images captured by the imaging unit 13, between a portion corresponding to the monitoring area and a portion corresponding to the monitoring area in another image that is acquired before the above image, the reliability, which becomes higher when it is determined that the motion related to the fundamental work operation is performed in the monitoring area, is set for each monitoring area. Then, on the basis of the first reliability set at the first monitoring area and the second reliability set at the second monitoring area, it is determined whether the corresponding fundamental work operation is performed or not. For the fundamental work operation that is determined that the work is performed, the delimitation information for delimiting the work video image acquired by the imaging unit 13 for each fundamental work operation is set so that the timing of having captured the image for setting the reliability in the first monitoring area is set as a work start timing, and the timing of having captured the image for setting the reliability in the second monitoring area is set as a work completion timing.

Thus, whether the corresponding fundamental work operation is performed or not is determined on the basis of the first reliability set at the first monitoring area and the second reliability set at the second monitoring area. Accordingly, compared with the case where determination is made on the basis of a monitor result at a single monitoring area, an improved determination accuracy can be obtained. In particular, the reliability scores at multiple positions are used as determination criteria. In this case, even if low reliability is set at one monitoring area due to delicate fundamental work operation being performed, high reliability is set at another monitoring area, so it is possible to determine that the fundamental work operation is being performed. Accordingly, a wide variety of fundamental work operations including delicate work can be determined with high accuracy. Therefore, the work analysis device that can delimit the work video image with high accuracy, even for the work that cannot be clearly determined whether the part has been taken out or not, can be achieved.

In particular, a fundamental work operation is assembling a parts 20a to 20d, which has been taken out of the predetermined parts boxes 30a to 30d, respectively, to the workpiece (assembly target) W, and the start motion is a motion of taking out the part from the parts box, and the completion motion is a motion of assembling the part to the assembly position of the assembly target. Accordingly, on the basis of the comparison result of the captured images of the first monitoring area (P11a to P11d), the first reliability that is set at the first monitoring area increases with an increase in the probability of determining that a motion of taking out the part from the parts box is performed. Further, on the basis of the comparison result of the captured images of the second monitoring area (P21a to P21d), the second reliability that is set at the second monitoring area increases with an increase in the probability that a motion of assembling the part to the assembly position in the assembly target is performed.

As described above, since the reliability on the basis of the motion of taking out the part from the parts box and the motion of assembling the part to the assembly position of the assembly target are both taken into consideration, the work video image can be delimited with high accuracy even when a fundamental work operation of taking out a part from a predetermined parts box and assembling the part to the assembly target is repeatedly performed. This contributes to more efficient and more accurate analysis of the state of work manually performed by the worker, for example, part assembly work (manual work).

In the first reliability setting, setting method for the first reliability related to the first monitoring area is changed depending on whether the parts are countable or not on the basis of the image difference of the images of the first monitoring area captured by the imaging unit 13. That is, for the parts that are countable, the reliability is set to "High" when the standard number of parts has decreased, the reliability is set to "Lo" when the standard number of parts has not decreased, and the reliability is set to "Mid" when the parts are uncountable. Thus, the reliability can be set more appropriately by changing the reliability setting method suitable for the parts to be monitored.

Further, in the work analysis processing, whether the corresponding fundamental work operation is performed or not is determined on the basis of the total reliability (sum), which is obtained by quantifying and summing up all the reliability while weighting the second reliability set at the second monitoring area (P21a to P21d) more than the first reliability set at the first monitoring area (P11a to P11d). Accordingly, in determination using the total reliability, since an influence of the second reliability related to the motion of assembling the parts 20a to 20d to the assembly positions Wa to Wd in the workpiece W becomes higher than an influence of the first reliability related to the motion of taking out the parts 20a to 20d from the parts boxes 30a to 30d, it is possible to set the reliability more suitable for the actual operation.

The fourteenth embodiment is not limited to the one described above, and may also be embodied as described below.

(1) The work analysis processing may be performed to the work video image acquired by the imaging unit 13 in real time, or may be performed after the predetermined work ends. In the work analysis processing performed in real time, when low reliability is set, predetermined notification can be performed by using the light emitting unit 15, the speaker 16, or the like to notify the worker or the like of the probability of erroneous work.

(2) In the work analysis processing, the total reliability is not limited to being set on the basis of the reliability scores set for two monitoring areas (the first monitoring area and the second monitoring area). Three or more monitoring areas including the first monitoring area and the second monitoring area may also be set, and the total reliability may be set according to the reliability that is set for each monitoring area.

(3) The reliability score used for the total reliability setting may be set as any numerical value depending on the content of work or the like, on the assumption that the numerical value decreases in the order of "High," "Mid," and "Lo." Further, the reliability scores corresponding to "High," "Mid," and "Lo" may be set as the same numerical value in the first reliability and the second reliability in order to eliminate the above weight depending on the content of work or the like. The reliability score used for the total reliability setting is not limited to three levels of "High," "Mid," and "Lo," and may also be four or more levels. Specifically, for example, four levels of "High," "Mid1," "Mid2," and "Lo" may also be used. Alternatively, the reliability for a plurality of monitoring areas may be set by obtaining each reliability as a numerical value, and by multiplying the numerical value by a coefficient or the like.

(4) In addition, in the embodiments, the number of fundamental work operations is not limited to four, but may be set to two, three, or five or more fundamental work operations. As a modification, a condition of using only one fundamental work operation can be provided.

(5) The fundamental work operation as the monitoring target is not limited to the work by which the part that has been taken out from the parts box is assembled to the workpiece W such as a printed circuit board, and may also be, for example, the work by which the part is assembled to a semi-finished product in an assembly line for high-mix low-volume products. Further, the fundamental work operation as the monitoring target may also be, for example, the work by which the part is deformed or removed from the assembly target.

(6) The imaging timing for setting the first reliability and the imaging timing for setting the second reliability are not limited to being set as a work start timing and a work completion timing, respectively. One of these timings may be set as a work completion timing of the preceding fundamental work operation (for example, fundamental work operation E) and a work start timing of the subsequent fundamental work operation (for example, fundamental work operation F).

Fifteenth Embodiment

With reference to the drawings, a work support device and a work support program according to a fifteenth embodiment will now be described.

The fifteenth embodiment mainly differs from the first embodiment in the process for setting the monitoring area. The components which are substantially the same as those of the first embodiment are denoted by the same reference signs, and the description thereof will be omitted.

Figure 54:
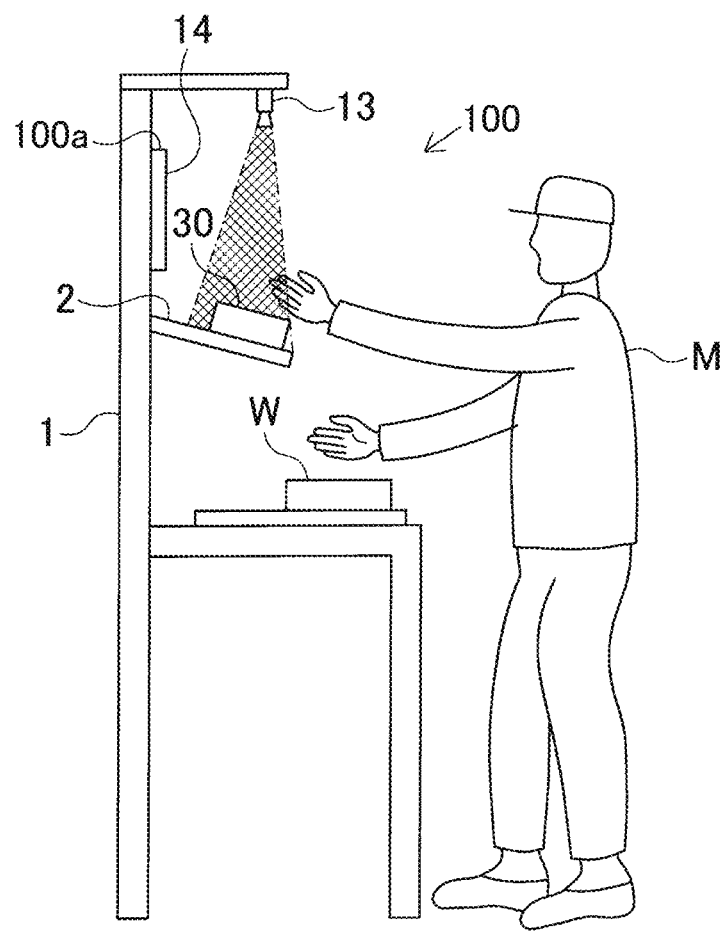
FIG. 54 is a view illustrating a schematic configuration of a work support device according to a fifteenth embodiment.

As illustrated in FIG. 54, a work support device 100 according to the present embodiment is installed on the work table 1 or the like, and is configured as a device that supports assembly work performed by the worker M by using parts contained in a plurality of parts boxes according to a predetermined work procedure.

Figure 55:
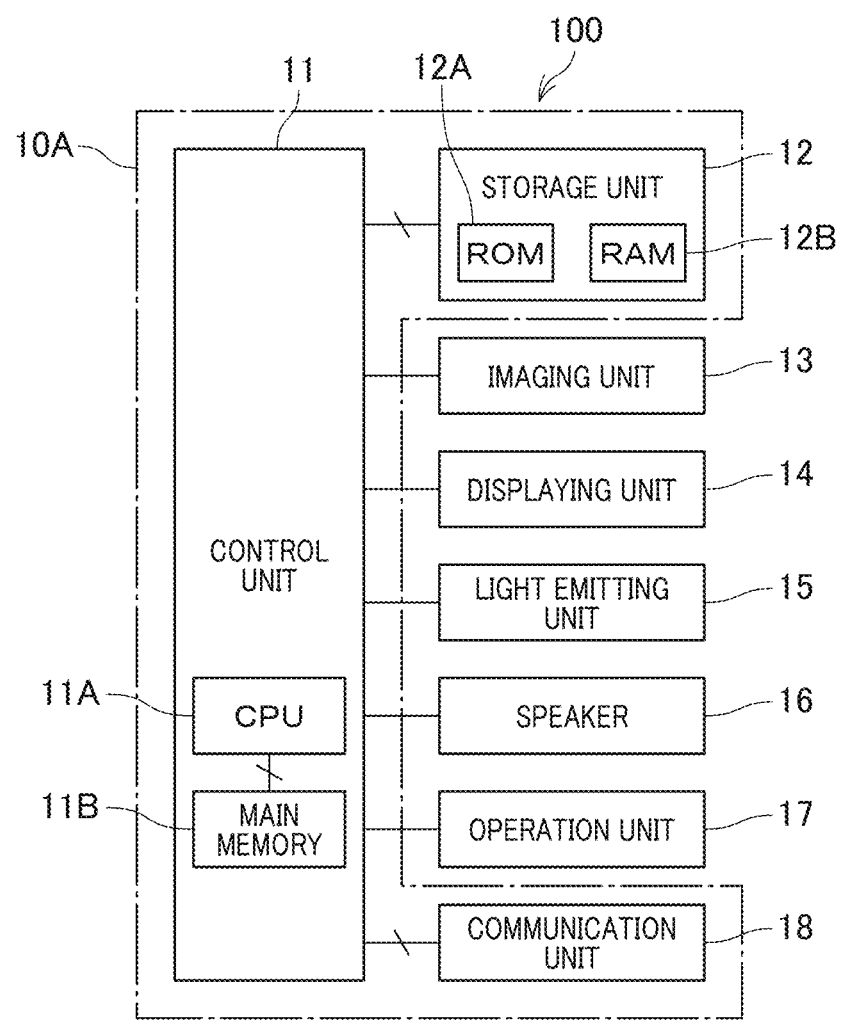
FIG. 55 is a block diagram illustrating an electric configuration of a work support device.

As shown in FIGS. 54 and 55, the work support device 100 includes the control unit 11, the storage unit 12, the imaging unit 13, the displaying unit 14, the light emitting unit 15, the speaker 16, the operation unit 17, the communication unit 18, and the like. The control unit 11 (CPU 11A) is mainly composed of a microcomputer, and performs overall control of the work support device 100 and various calculations as well as work support processing as described later. Since these components have the same configuration as those described above in connection with FIG. 3, the following description will be given, focusing on the main differences.

The imaging unit 13 is configured as a camera having a light receiving sensor (for example, C-MOS area sensor or CCD area sensor) as described above. In the present embodiment, the imaging unit 13 is separately provided from a device main body 100a which includes the control unit 11, the displaying unit 14, and the like, and is disposed in an upper part of the work table 1 so as to acquire a video image or a still image of a range at least including the parts boxes 30a to 30d. In the present embodiment, the imaging unit 13 is configured to acquire a sequence of still images, for example, at 30 frame per second, and store the acquired images in the storage unit 12 so as to be analyzed by the control unit 11.

As described above, the displaying unit 14 is a liquid crystal display, for example, and is controlled by the control unit 11 to display an image acquired by the imaging unit 13, predetermined information, and the like. The device main body 100a is mounted on a rear plate or the like of the work table 1 so that the worker M can see the display screen of the displaying unit 14.

The light emitting unit 15 and the speaker 16 having the same configuration as in the first embodiment correspond to an example of a "notification unit."

Referring to the flowchart in FIGS. 56 and 57, the following detailed description will be given of the work support processing performed on the basis of the work support program, which is performed for each manufacturing lot by the control unit 11 (CPU 11A), when the worker M performs predetermined work by which parts contained in a plurality of parts boxes are individually assembled to the workpiece W according to a predetermined work procedure. In the example of the predetermined work procedure described below, the work procedure is fixed in advance, by which the part 20a in the parts box 30a, the part 20b in the parts box 30b, the part 20c in the parts box 30c, and the part 20d in the parts box 30d are sequentially assembled to the workpiece W in this order.

The control unit 11 starts the work support processing when a predetermined start operation is performed to the operation unit 17. At step S901 in FIG. 56, work procedure information reading is performed to read information on the predetermined work procedure (hereinafter, also referred to as "work procedure information") of the specified manufacturing lot from the storage unit 12. In the present embodiment, the above work procedure information is stored in the storage unit 12 each time an information code or an RF tag is read from the work instruction or the like, in which the work procedure for the specified manufacturing lot is recorded. Further, the above work procedure information can be stored in the storage unit 12 via an input operation or the like from the operation unit 17, or may be stored in the storage unit 12 when it receives the work procedure information from a higher level device or the like via the communication unit 18.

When the work procedure information is read as described above, k is set to 1, where k is the assembly order (order of taking out) of the parts (S903), and then monitoring area setting is performed at step S905. At step S905, among the images acquired by the imaging unit 13, an image area corresponding to the parts box of the kth part in assembly order, which is specified from the work procedure information, is set as a monitoring area. When the assembly order k is set to 1 as described above, an image area corresponding to the parts box 30a of the first part 20a is set as a monitoring area P1a immediately after the setting. Further, the control unit 11 that performs the above monitoring area setting corresponds to an example of the "monitoring area setting unit."

Figure 58:
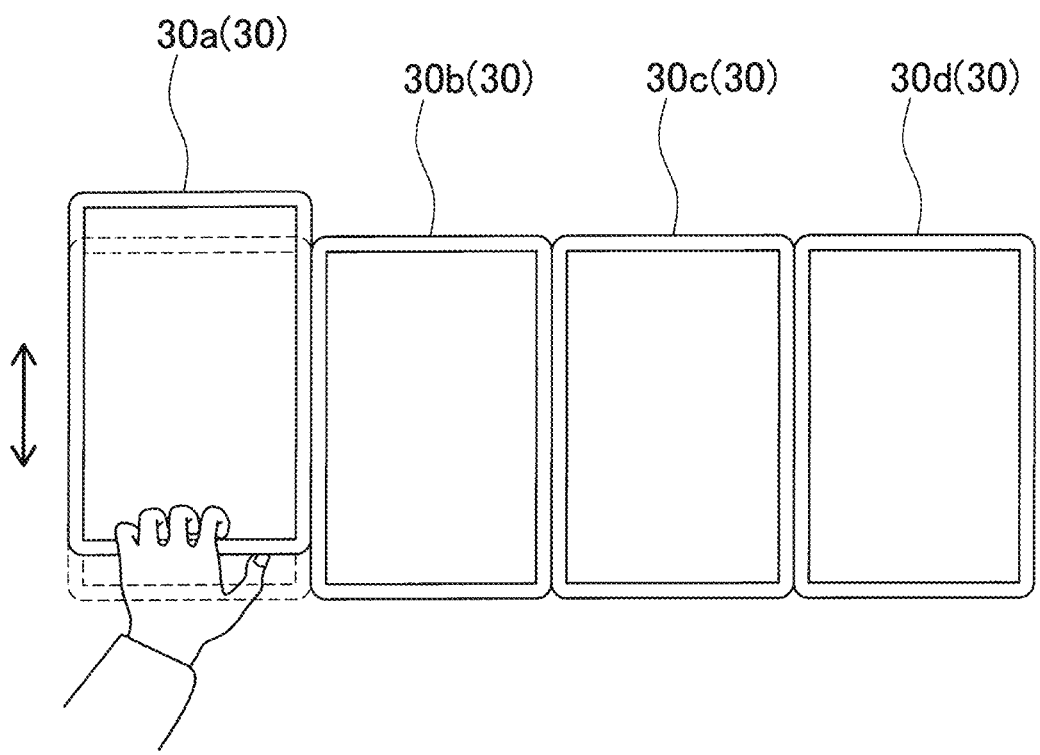
FIG. 58 is a view illustrating a swinging state of a parts box.
Figure 59A:
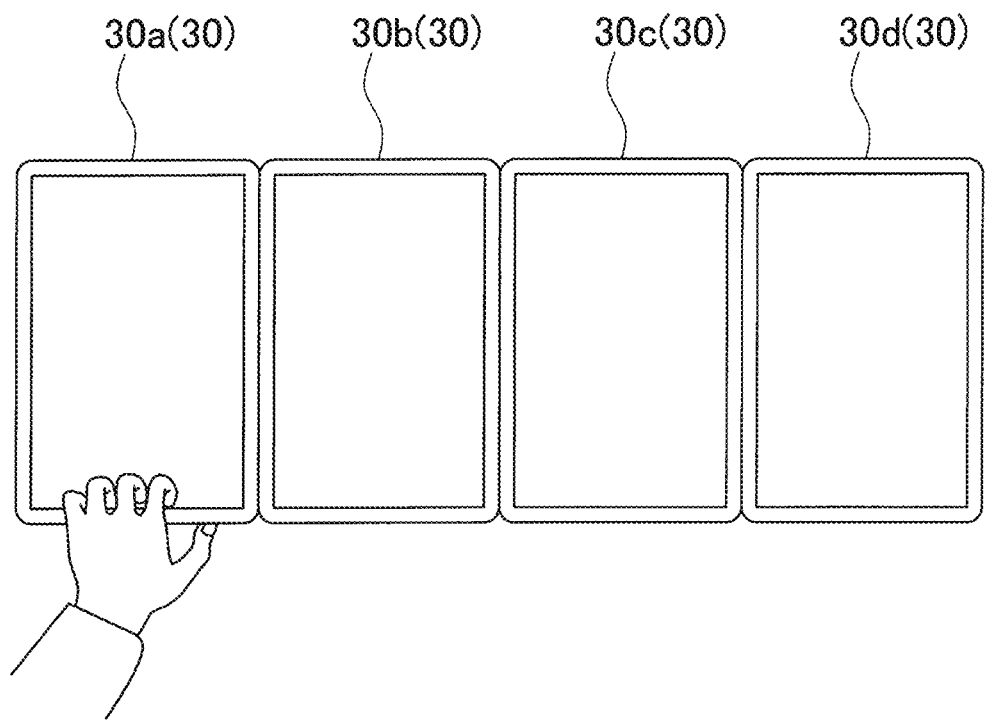
FIG. 59A is a view illustrating an imaging state of an image in which a parts box 30a is determined as being stopped as it is returned to an original position.

In the monitoring area setting of the present embodiment, the worker M moves a parts box in a predetermined movement state while the imaging unit 13 is acquiring a video image. Then, an image difference occurs according to the movement, and an area corresponding to the image difference in the sequential images is set and registered as a monitoring area. In the present embodiment, in order to narrow the movement range of the parts box for identifying the difference, as shown in FIG. 58, a movement state in which the parts box is repeatedly swung back and forth (hereinafter, also simply referred to as swinging state) as viewed from the worker M so as not to interrupt another parts box is adopted as the above predetermined movement state. In FIG. 58 and in FIG. 59 which will be described later, the parts boxes are illustrated in plan view as viewed from above, unlike the imaging state of FIG. 2. The parts accommodated in the respective parts boxes are omitted.

Referring to a flowchart of FIG. 57, the above monitoring area setting will now be described in detail.

First, when the imaging unit 13 is ready to perform imaging (S1001 in FIG. 57), determination is performed at step S1003 to determine whether or not setting start instruction has been issued. In the present embodiment, for example, a predetermined gesture by the worker M is set as the above setting start instruction. Accordingly, when the worker M performs the predetermined gesture in the imaging range of the imaging unit 13, and the predetermined gesture is captured by the imaging unit 13, it is determined that the setting start instruction has been issued (Yes at step S1003). For example, the above predetermined gesture may be a motion of displacing (swinging) at least some of the parts boxes into a predetermined state, or may be a motion of causing the imaging unit 13 to capture an image of an information code shown in the work instruction or the like or a marker of a predetermined shape.

Then, at step S1005, sequential image acquisition is performed to acquire sequential images corresponding to the video image of a predetermined period of time. Subsequently, at step S1007, image comparison is performed to compare images of each successive frame or several successive frames among the sequential images acquired as described above to extract an area constituting the image difference (hereinafter, also simply referred to as difference area). Then, at step S1009, determination is performed to determine whether or not a difference area larger than a predetermined range is generated. Until a difference area larger than a predetermined range is generated, it is determined as "No" and the steps from step S1005 onward are repeated.

Then, when it is determined as "Yes" at step S1009 due to a difference area of a predetermined range or more being generated, hand area acquisition is performed at step S1011. At step S1009, if the images involved in generation of the difference area include a region with a shape and size that can be generally recognized as a hand, this region is obtained as a hand area.

Subsequently, at step S1013, determination is performed to determine whether or not the parts box has been moved in a predetermined movement state by the worker M. When the parts box held by the worker M is moved in the swinging state, the hand area acquired as described above and another difference area, which corresponds to the parts box, are adjacent and continuous to each other. When the hand area and another difference area are not adjacent to each other, the parts box is determined as not having been moved, and it is determined as "No" in step S1013. Then, the steps from step S1005 onward are repeated. Further, when the hand area is not acquired, it is also determined as "No" in step S1013. Then, the steps from step S1005 onward are repeated.

Figure 56:
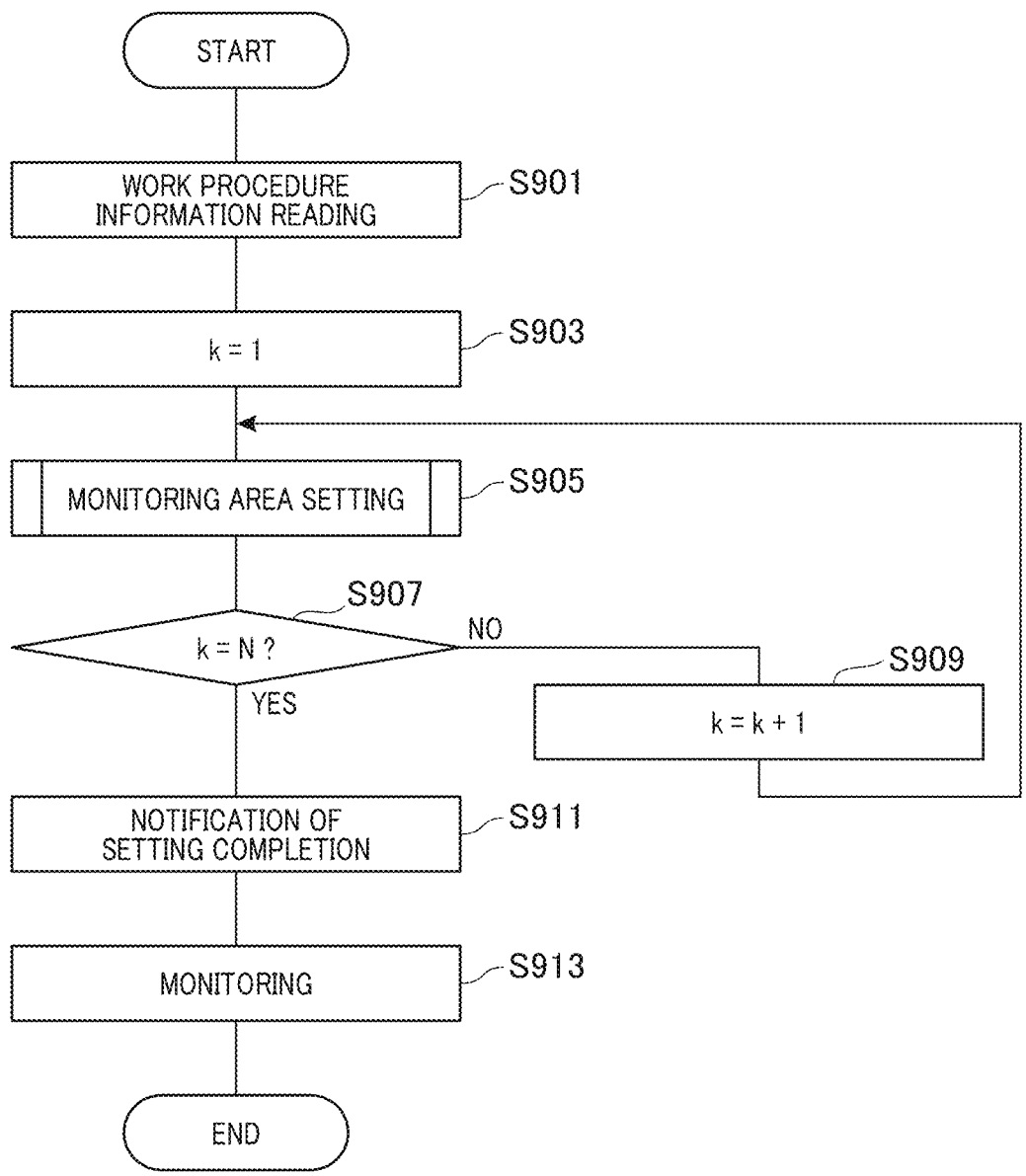
FIG. 56 is a flowchart illustrating the order of execution in work support performed by a control unit in the fifteenth embodiment.

On the other hand, after the assembly order k is set to 1 at step S907 in FIG. 56, when the parts box 30*a* accommodating the first parts 20*a* and held by the worker M is in the swinging state (see FIG. 58), a difference area is generated in the acquired sequential images at the portion of the hand holding the parts box 30*a* and the portion corresponding to the parts box 30*a*. Accordingly, a hand area of the hand of the worker M holding the parts box 30*a* is obtained, and, since the obtained hand area is adjacent to another difference area, which corresponds to a portion where the parts box 30*a* is imaged, it is determined that the parts box has been moved in the predetermined state by the worker M. Thus, it is determined as "Yes" at step S1013 FIG. 57.

Figure 59B:
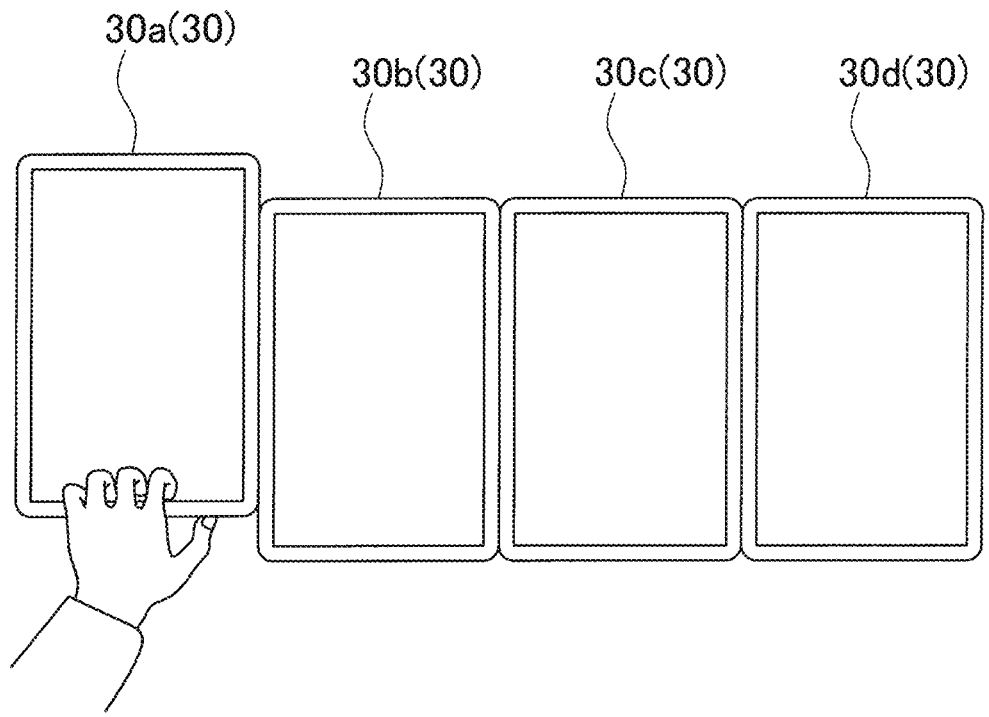
FIG. 59B is a view illustrating an imaging state of another image acquired immediately before the image of FIG. 59A.
Figure 60A:
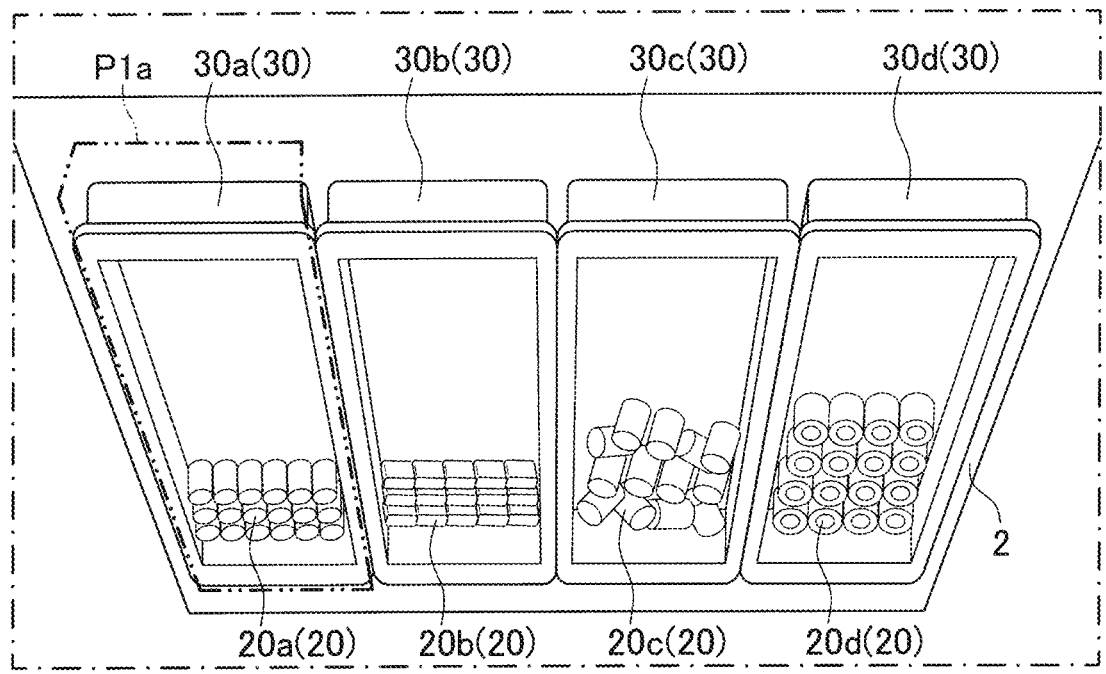
FIG. 60A is a view illustrating that a first monitoring area is set in an image.

In this case, storing of monitoring area is performed at step S1015, in which an area, which is obtained by adding the area presumed to be a portion held by the worker M to the difference area excluding the hand area, is set as the monitoring area P1*a* of the parts box 30*a*, and stored in the storage unit 12 (see FIG. 60A). At step S1015, the monitoring area can be accurately set by using the comparison result, among the above sequential images, between the image in which the parts box is determined as being stopped as it is returned to the original position (image acquired in the state of FIG. 59A) and another image acquired immediately before the above image (image acquired in the state of FIG. 59B).

When the monitoring area P1*a* is set for the parts box 30*a* accommodating the first parts 20*a*, the monitoring area setting ends. Then, at step S907 in FIG. 56, determination is performed to determine whether or not the assembly order k matches the total number N of the parts boxes, which is specified by the above work procedure information. In the above example, since the total number N is set to 4, it is determined as "No" at step S907. Then, after the assembly order k is incremented by 1 (S909), the steps from step S905 onward are repeated. Since the monitoring area has been set for the parts box 30*a* accommodating the first part 20*a*, k is set to 2.

Then, monitoring area setting for the parts box 30*b* accommodating the second parts 20*b* starts. The monitoring area P1*b* is set for the parts box 30*b* by swinging the parts box 30*b* accommodating the second parts 20*b* in the same manner as that described above. Since k=N is not satisfied (No at S907), k is set to 3 (S909). Then, the monitoring area P1*c* is set for the parts box 30*c* by swinging the parts box 30*c* accommodating the third parts 20*c* (S905). Subsequently, since k=N is not satisfied (No at S907), k is set to 4 (S909). Then, the monitoring area P1*d* is set for the parts box 30*d* by swinging the parts box 30*d* accommodating the fourth parts 20*d* (S905).

Figure 60B:
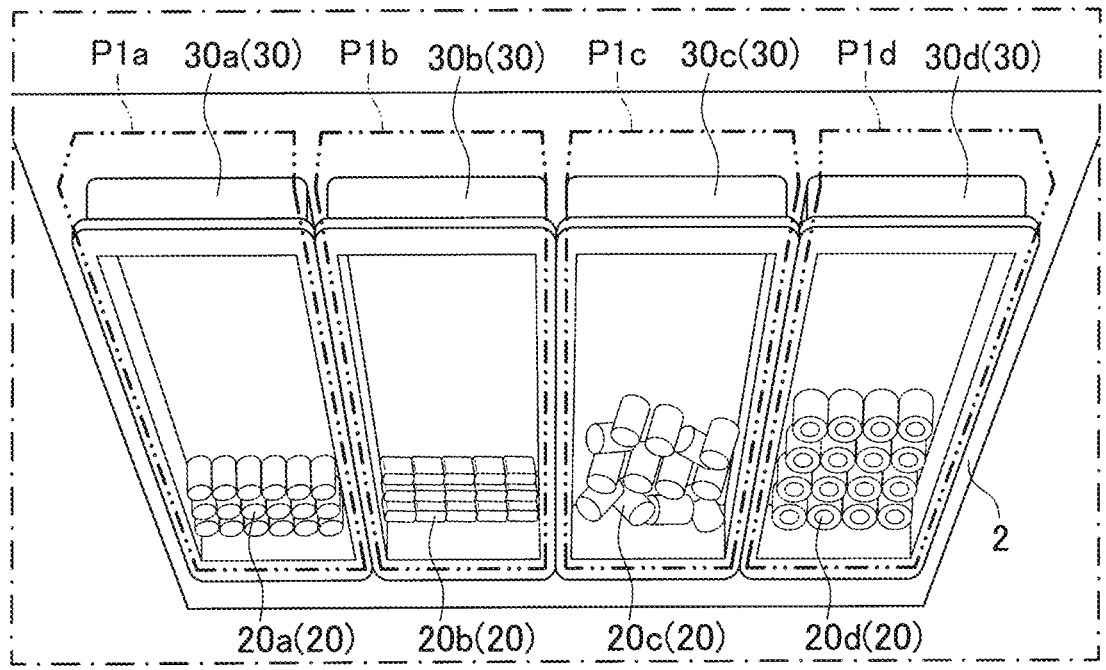
FIG. 60B is a view illustrating that all the monitoring areas are set in an image.

Thus, when the monitoring areas P1*a* to P1*d* are set for four parts boxes 30*a* to 30*d*, respectively, (see FIG. 60B), k=N is satisfied. Then, it is determined as "Yes" at step S907 in FIG. 56, and notification of setting completion is performed at step S911. At step S911, the worker M is notified that the setting of all the monitoring areas has been completed for the manufacturing lot by modes of light from the light emitting unit 15 or modes of sound from the speaker 16. Further, in the monitoring area setting, notification of individual setting completion may also be performed by using the light emitting unit 15 or the speaker 16 each time when one monitoring area is set.

When completion of setting of the monitoring areas is notified as described above, monitoring is performed at step S913. At step S913, dynamic detection is performed to the monitoring areas P1*a* to P1*d* set as described above to monitor the respective monitoring areas P1*a* to P1*d*. Further, the control unit 11 that performs the dynamic detection can correspond to an example of a "detecting section."

In the present embodiment, the dynamic detection is performed, as with the monitoring area setting described above, by using a technique of observing a time-series change in the monitoring areas P1a to P1d by using an image difference. Specifically, in the above monitoring, the dynamic detection of the monitoring area is performed by comparison between the latest image acquired by the imaging unit 13 and another image acquired earlier (for example, an image acquired immediately before the latest image).

By the above dynamic detection, it is determined whether or not the hand of the worker M has been detected by using a technique disclosed in, for example, JP 2018-156279 A, on the basis of whether a change that has occurred in the monitoring area is of a size that can be generally recognized as a hand. Further, the control unit 11 that determines whether or not the work according to a predetermined work procedure is performed on the basis of the detection result of the above dynamic detection can correspond to an example of a "determination unit."

For example, when the worker M, who has finished swinging the parts boxes 30a to 30d, takes out the part 20a from the parts box 30a in order to actually start the assembly work, the hand of the worker M is detected in the monitoring area P1a on the basis of the difference between the latest image and an image acquired immediately before the latest image. When the detection result shows that the hand of the worker M is detected in the monitoring area P1a, the monitoring area P1b, the monitoring area P1c, and the monitoring area P1d in this order in accordance with the above work procedure information, it is determined that the correct assembly work has been performed, and thus normal work notification is performed as the determination result. This normal notification is performed by, for example, lighting of green light, typically associated with correct answer, by the light emitting unit 15, or correct buzzer sound, typically associated with correct answer, by the speaker 16. When receiving the normal notification, the worker M can recognize that the parts have been assembled in accordance with the correct work procedure.

The normal notification may be performed for each monitoring area, or may be performed when the hand of the worker M has been detected in all the monitoring areas in accordance with the above work procedure information.

On the other hand, when the hand of the worker M is detected in the monitoring area in wrong order, for example, when the hand of the worker M is detected in the monitoring area P1a, and the monitoring area P1c in this order, it is determined that the wrong assembly work has been performed, and thus abnormal work notification is performed as the determination result. This abnormal notification is performed by, for example, lighting of red light, typically associated with incorrect answer, by the light emitting unit 15, or an alert message saying "please pick up the correct part" by the speaker 16. When receiving the abnormal notification, the worker M can immediately recognize that the parts have been taken out in an incorrect work procedure.

As described above, in the work support device 100 according to the present embodiment, on the basis of the comparison result, among the images captured by the imaging unit 13, between a portion corresponding to the monitoring area (P1a to P1d) set by the monitoring area setting and a portion corresponding to the monitoring area in another image that is acquired before the above image, taking out of the parts (20a to 20d) from the parts boxes (30a to 30d) corresponding to the monitoring area is detected. On the basis of the detection result, it is determined whether or not the work in accordance with the predetermined work procedure is performed, and the determination result is notified to the worker M. In this process, in the monitoring area setting, on the basis of the images acquired by the imaging unit 13 when the parts boxes are individually moved in a predetermined movement state by the worker M, the monitoring area corresponding to the parts box that is moved in the predetermined movement state is set for each parts box.

A work support program according to the present embodiment is a program that causes the control unit 11 of the work support device 100, which supports the work performed in accordance with a predetermined work procedure by using the parts (20a to 20d) accommodated in a plurality of parts boxes (30a to 30d), to execute: monitoring area setting (S905) for setting a monitoring area (P1a to P1d) for each parts box in the imaging range of the imaging unit 13; detection (S913) for detecting the parts being taken out from the parts boxes corresponding to the monitoring area, on the basis of the comparison result, among the images captured by the imaging unit 13, between a portion corresponding to the monitoring area set by the monitoring area setting and a portion corresponding to the monitoring area in another image that is acquired before the above image; determination (S913) for determining whether or not the work is performed in accordance with the predetermined work procedure on the basis of the detection result by the above detection; and notification (S913) for notifying the determination result by the above determination to the worker.

Further, in the monitoring area setting, on the basis of the images acquired by the imaging unit when the parts boxes are individually moved in a predetermined movement state by the worker, the monitoring area corresponding to the parts box that is moved in the predetermined movement state is set for each parts box.

Thus, the monitoring area can be easily set for each parts box by the worker M simply moving the parts boxes individually in the predetermined movement state before starting the work. In particular, since the worker M does not need to perform mouse operation while watching the screen, erroneous setting of the monitoring area due to an operation error or the like of the worker M can be avoided. Therefore, it is possible to set a monitoring area easily and correctly without imposing a work burden on the worker.

In addition, since the above predetermined movement state is a swinging state that is repeated on the assumption that the parts box is returned to the original position, the movement range of the parts box tends to be small, and can be easily specified from the acquired images, the monitoring area can be more accurately set.

In particular, in the monitoring area setting, the monitoring area is set by using the comparison result, among the images acquired by the imaging unit 13, between the image in which the parts box is determined as being stopped as it is returned to the original position (see FIG. 59A) and another image acquired immediately before the above image (see FIG. 59B). Thus, since the position of the parts box is located by using the difference between the image acquired immediately after the parts box stops moving and the image acquired immediately before the parts box stops moving, and the monitoring area is set according to the located position of the parts box, the monitoring area can be set more accurately. In addition, since the monitoring area is set at the timing immediately after the parts box stops moving, the time required for setting can be reduced even in the setting of a number of monitoring areas, and thus the work efficiency can be improved.

Sixteenth Embodiment

With reference to the drawings, a work support device and a work support program according to a sixteenth embodiment will now be described.

The sixteenth embodiment differs from the fifteenth embodiment in that setting is performed according to the work of the worker without obtaining a predetermined work procedure (work procedure information) in advance as a monitoring criterion. The components which are substantially the same as those of the fifteenth embodiment are denoted by the same reference signs, and the description thereof will be omitted.

In the fifteenth embodiment, since the work procedure information is read at the start of work support processing, it is necessary to perform the work of reading an information code provided in the work instruction or the like or the work of obtaining work procedure information from a higher level device. Therefore, in the present embodiment, in order to further reduce the work load to the worker M in the work support processing, a predetermined work procedure can be set according to the actual work by the worker M without obtaining the work procedure information in advance.

Figure 61:
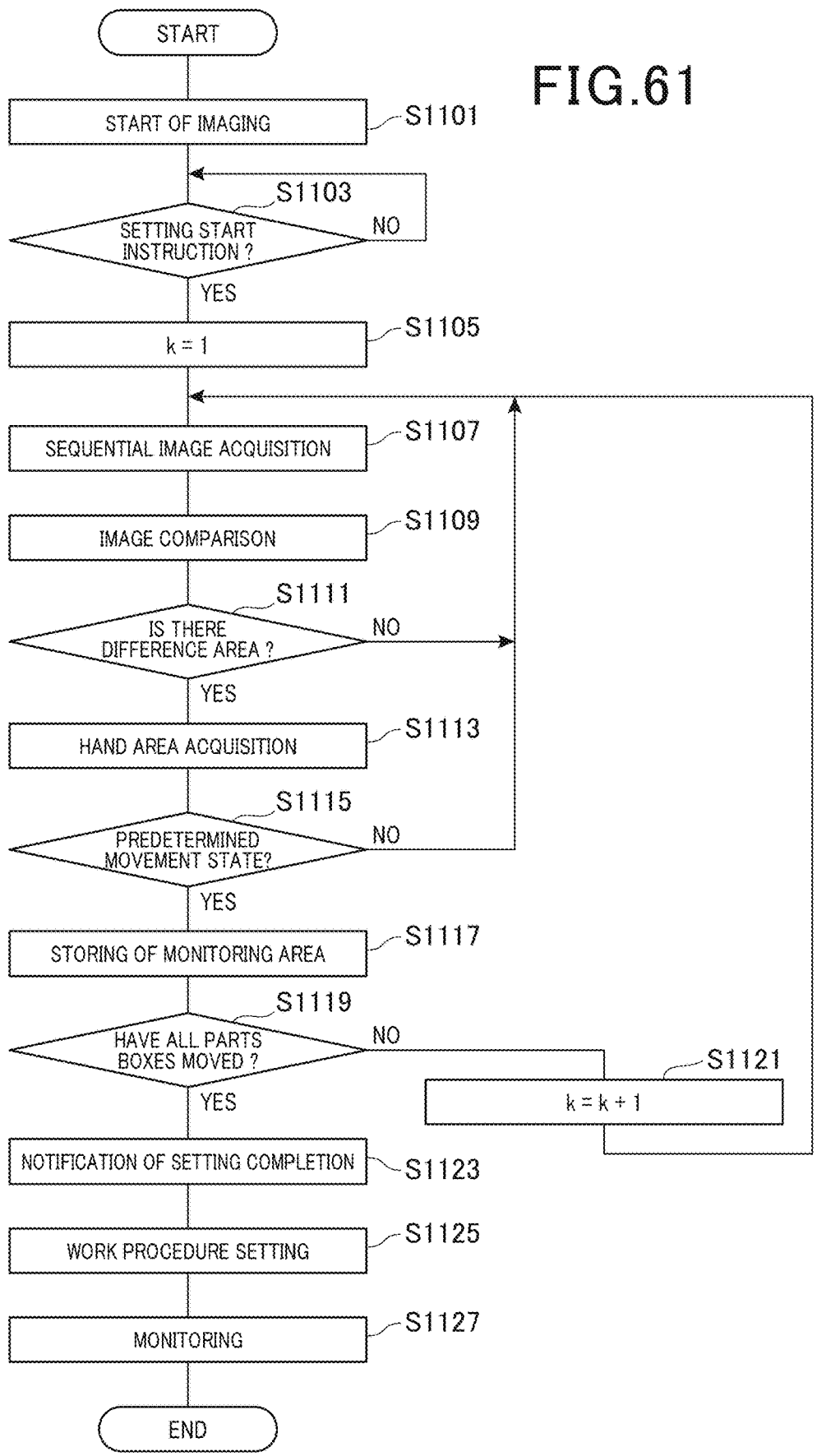
FIG. 61 is a flowchart illustrating the order of execution in work support performed by a control unit in a sixteenth embodiment.

Hereinafter, in the present embodiment, referring to the flowchart in FIG. 61, the following detailed description will be given of the work support processing performed on the basis of the work support program, which is performed for each manufacturing lot by the control unit 11, when the worker M performs predetermined work by which parts contained in a plurality of parts boxes are individually assembled to the workpiece W according to a predetermined work procedure.

The control unit 11 starts the work analysis processing when a predetermined start operation is performed to the operation unit 17. When the imaging unit 13 is ready to perform imaging (S1101 in FIG. 61), determination is performed at step S1103 to determine whether or not setting start instruction has been issued. Then, when the above predetermined gesture is captured by the imaging unit 13, it is determined that the setting start instruction has been issued (Yes at S1103), and the assembly order k is set to 1 (S1105).

Then, at step S1107, sequential image acquisition is performed to acquire sequential images corresponding to the video image of a predetermined period of time. Subsequently, at step S1109, image comparison is performed to compare images of each successive frame or several successive frames among the sequential images acquired as described above to extract a difference area. When the difference area greater than the predetermined range is generated (Yes at S1111), hand area acquisition is performed at S1113. If the images involved in generation of the difference area include a region with a shape and size that can be generally recognized as a hand, this region is obtained as a hand area.

Then, in determination at step S1115, when the hand area obtained as described above and another difference area corresponding to the parts box are determined as not being adjacent to each other, it is determined as "No," and the steps from step S1107 are repeated. On the other hand, after the assembly order k is set to 1, when the parts box 30a accommodating the first parts 20a and held by the worker M is in the swinging state, the hand area obtained as described above and another difference area corresponding to a portion where the parts box 30a is imaged are adjacent to each other. Accordingly, it is determined that the parts box has been moved in the predetermined state by the worker M, and it is determined as "Yes" at step S1115.

Figure 57:
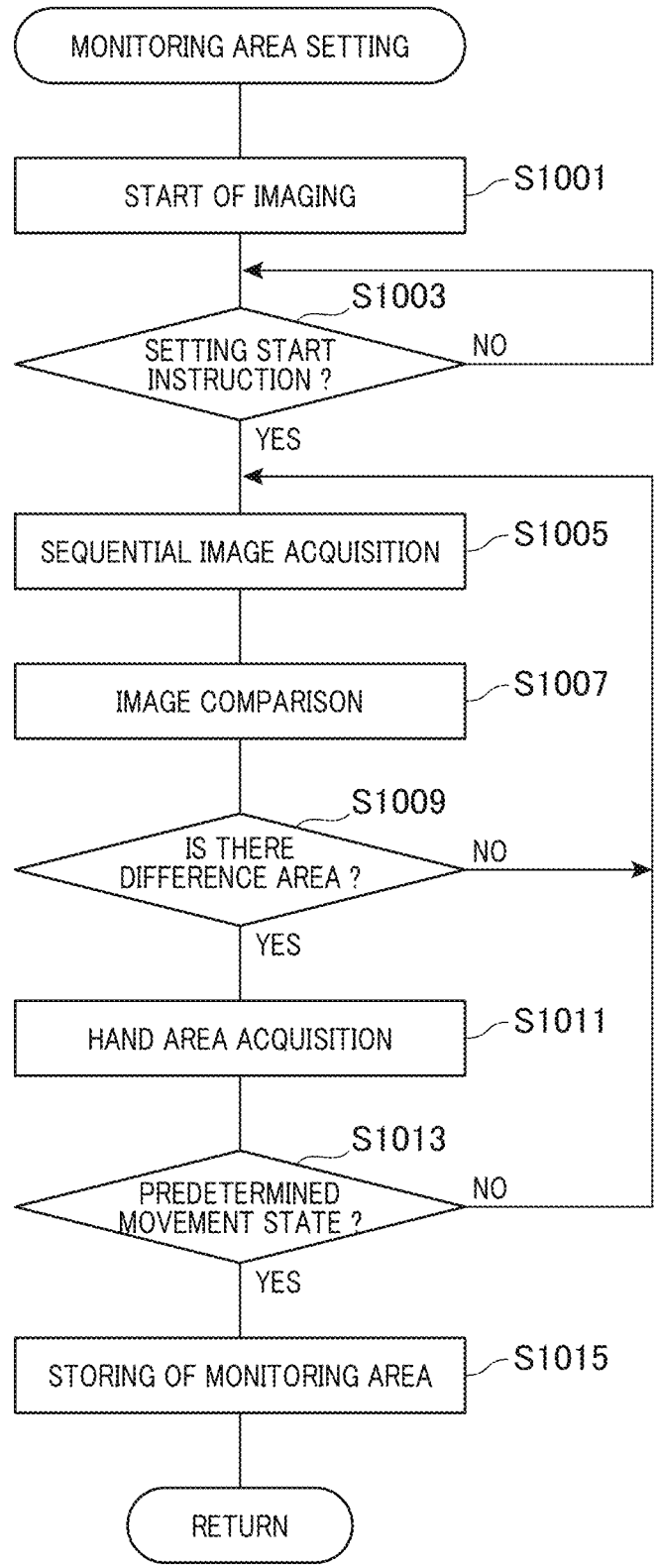
FIG. 57 is a flowchart illustrating the order of execution in monitoring area setting in FIG. 56.

When determination at step S1115 is Yes, storing of monitoring area is performed at step S1117, in which an area, which is obtained by adding the area presumed to be a portion held by the worker M to the difference area excluding the hand area, is set as the monitoring area P1a of the parts box 30a, and stored in the storage unit 12, as with the storing of monitoring area in fifteenth embodiment at step S1015 in FIG. 57.

Subsequently, at step S1119, determination is performed to determine whether or not all the parts boxes used in the manufacturing lot have been moved in a predetermined movement state by the worker M. In the present embodiment, a predetermined end gesture is set to be performed to the work support device 100 after the worker M finished swinging the parts boxes individually. When the predetermined end gesture is not acquired by the imaging unit 13, it is determined as "No" at step S1119. Then, after the assembly order k is incremented by 1 (S1121), the steps from step S1107 onward are repeated. In the present embodiment, repetition of the steps from step S1107 to step S1119 can correspond to the monitoring area setting.

When the worker M, after having moved the last parts box, performs the predetermined end gesture in the imaging range of the imaging unit 13, and the predetermined end gesture is captured by the imaging unit 13, it is determined that all the parts boxes have been moved in the predetermined movement state (Yes at step S1119). When it is determined as "Yes" at step S1119, notification of setting completion is performed at step S1123. As in notification of setting completion at step S911 in FIG. 56 according to the fifteenth embodiment, the worker M is notified that the setting of all the monitoring areas has been completed for the manufacturing lot by modes of light from the light emitting unit 15 or modes of sound from the speaker 16.

Further, the above predetermined end gesture may be, for example, a motion of causing the imaging unit 13 to capture an image of an information code shown in the work instruction or the like or a marker of a predetermined shape. Further, in determination at step S1119, for example, an elapsed time after the worker M has individually swung the parts boxes can also be taken into consideration. In this case, when a predetermined time has elapsed after the last difference area was detected, it is determined that the worker M finished swinging the parts boxes individually, and thus it is determined as "Yes."

When completion of setting of monitoring areas is notified as described above, work procedure setting is performed at step S1125. At step S1125, during actual assembly work performed by the worker M after the above notification, detection is performed to taking out of the parts in response to the above dynamic detection to thereby set the work procedure on the basis of the order of taking out of the parts. When the work procedure is fixed as described above, the worker M, during the assembly work, takes out the parts from each parts box in the correct order by repeating taking out from the parts box 30a, the parts box 30b, the parts box 30c, and the parts box 30d in this order. Accordingly, by detecting this repetition in response to the above dynamic detection, it is possible to recognize the correct work procedure and set the work procedure as the work criterion. Further, the control unit 11 that performs the above work procedure setting can correspond to an example of a "work procedure setting unit."

When the work procedure is set as described above, monitoring is performed at step S1127. At step S1127, as in the monitoring at step S913 in FIG. 56, dynamic detection is performed to the monitoring areas P1a to P1d set as described above to monitor the respective monitoring areas P1a to P1d.

As described above, in the work support device 100 according to the present embodiment, after the plurality of monitoring areas (P1a to P1d) are set by the monitoring area setting, a predetermined work procedure is set by the work procedure setting (step S1125 in FIG. 61) performed by the control unit 11 on the basis of the order of taking out of the parts (20a to 20d) detected in response to the dynamic detection.

Accordingly, after the monitoring area setting, since the predetermined work procedure can be automatically set by the worker M actually taking out the parts from the parts boxes to perform correct assembly, there is no need of performing the work of reading an information code provided in the work instruction or the like or the work of obtaining work procedure information from a higher level device.

In setting of the monitoring areas, by swinging the parts boxes in the correct order of the work procedure, the correct work procedure can be recognized by the control unit 11. Accordingly, when the correct work procedure is recognized in this manner, the work procedure setting at step S1125 can be omitted.

The fifteenth and sixteenth embodiments, and modified examples according to the fifteenth and sixteenth embodiments are not limited to the one described above, and may also be embodied as described below.

(1) The parts boxes 30, which are disposed within the imaging range of the imaging unit 13 as the monitoring target, are not limited to four parts boxes 30a to 30d, and may also be one to three parts boxes, or five or more parts boxes. Further, the parts boxes 30 are not limited to being horizontally arranged side by side within the imaging range of the imaging unit 13, and, for example, may also be vertically arranged at multiple levels such as upper and lower levels. Moreover, the parts box 30 to be monitored is not limited to being formed as a shape with a rectangular opening edge. For example, the opening edge may be formed in a trapezoidal shape, or the opening edge may be partially curved. Further, the parts box 30 to be monitored may also be configured, for example, as a storage bag such that the shape of the opening edge varies depending on how it is placed.

(2) In the monitoring area setting according to the fifteenth and sixteenth embodiments, the predetermined movement state is not limited to the swinging state. Any movement state, by which the image difference can be easily obtained, such as lifting the parts box, may also be adopted.

(3) In the fifteenth and sixteenth embodiments, the invention can be applied not only to work support in assembly of the parts to the workpiece W such as a printed circuit board according to a predetermined work procedure, but also to work support in assembly of the parts to a semi-finished product, for example, in an assembly line for high-mix low-volume products according to a predetermined work procedure.

Seventeenth Embodiment

With reference to the drawings, a work support device and a work support program according to a seventeenth embodiment will now be described.

The seventeenth embodiment, as in the fifteenth and sixteenth embodiments, mainly differs from the first embodiment in the process for setting the monitoring area. The components which are substantially the same as those of the above embodiments are denoted by the same reference signs, and the description thereof will be omitted.

As illustrated in FIG. 54, the work support device 100 according to the present embodiment, as in the fifteenth embodiment, is installed on the work table 1 or the like, and is configured as a device that supports assembly work performed by the worker M by using parts contained in a plurality of parts boxes according to a predetermined work procedure.

Figure 62:
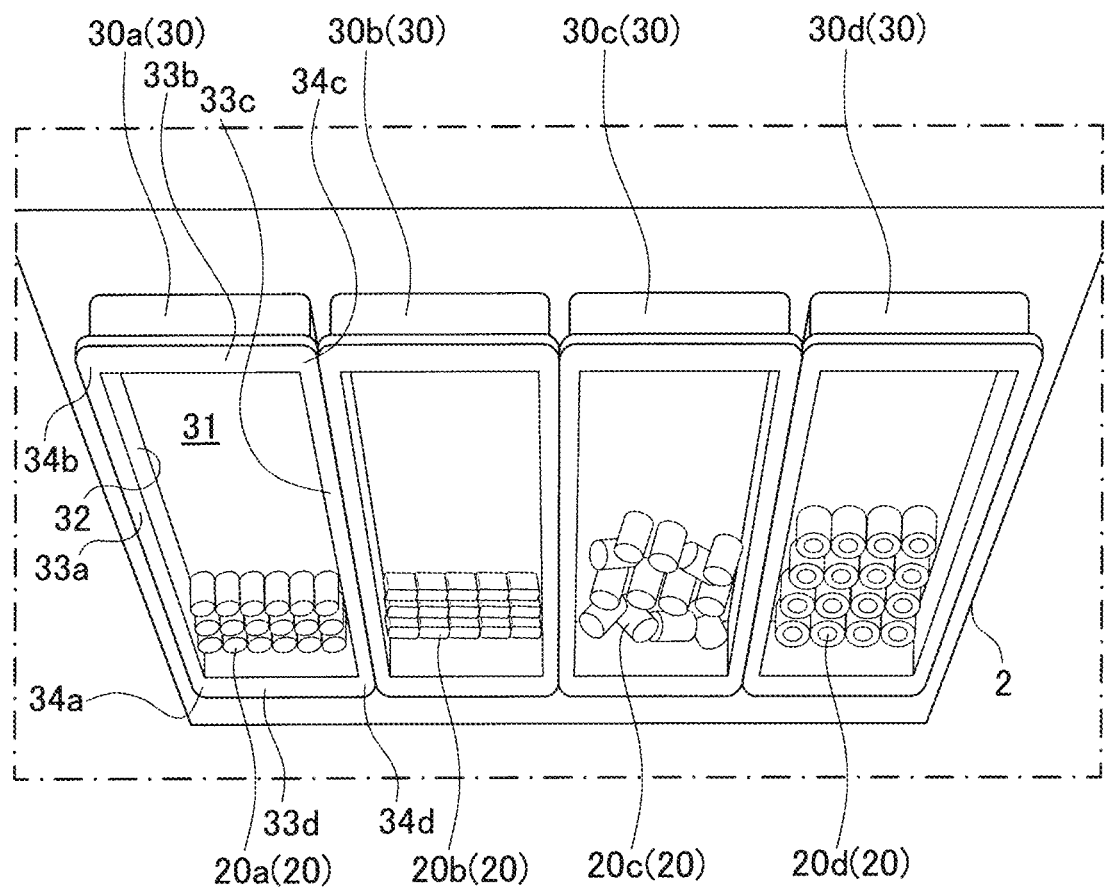
FIG. 62 is a view illustrating an imaging state in which respective parts boxes are imaged.

FIG. 62 is a more detailed view of the parts boxes 30a shown in FIG. 2. The parts box 30a is formed such that an outer periphery of a rectangular bottom wall 31 is connected to a lower end of a peripheral wall 32, and the peripheral wall 32 has a rectangular ring shape, whose upper end faces 33a to 33d are provided with four corners 34a to 34d. The parts boxes 30b to 30d, as with the parts box 30a, are each formed such that an outer periphery of a rectangular bottom wall is connected to a lower end of a peripheral wall, and the peripheral wall has a rectangular ring shape, whose upper end faces are provided with four corners.

Figure 63:
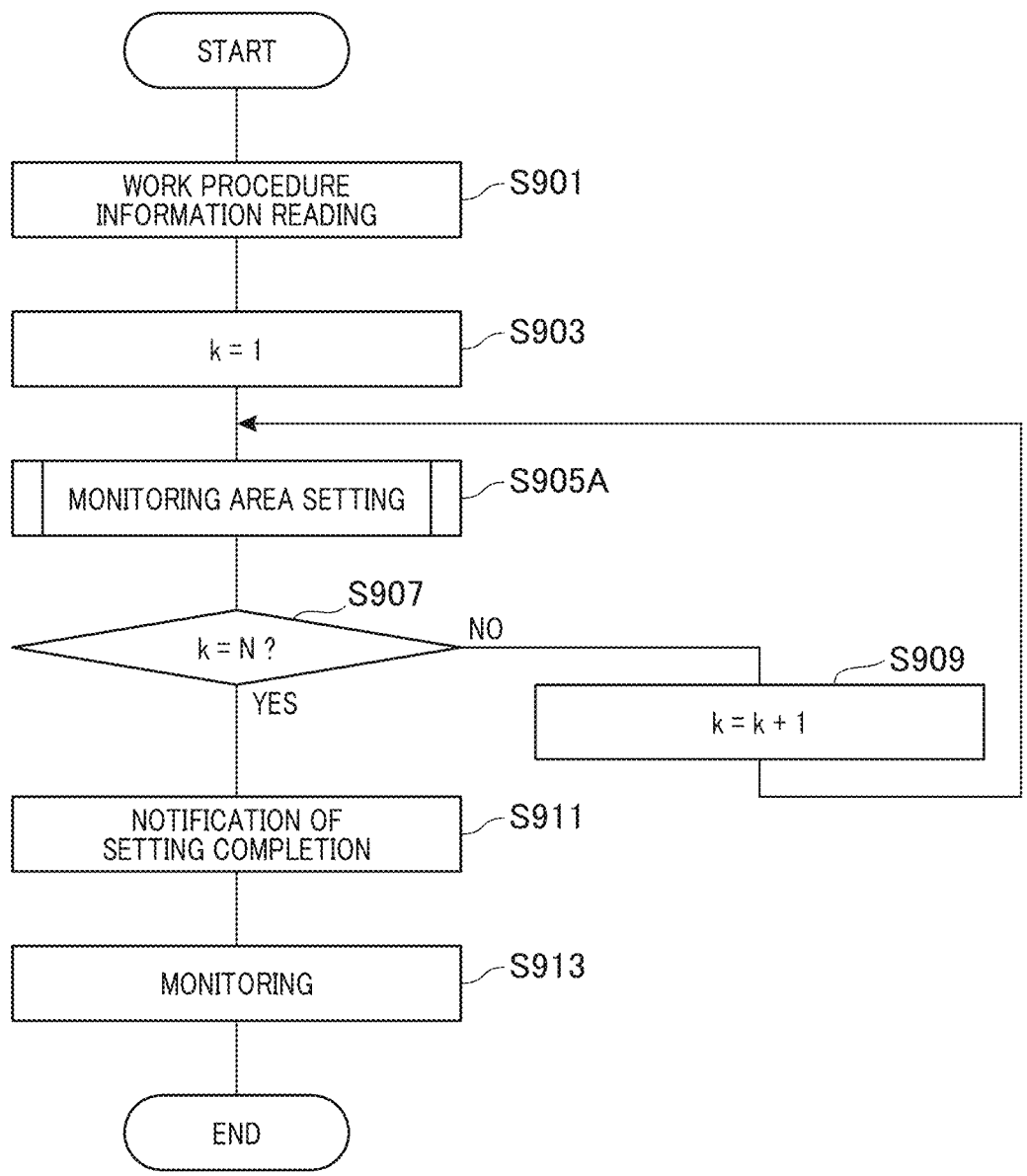
FIG. 63 is a flowchart illustrating the order of execution in work support performed by a control unit in a seventeenth embodiment.

Referring to a flowchart of FIGS. 63 and 64, the work support processing in seventeenth embodiment will now be described in detail. In the example of the predetermined work procedure described below, the work procedure is fixed in advance, by which the part 20a in the parts box 30a, the part 20b in the parts box 30b, the part 20c in the parts box 30c, and the part 20d in the parts box 30d are sequentially assembled to the workpiece W in this order. The processing shown in FIG. 63 is the same as that in FIG. 58 except for the monitoring area setting at step S905A. Therefore, the description of the same steps in FIG. 63 as those in FIG. 58 will be omitted.

In the monitoring area setting of the present embodiment, the worker M touches one of the corners on the upper end face of the peripheral wall of the parts box with a finger F while the imaging unit 13 is acquiring an image. Then, starting from the corner, a boundary along the upper end face is detected so that an area having a rectangular shape surrounded by the boundary is set and registered as a monitoring area.

Referring to a flowchart of FIG. 64, the above monitoring area setting for setting a monitoring area along the boundary, starting from the corner of the parts box where the finger has touched, will now be described in detail.

First, when the imaging unit 13 is ready to perform imaging (S1201 in FIG. 64), determination is performed at step S1203 to determine whether or not a human finger is detected in the captured image. It is determined as "No" repeatedly until a human finger is detected.

When a human finger is detected in the captured image during this repetition (Yes at S1203), it is determined whether the detected finger is stationary or not in determination at step S1205. When the finger is moving (No at S1205), the steps from step S1203 onward are performed. While movement of the finger is detected, determination of Yes at step S1203 and determination of No at step S1205 are repeated.

When the detected finger becomes stationary, it is determined as "Yes" in determination at step S1205, and measurement of stationary time during which the detected finger is stationary starts (S1207). Subsequently, in determination at step S1209, it is determined whether or not the stationary time has passed a predetermined time set in advance (for example, 5s). When the stationary time has not passed the predetermined time (No at S1209), it is determined whether or not the detected finger stays stationary in determination at step S1211. When the detected finger stays stationary (Yes at S1211), the steps from step S1209 are performed. Then, when movement of the finger is detected before the stationary time has passed the above predetermined time (No at S1211), the steps from step S1203 are performed.

On the other hand, as shown in FIG. 65, when the finger F of the worker M is stationary while being in contact with the corner 34a, which is located between the upper end face 33a and the upper end face 33d of the parts box 30a, and the stationary time of the finger F has passed the above predetermined time (Yes at S1209), start point detection is performed at step S1213. At step S1213, in the latest captured image set as an image of a search target, a point regarded as an intersection between two straight lines extending from a position of the finger F which is stationary (two straight lines which will intersect at a position closest to the coordinates of the finger tip) is detected as a start point. As described above, when the finger F is stationary while being in contact with the corner 34a, a line segment corresponding to the upper end face 33a and a line segment corresponding to the upper end face 33d extend from a position of the finger F which is stationary. Accordingly, the corner 34a where the finger F is in contact is detected as a start point.

Then, at step S1215, search target setting is performed to set one of the two straight lines extending from the finger F which is stationary as a search target. Subsequently, in search at step S1217, an intersection which is a tip of the straight line that is set as the search target and intersects another straight line is searched in the captured image.

In the present embodiment, a direction of the turn at the intersection in plan view of the parts box as viewed from above in search is determined to be clockwise, so one of the two straight lines detected at the start of search, which is directed in the clockwise direction, is set as a first search target. As described above, when the finger F is stationary at the corner 34a of the parts box 30a, part of a line segment corresponding to the upper end face 33a, and part of a line segment corresponding to the upper end face 33d are detected as two straight lines extending from the finger F. Accordingly, a line segment corresponding to the upper end face 33a, which is directed in the clockwise direction, is set as a search target (see the arrow Sa in FIG. 65).

Figure 64:
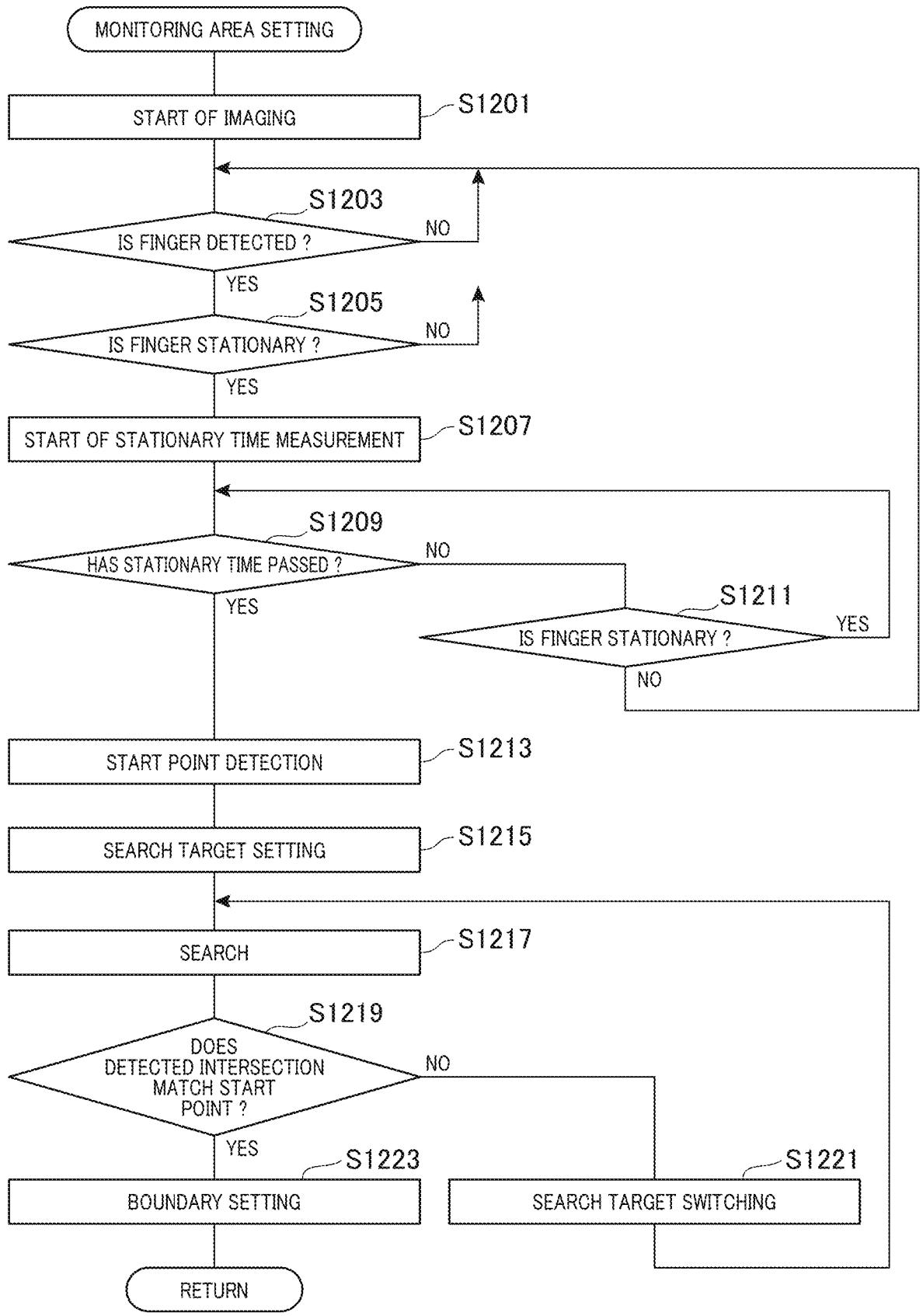
FIG. 64 is a flowchart illustrating the order of execution in monitoring area setting in FIG. 63.

In search at step S1217 in FIG. 64, when a tip of the straight line of the search target (intersection) is detected, determination is performed at step S1219 to determine whether or not the detected intersection matches the above start point. Here, when an intersection that is a tip of the line segment corresponding to the upper end face 33a and that intersects the line segment corresponding to the upper end face 33b is searched, this intersection corresponds to the corner 34b and does not match the above start point. Accordingly, it is determined as "No" at step S1219.

When determination is No at step S1219, search target switching is performed at step S1221 so that another straight line extending from the searched intersection is set as a search target. As described above, when the intersection corresponding to the corner 34b is searched, switching is performed so that the line segment corresponding to the upper end face 33b is set as a search target (see the arrow Sb in FIG. 65). Then at step S1217 in FIG. 64, when an intersection that is a tip of the line segment corresponding to the upper end face 33b and that intersects the line segment corresponding to the upper end face 33c is searched, this intersection corresponds to the corner 34c and does not match the above start point. Accordingly, it is determined as "No" at step S1219. Then, switching is performed so that the line segment corresponding to the upper end face 33c is set as a search target (S1221: see the arrow Sc in FIG. 65), and the intersection that is a tip of the line segment corresponding to the upper end face 33c and that intersects the line segment corresponding to the upper end face 33d is searched (S1217). Since the intersection corresponds to the corner 34d and does not match the above start point (No at S1219), switching is performed so that the line segment corresponding to the upper end face 33d is set as a search target (S1221: see the arrow Sd in FIG. 65), and the intersection that is a tip of the line segment corresponding to the upper end face 33d and that intersects the line segment corresponding to the upper end face 33a is searched (S1217). Since this intersection corresponds to the corner 34a and matches the above start point, it is determined as "Yes" in determination at step S1219.

When it is determined as "Yes" at step S1219, boundary setting is performed at step S1223. At step S1223, a polygonal ring formed by connecting the line segments that have been searched is detected and set as a boundary, which extends from the start point, turns at a plurality of intersections (i.e., the corners), and then returns to the start point. The polygonal area surrounded by the boundary is set as a monitoring area. As described above, when the boundary formed by connecting the line segments corresponding to the upper end faces 33a to 33d is detected and set, the rectangular area surrounded by the boundary is set as the monitoring area P1a for the parts box 30a accommodating the first parts 20a (see FIG. 60A). Therefore, in FIG. 60A, the boundary is denoted by reference numeral P1a. Similarly, when the finger F of the worker M is stationary while being in contact with the corner 34b (34c, 34d) of the parts box 30a, the rectangular area surrounded by the boundary, which extends from the corner 34b (34c, 34d) taken as a start point, turns at a plurality of intersections, and then returns to the start point, is also set as the monitoring area P1a.

Figure 66:
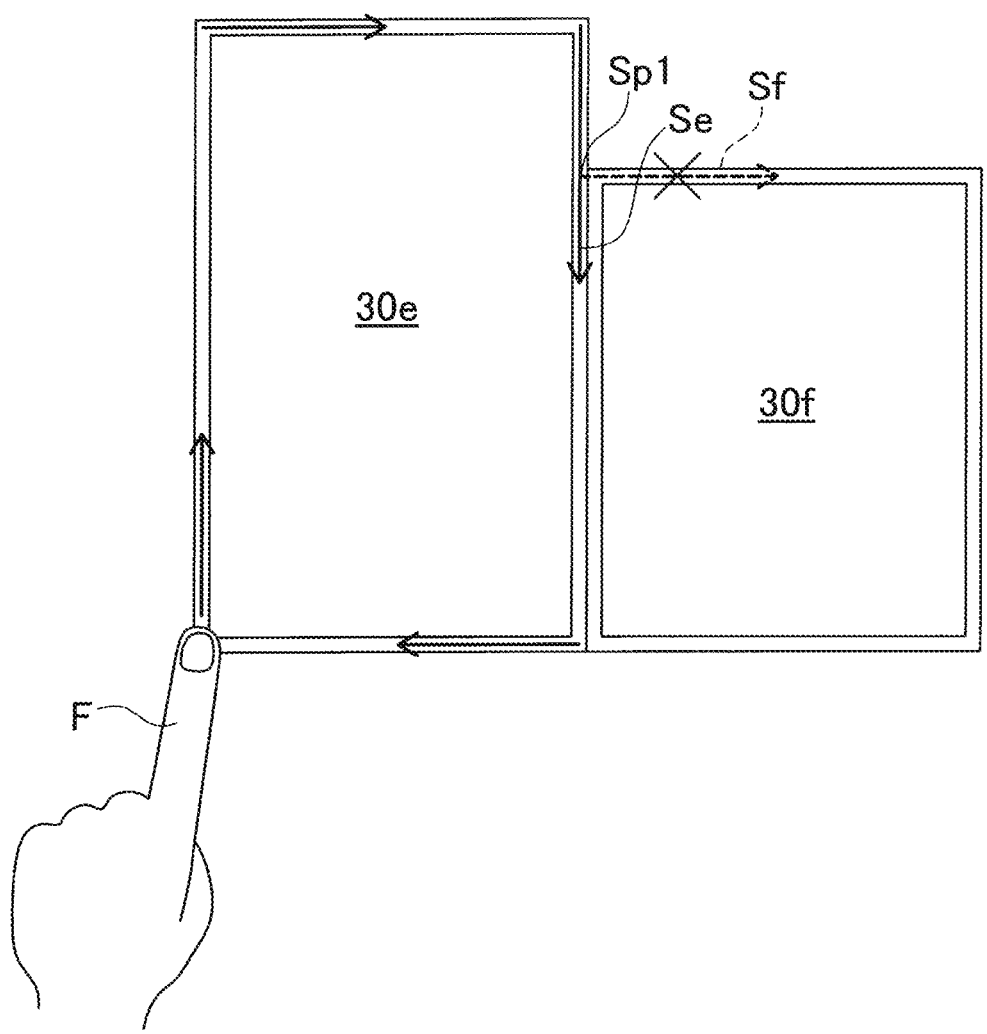
FIG. 66 is a view illustrating a case where the direction of a turn at the intersection in search is set to a first direction to thereby prevent influence of detecting unintended intersection.

Here, with reference to FIG. 66, the reason that the direction of a turn at the intersection in search is set to a first direction (clockwise direction in plan view of the parts box as viewed from above) will now be specifically described.

As shown in FIG. 66, for example, in setting of the monitoring area of the parts box 30e, it is assumed that the parts box 30e and the parts box 30f are arranged side by side with the peripheral wall of the parts box 30e and the peripheral wall of the parts box 30f in contact with each other. In the above search, if the upper end face of the parts box 30e is determined as being continuous to the upper end face of the parts box 30f at the position adjacent to the parts box 30f, an unintended intersection (see reference numeral Sp1 in FIG. 66) may be detected. In this case, the upper end face of the parts box 30f may be erroneously searched as a straight line extending from the intersection (see the arrow Sf in FIG. 66). Meanwhile, for example, while the boundary is defined to turn in the clockwise direction at the intersection in plan view of the parts box as viewed from above, the direction of the turn at the intersection Sp1 along the upper end face of the parts box 30f is a counterclockwise direction, which is opposite to the clockwise direction.

Therefore, according to the present embodiment, the direction of a turn at the intersection in search is set to clockwise direction as described above (one direction). As shown in FIG. 66, a straight line extending from the unintended intersection Sp1 and corresponding to the upper end face of the parts box 30e (see the arrow Se in FIG. 66) is directed in the clockwise direction from the intersection Sp1, whereas a straight line extending from the unintended intersection Sp1 and corresponding to the upper end face of the parts box 30*f* (see the arrow Sf in FIG. 66) is directed in the counterclockwise direction from the intersection Sp1. Accordingly, the upper end face of the parts box 30*f*, which extends in the counterclockwise direction, is prevented from being erroneously set as a search target.

When the monitoring area P1*a* is set for the parts box 30*a* accommodating the first parts 20*a*, the monitoring area setting ends. Then, at step S907 in FIG. 63, determination is performed to determine whether or not the assembly order k matches the total number N of the parts boxes, which is specified by the above work procedure information.

In the above example, since the total number N is set to 4, it is determined as "No" at step S907. Then, after the assembly order k is incremented by 1 (S909), the steps from step S905A onward are repeated. Since the monitoring area has been set for the parts box 30*a* accommodating the first part 20*a*, k is set to 2. Then, monitoring area setting for the parts box 30*b* accommodating the second parts 20*b* starts. The monitoring area P1*b* is set for the parts box 30*b* when the finger is stationary while being in contact with one of the corners of the parts box 30*b* accommodating the second parts 20*b* in the same manner as that described above. Since k=N is not satisfied (No at S907), k is set to 3 (S909).

Then, the monitoring area P1*c* is set for the parts box 30*c* when the finger is stationary while being in contact with one of the corners of the parts box 30*c* accommodating the third parts 20*c* (5905A). Since k=N is not satisfied (No at S907), k is set to 4 (S909). Then, the monitoring area P1*d* is set for the parts box 30*d* when the finger is stationary while being in contact with one of the corners of the parts box 30*d* accommodating the fourth parts 20*d* (5905A).

As described above, in the work support device 100 according to the present embodiment, on the basis of the comparison result, among the images captured by the imaging unit 13, between a portion corresponding to the monitoring area (P1*a* to P1*d*) set by the monitoring area setting and a portion corresponding to the monitoring area in another image that is acquired before the above image, taking out of the parts (20*a* to 20*d*) from the parts boxes (30*a* to 30*d*) corresponding to the monitoring area is detected. On the basis of the detection result, it is determined whether or not the work in accordance with the predetermined work procedure is performed, and the determination result is notified to the worker M. In this process, in the monitoring area setting, a boundary (P1*a* to P1*d*) is detected in the image acquired by the imaging unit 13. The boundary (P1*a* to P1*d*) extends from a start point at the corner where the finger F of the worker M is in contact, among the plurality of corners (34*a* to 34*d*) on the upper end faces (33*a* to 33*d*) of the peripheral wall of the parts boxes, turns at a plurality of intersections, and then returns to the start point. The polygonal area surrounded by the boundary is set and registered as a monitoring area for each parts box.

A work support program according to the present embodiment is a program that causes the control unit 11 of the work support device 100, which supports the work performed in accordance with a predetermined work procedure by using the parts (20*a* to 20*d*) accommodated in a plurality of parts boxes (30*a* to 30*d*), to execute: monitoring area setting (5905A) for setting a monitoring area (P1*a* to P1*d*) for each parts box in the imaging range of the imaging unit 13; detection (S913) for detecting the parts being taken out from the parts boxes corresponding to the monitoring area, on the basis of the comparison result, among the images captured by the imaging unit 13, between a portion corresponding to the monitoring area set by the monitoring area setting and a portion corresponding to the monitoring area in another image that is acquired before the above image; determination (S913) for determining whether or not the work is performed in accordance with the predetermined work procedure on the basis of the detection result by the above detection; and notification (S913) for notifying the determination result by the above determination to the worker. In the monitoring area setting, a boundary (P1*a* to P1*d*) is detected in the image acquired by the imaging unit 13. The boundary (P1*a* to P1*d*) extends from a start point at the corner where the finger F of the worker M is in contact, among the plurality of corners 34*a* to 34*d* on the upper end faces 33*a* to 33*d* of the peripheral wall 32 of the parts boxes, turns at a plurality of intersections, and then returns to the start point. The polygonal area surrounded by the boundary is set and registered as a monitoring area for each parts box.

Thus, the monitoring area can be easily set for each parts box by the worker M, when touching, with the finger F, one of the corners on the upper end face of the peripheral wall of the parts box before starting the work. In particular, since the worker M does not need to perform mouse operation while watching the screen, erroneous setting of the monitoring area due to an operation error or the like of the worker M can be avoided. Therefore, it is possible to set a monitoring area easily and correctly without imposing a work burden on the worker.

In particular, in the monitoring area setting, since the boundary (P1*a* to P1*d*) to be detected is set to turn at the intersection in one direction, the line extending from the unintended intersection (Sp1) in the direction different from the first direction can be excluded as a line extending along the upper end face of the peripheral wall of the adjacent parts box.

Eighteenth Embodiment

With reference to the drawings, a work support device and a work support program according to an eighteenth embodiment will now be described.

The eighteenth embodiment mainly differs from the seventeenth embodiment in that, in monitoring area setting, a finger in a stationary state touches a plurality of corners for each parts box. The components which are substantially the same as those of the seventeenth embodiment are denoted by the same reference signs, and the description thereof will be omitted.

Figure 67:
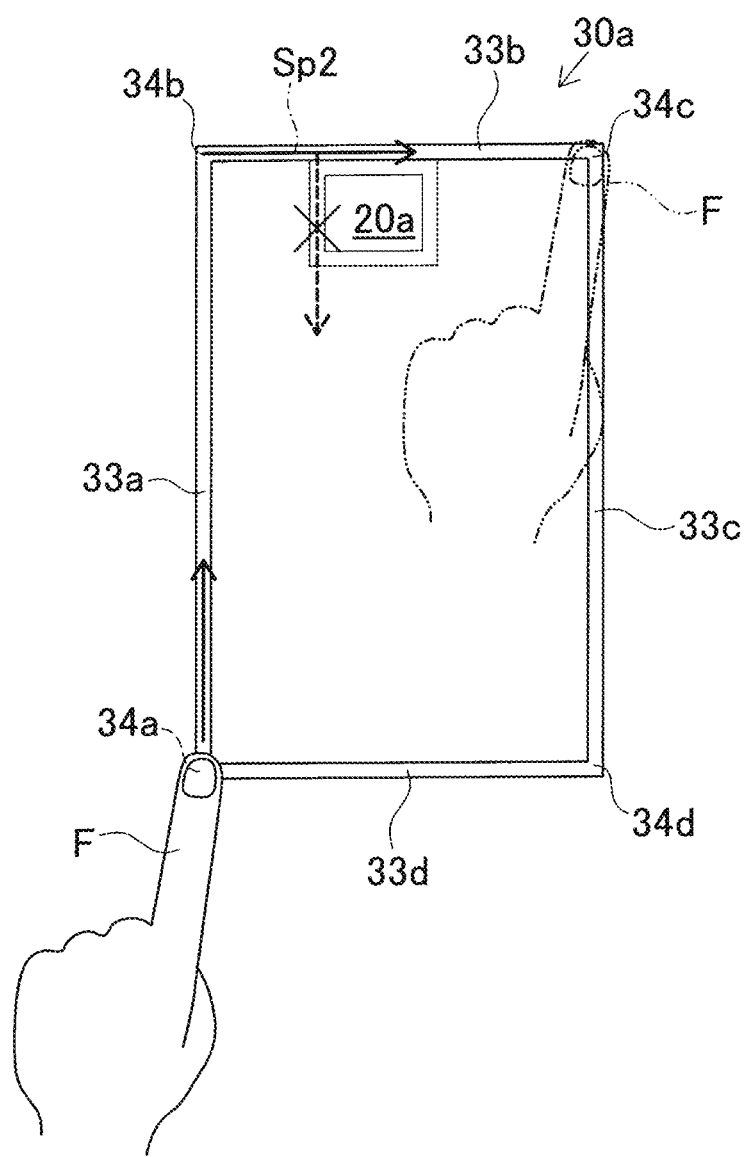
FIG. 67 is a view illustrating a monitoring area that is set when two corners thereof are touched by a finger in a stationary state in an eighteenth embodiment.

In the present embodiment, a finger in a stationary state touches a plurality of corners for each parts box to thereby improve detection accuracy of the boundary for setting the monitoring area. Specifically, in the monitoring area setting, a boundary is detected by setting one of a plurality of corners, which is touched by the finger F in a stationary state as a start point, and the other corner as at least part of the intersections. Accordingly, the boundary that returns to the original start point without passing through the other corner, as an intersection, touched by the finger F in a stationary state can be determined as an erroneous boundary. Thus, detection accuracy of the boundary can be enhanced. For example, as shown in FIG. 67, when the finger F in a stationary state touches the corner 34*a* and the corner 34*c* of the parts box 30*a* in this order, the boundary having a start point at the corner 34*a* (corner 34*c*) can be determined as an erroneously detected boundary if it does not have a position corresponding to the corner 34*c* (corner 34*a*) as an intersection.

Further, detection accuracy of the boundary for setting the monitoring area can be enhanced by determining in advance the order that the finger F in a stationary state should touch the corner corresponding to the intersection to be detected. For example, it is determined in advance that the finger F in a stationary state first touches a corner corresponding to the intersection to be detected second, and then touches a corner which is set as a start point. Then, as shown in FIG. 67, the finger F in a stationary state first touches the corner 34*c* of the parts box 30*a*, and then touches the corner 34*a*. Thus, even if an unintended intersection Sp2 is detected due to the part 20*a* in the parts box 30*a*, the intersection Sp2 is not erroneously searched as a position where to turn since the second intersection is set to a position corresponding to the corner 34*c*. Therefore, detection accuracy of the boundary for setting the monitoring area can be enhanced. In FIG. 67, the parts box 30*a* is shown in plan view, and one part 20*a* is exaggerated for convenience.

Nineteenth Embodiment

With reference to the drawings, a work support device and a work support program according to a nineteenth embodiment will now be described.

The nineteenth embodiment mainly differs from the seventeenth embodiment in that, in monitoring area setting, a boundary is detected as a ring shape having a predetermined width. The components which are substantially the same as those of the seventeenth embodiment are denoted by the same reference signs, and the description thereof will be omitted.

Figure 68:
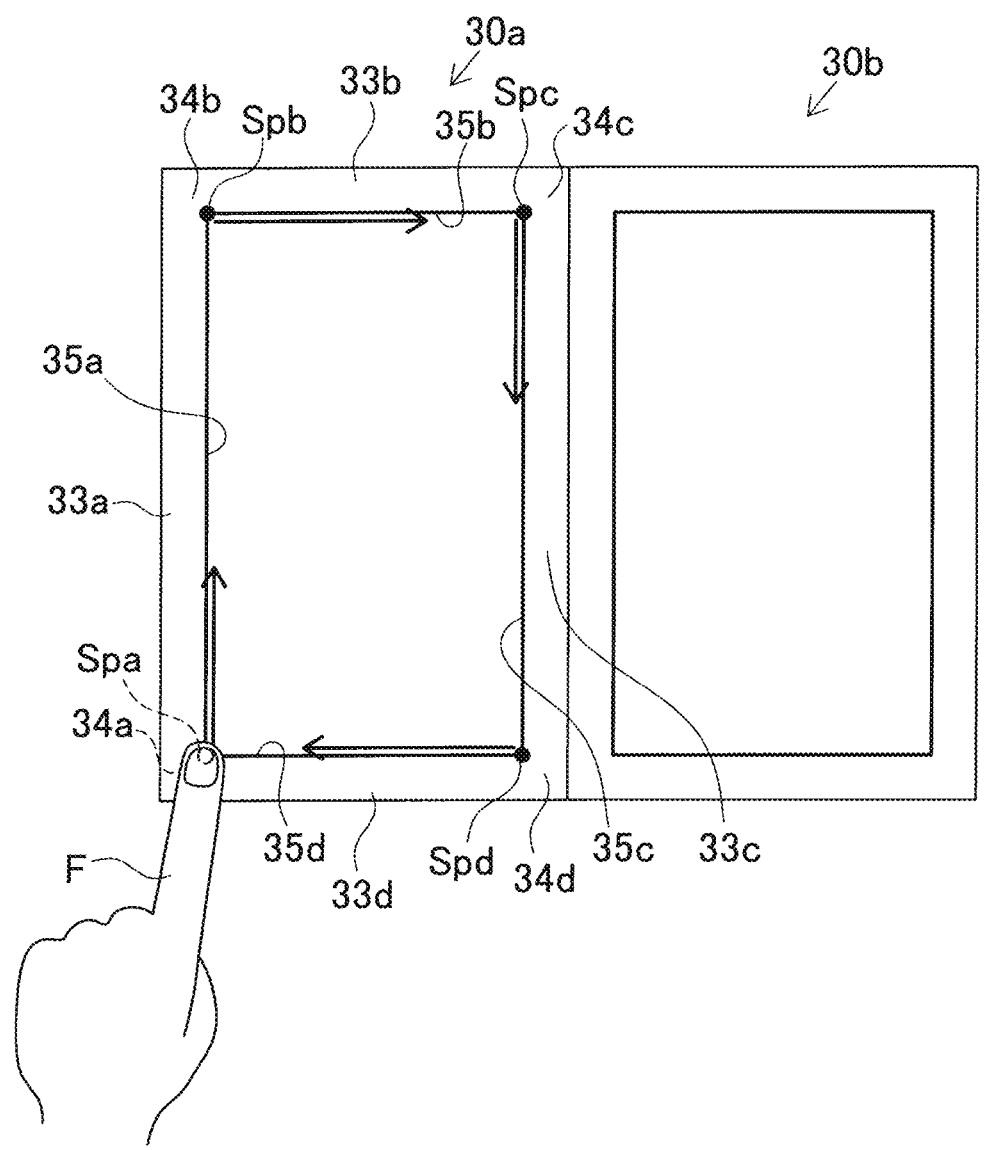
FIG. 68 is a view illustrating a monitoring area that is set when an inner edge of an upper end face of a parts box is set as a search target in a nineteenth embodiment.

In the present embodiment, an upper end face of the peripheral wall of the parts box is detected as a ring shape having a predetermined width, and the inner edge of the ring is searched. Specifically, when the corner 34*a* of the parts box 30*a* is touched by the finger F in the stationary state, in start point detection at step S1213 in FIG. 64, as shown in FIG. 68, a point regarded as an intersection SP1*a* between a line segment corresponding to an inner edge 35*a* of an upper end face 33*a* and a line segment corresponding to an inner edge 35*d* of an upper end face 33*d*. Then, in search target setting at step S1215, first, a line segment corresponding to the inner edge 35*a* of the upper end face 33*a* and the intersection SP1*b* at the tip of the line segment are set as a search target. Then, in search target switching at step S1221, the search target is switched from a line segment corresponding to the inner edge 35*b* of the upper end face 33*b* and the intersection SP1*c* at the tip of the line segment, to a line segment corresponding to the inner edge 35*c* of the upper end face 33*c* and the intersection SP1*d* at the tip of the line segment, and a line segment corresponding to the inner edge 35*d* of the upper end face 33*d*, in this order. In FIG. 68, the parts boxes 30*a* and 30*b* are shown in plan view, in which the parts 20*a* and 20*b* are omitted and the width of the upper end faces of the parts boxes 30*a* and 30*b* are exaggerated for convenience.

Thus, in boundary setting at step S1223 in FIG. 64, the rectangular area surrounded by the inner edges 35*a* to 35*d* is set as the monitoring area P1*a* for the parts box 30*a*. Therefore, since the boundary is detected as a ring shape having a predetermined width, and a polygonal area surrounded by the inner edge (35*a* to 35*d*) of the ring is set as a monitoring area, the parts box (30*b*), which may be adjacent and continuous to the outer edge of the ring shape as shown in FIG. 68 is prevented from affecting the setting of the monitoring area (P1*a*), and thus the monitoring area can be more accurately set.

Twentieth Embodiment

With reference to the drawings, a work support device and a work support program according to a twentieth embodiment will now be described.

The twentieth embodiment mainly differs from the seventeenth embodiment in that, in monitoring area setting, a monitoring area is set according to a ring-shaped trajectory which is drawn by the worker's finger tracing the upper end face of the peripheral wall of the parts box. The components which are substantially the same as those of the seventeenth embodiment are denoted by the same reference signs, and the description thereof will be omitted.

In the monitoring area setting of the present embodiment, when an area surrounded by the ring-shaped trajectory which is drawn by the finger F of the worker M tracing the upper end face of the peripheral wall of the parts box is imaged by the imaging unit 13, the area surrounded by the ring-shaped trajectory is set as a monitoring area. That is, each monitoring area can be set by tracing the upper end face of the peripheral wall of each parts box.

Figure 69:
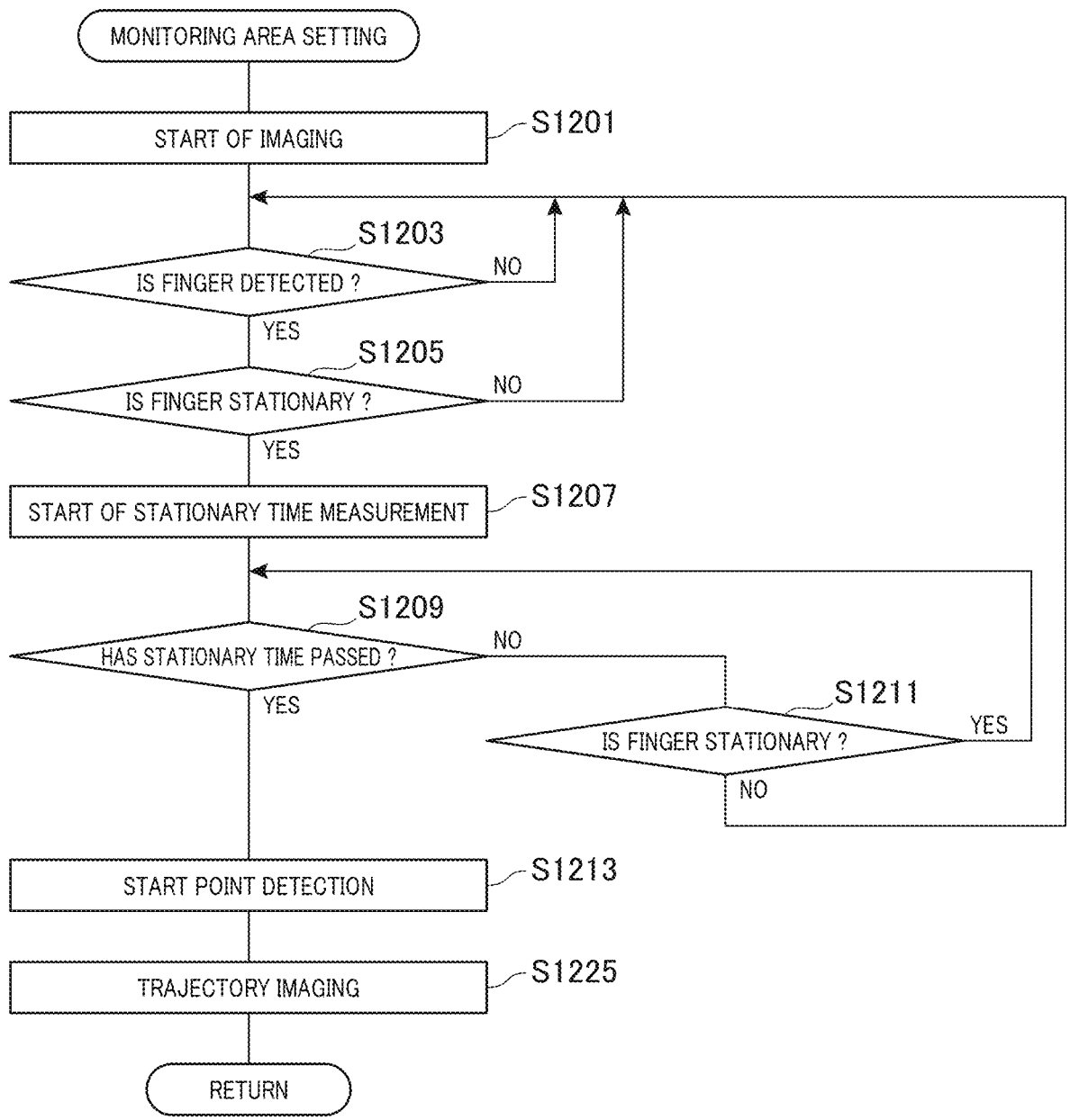
FIG. 69 is a flowchart illustrating the order of execution in monitoring area setting in a twentieth embodiment.

Referring to a flowchart of FIG. 69, the monitoring area setting in the present embodiment will now be described in detail.

As in the above seventeenth embodiment, when the stationary time of the finger F of the worker M in contact with the corner of the parts box has passed the above predetermined time (Yes at S1209 in FIG. 69), and the corner that is in contact with the finger F is detected as a start point (S1213), trajectory imaging is performed at step S1225. At step S1225, as the finger in a stationary state starts moving to draw a ring shape, imaging of the trajectory of the movement is performed.

Figure 70:
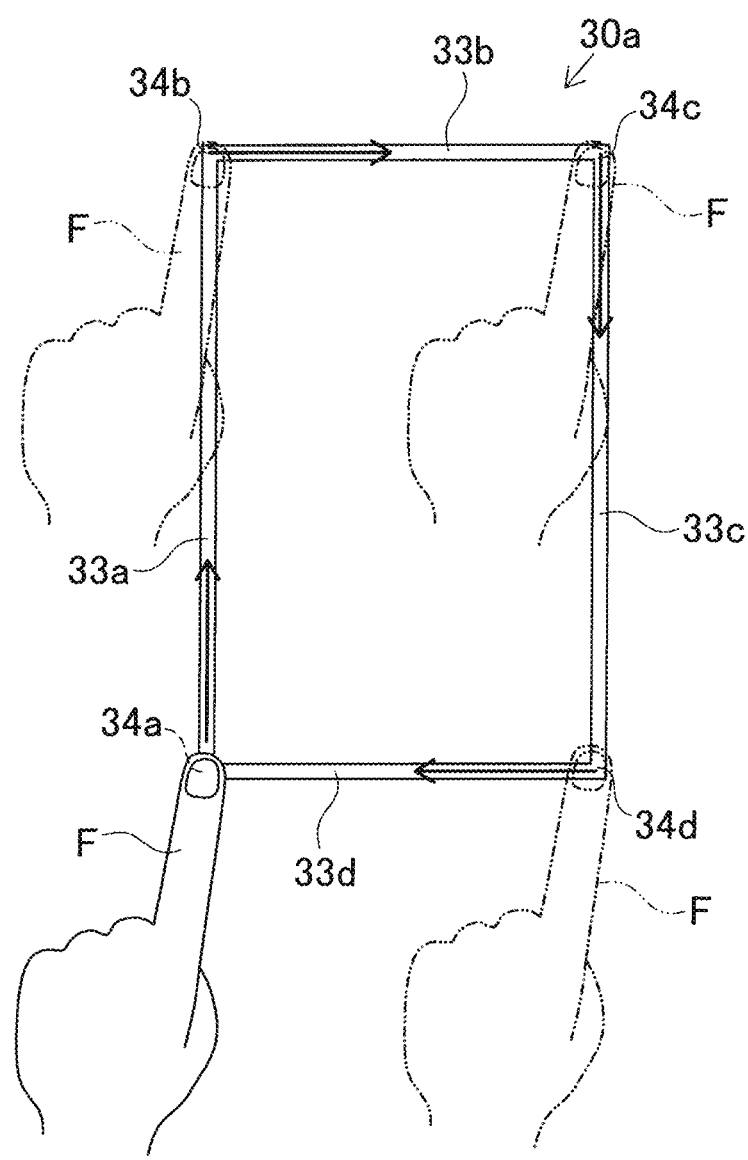
FIG. 70 is a view illustrating a ring-shaped trajectory drawn by a finger of a worker tracing an upper end face of a parts box in a twentieth embodiment.

As shown in FIG. 70, for example, when the worker M traces, with the finger F, from a start point at the corner 34*a* of the parts box 30*a*, and then along the upper end face 33*a*, the corner 34*b*, the upper end face 33*b*, the corner 34*c*, the upper end face 33*c*, the corner 34*d*, the upper end face 33*d*, and the corner 34*a* in this order, a ring-shaped trajectory (P1*a*) is imaged. The area surrounded by the ring shape trajectory is set as the monitoring area P1*a*. Similarly, when the worker M traces the upper end face of the peripheral wall of the parts box 30*b* with the finger F, the monitoring area P1*b* is set. When the worker M traces the upper end face of the peripheral wall of the parts box 30*c*, the monitoring area P1*c* is set. When the worker M traces the upper end face of the peripheral wall of the parts box 30*d*, the monitoring area P1*d* is set. In FIG. 70, the parts box 30*a* is shown in plan view, and the part 20*a* is omitted for convenience.

As described above, in the work support device 100 according to the present embodiment, on the basis of the comparison result, among the images captured by the imaging unit 13, between a portion corresponding to the monitoring area (P1*a* to P1*d*) set by the monitoring area setting and a portion corresponding to the monitoring area in another image that is acquired before the above image, taking out of the parts (20*a* to 20*d*) from the parts boxes (30*a* to 30*d*) corresponding to the monitoring area is detected. On the basis of the detection result, it is determined whether or not the work in accordance with the predetermined work procedure is performed, and the determination result is notified to the worker M. In this process, in the monitoring area setting, when an area surrounded by the ring-shaped trajectory which is drawn by the finger F of the worker M tracing the upper end face (33*a* to 33*d*) of the peripheral wall of the parts box is imaged by the imaging unit 13, the area surrounded by the ring-shaped trajectory is set as a monitoring area for each parts box.

A work support program according to the present embodiment is a program that causes the control unit 11 of the work support device 100, which supports the work performed in accordance with a predetermined work procedure by using the parts (20a to 20d) accommodated in a plurality of parts boxes (30a to 30d), to execute: monitoring area setting (S905A) for setting a monitoring area (P1a to P1d) for each parts box in the imaging range of the imaging unit 13; detection (S913) for detecting the parts being taken out from the parts boxes corresponding to the monitoring area, on the basis of the comparison result, among the images captured by the imaging unit 13, between a portion corresponding to the monitoring area set by the monitoring area setting and a portion corresponding to the monitoring area in another image that is acquired before the above image; determination (S913) for determining whether or not the work is performed in accordance with the predetermined work procedure on the basis of the detection result by the above detection; and notification (S913) for notifying the determination result by the above determination to the worker.

In the monitoring area setting, when an area surrounded by the ring-shaped trajectory which is drawn by the finger F of the worker M tracing the upper end face (33a to 33d) of the peripheral wall of the parts box is imaged by the imaging unit 13, the area surrounded by the ring-shaped trajectory is set as a monitoring area for each parts box.

Thus, the monitoring area can be easily set for each parts box by the worker M, when tracing, with the finger F, the upper end face of the peripheral wall of the parts box before starting the work. In particular, since the worker does not need to perform mouse operation while watching the screen, erroneous setting of the monitoring area due to an operation error or the like of the worker can be avoided. Therefore, it is possible to set a monitoring area easily and correctly without imposing a work burden on the worker.

Further, in the monitoring area setting of the present embodiment, a configuration is also possible in which, the area surrounded by the ring-shaped trajectory is set as a monitoring area when the ring-shaped trajectory drawn by the finger F of the worker M is imaged without detecting the finger F of the worker M being stationary.

The present invention is not limited to the seventeenth to twentieth embodiments and the modified examples of the seventeenth to twentieth embodiments, and, for example, may be embodied as described below.

(1) The parts boxes 30, which are disposed within the imaging range of the imaging unit 13 as the monitoring target, are not limited to four parts boxes 30a to 30d, and may also be one to three parts boxes, or five or more parts boxes. Further, the parts boxes 30 are not limited to being horizontally arranged side by side within the imaging range of the imaging unit 13, and, for example, may also be vertically arranged at multiple levels such as upper and lower levels. Further, the upper end face of the peripheral wall of the parts box 30 to be monitored is not limited to being formed in a rectangular ring shape having four corners 34a to 34d, and, for example, may be formed in a polygonal ring shape having a plurality of corners, such as a trapezoidal shape. Further, the parts box 30 to be monitored may also be configured, for example, as a storage bag such that the shape of the upper end face of the peripheral wall varies depending on how it is placed as long as the upper end face of the peripheral wall has a shape that is recognizable from the captured image as a ring-shaped line or a ring shape having a predetermined width.

(2) The invention according to the seventeenth to twentieth embodiments can be applied not only to work support in assembly of the parts to the workpiece W such as a printed circuit board according to a predetermined work procedure, but also to work support in assembly of the parts to a semi-finished product, for example, in an assembly line for high-mix low-volume products according to a predetermined work procedure.

PARTIAL REFERENCE SIGNS LIST

10 . . . work analysis device
11 . . . control unit (setting unit, generation unit, monitoring area setting unit, reliability setting unit, determination unit, delimitation information setting unit, detection section, work procedure setting unit)
13 . . . imaging unit
20, 20a to 20d . . . parts
30, 30a to 30d . . . parts box
31a to 31d . . . markers
32 . . . peripheral wall
33a to 33d . . . upper end face
34a to 34d . . . corner
35a to 35d . . . inner edge
100 . . . work support device
F . . . finger
P1a to P1d, P2a to P1d, P11a to P11d, P21a to P21d . . . monitoring area
W . . . work (assembly target)
Wa~Wd . . . assembly position

What is claimed is:

1. A work analysis device which analyzes a worker's manual work, the work analysis device comprising:
a camera imaging, as a work video, a state where a plurality of fundamental work operations are performed repeatedly and manually in a predetermined order by the worker; and
a processor programmed to:
set delimitation information for delimiting the work video at detection timings at each of which a predetermined motion is detected, based on the predetermined motion which is previously set for each of the fundamental work operations;
generate determination data for determining whether or not the worker's manual work is repeatedly performed according to a predetermined work procedure, the determination data including both the work video and the delimitation information; and
generate, based on the read work analysis program, the determination data such that, of the fundamental work operations, a fundamental work operation performed immediately before a fundamental work operation performed in an order different from the predetermined order is excluded from the determination data, based on the delimitation information.

2. The work analysis device of claim 1, wherein
the fundamental work operations compose work in which parts taken out of parts boxes assigned to the fundamental work operations are assembled with an assembly target; and
the predetermined motion is assigned to a motion for taking the parts from the parts boxes.

3. The work analysis device of claim 1, wherein
the fundamental work operations compose work in which parts taken out of parts boxes assigned to the fundamental work operations are assembled with an assembly target; and
the predetermined motion is assigned to a motion for transferring the parts to an assembly position of the assembly target.

4. The work analysis device of claim 1, wherein
the processor is configured to calculate a normal range of work time for each of the fundamental work operations based on the delimitation information, and to generate, as the determination data, the fundamental work operation whose work time is within the normal range.

5. The work analysis device of claim 4, wherein
the processor is configured to generate the determination data such that one or more of the fundamental work operations, of which work time is out of the normal range, are excluded from the determination data.

6. A work analysis method for analyzing a worker's manual work, the work analysis method being functionally realized by a processor and a memory in which a work analysis program is stored such that the read work analysis program enables the processor to perform the work analysis method, the work analysis method comprising:
   making a camera image, as a work video, a state where a plurality of fundamental work operations are performed repeatedly and manually in a predetermined order by a worker;
   setting delimitation information for delimiting the work video at detection timings at each of which a predetermined motion is detected, based on the predetermined motion which is previously set for each of the fundamental work operations; and
   generating determination data for determining whether or not the worker's manual work is repeatedly performed according to a predetermined work procedure, the determination data including both the work video and the delimitation information, wherein, in the generated determination data, of the fundamental work operations, a fundamental work operation performed immediately before a fundamental work operation performed in an order different from the predetermined order is excluded from the determination data, based on the delimitation information.

7. A work analysis device which analyzes a worker's manual work, the work analysis device comprising:
   a camera configured to image, as a work video, a state where a plurality of fundamental work operations are performed repeatedly and manually in a predetermined order by the worker, the fundamental work operations being a worker's taking action of parts from each of a plurality of parts boxes; and
   a processor programmed to:
      set monitoring areas respectively to the parts boxes within an imaging range of the camera, based on an image captured by the camera, the monitoring areas including every one of the parts boxes, the monitoring areas corresponding to the parts boxes which are moved in a predetermined movement state, when the parts boxes are individually moved by the worker in the predetermined movement state;
      set delimitation information for delimiting the work video at detection timings at each of which a predetermined motion is detected, based on the predetermined motion which is previously set for each of the fundamental work operations; and
      generate determination data for determining whether or not the worker's manual work is repeatedly performed according to a predetermined work procedure, the determination data including both the work video and the delimitation information.

8. The work support device of claim 7, wherein the predetermined movement state is a swinging state of one or more of the parts boxes that are repeated on an assumption that the parts boxes are returned to original positions thereof.

* * * * *